(12) United States Patent
Ye et al.

(10) Patent No.: US 11,638,187 B2
(45) Date of Patent: Apr. 25, 2023

(54) AREA HANDOVER MANAGEMENT IN REAL-TIME LOCATING SYSTEM (RTLS) NETWORKS

(71) Applicant: Red Point Positioning Corporation, Boston, MA (US)

(72) Inventors: Zhenzhen Ye, Westford, MA (US); Mingda Zhou, Stoneham, MA (US); Serhii Rybalko, Kharkov (UA)

(73) Assignee: Red Point Positioning Corporation, Boston, MA (US)

( * ) Notice: Subject to any disclaimer, the term of this patent is extended or adjusted under 35 U.S.C. 154(b) by 93 days.

(21) Appl. No.: 17/486,318

(22) Filed: Sep. 27, 2021

(65) Prior Publication Data

US 2023/0095932 A1    Mar. 30, 2023

(51) Int. Cl.
*H04W 36/00*      (2009.01)
*G01S 5/12*      (2006.01)
*H04W 4/029*      (2018.01)

(52) U.S. Cl.
CPC ......... *H04W 36/00837* (2018.08); *G01S 5/12* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 8,188,923 B2 | 5/2012 | Ferreol et al. | |
| 8,543,132 B2 | 9/2013 | Nam et al. | |
| 9,179,387 B2 | 11/2015 | Hedqvist et al. | |
| 9,241,235 B2 | 1/2016 | Santavicca | |
| 10,408,917 B2 | 9/2019 | Ye et al. | |
| 2011/0244862 A1* | 10/2011 | Inumaru | H04W 36/32 455/436 |
| 2013/0099892 A1 | 4/2013 | Tucker et al. | |
| 2015/0097731 A1 | 4/2015 | Russell | |
| 2015/0156746 A1 | 6/2015 | Horne et al. | |
| 2015/0185309 A1 | 7/2015 | Pu et al. | |
| 2015/0311649 A1 | 10/2015 | Horne et al. | |
| 2016/0212579 A1 | 7/2016 | Duan et al. | |
| 2017/0078897 A1 | 3/2017 | Duan et al. | |

(Continued)

FOREIGN PATENT DOCUMENTS

WO     2010052688 A1    5/2010

*Primary Examiner* — Suhail Khan
(74) *Attorney, Agent, or Firm* — Guntin & Gust, PLC; Ralph Trementozzi

(57) ABSTRACT

Aspects of the subject disclosure may include, for example, estimating a location of a mobile device based on a first wireless signal transmitted by one of a first group of wireless anchors of a first location service operating within a first area. Ranges between the mobile device and a group of wireless reference devices are determined responsive to the location indicating the mobile device is proximate to a predetermined transition region. A handover requirement is identified according to the range information and, responsive to this requirement, the mobile device is configured to receive a second wireless signal transmitted one of a second group of wireless anchors of a second location service operating within a second area. The location of the mobile device may be determined according to the second wireless signal, without reference to the first wireless signal. Other embodiments are disclosed.

20 Claims, 26 Drawing Sheets

(56) References Cited

U.S. PATENT DOCUMENTS

| | | |
|---|---|---|
| 2019/0174332 A1 | 6/2019 | Duan et al. |
| 2019/0219665 A1 | 7/2019 | Ye et al. |
| 2019/0222959 A1 | 7/2019 | Duan et al. |
| 2020/0382902 A1 | 12/2020 | Ye et al. |
| 2020/0404450 A1 | 12/2020 | Duan et al. |
| 2021/0027631 A1 | 1/2021 | Ye et al. |
| 2021/0029493 A1 | 1/2021 | Duan et al. |
| 2021/0029500 A1 | 1/2021 | Ye et al. |

* cited by examiner

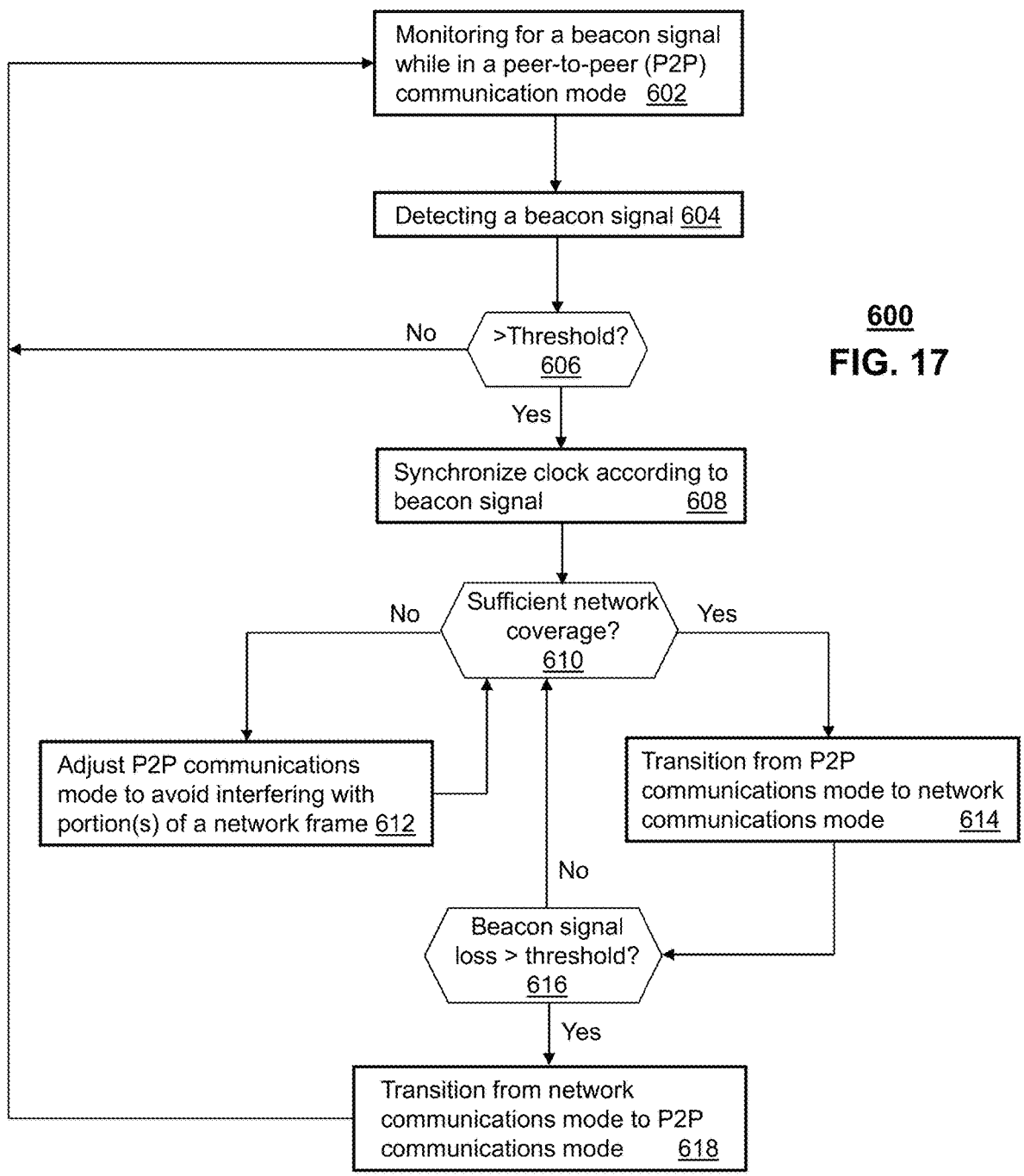

700

θ: azimuth angle
φ: elevation angle

780

810

820

900

US 11,638,187 B2

AREA HANDOVER MANAGEMENT IN REAL-TIME LOCATING SYSTEM (RTLS) NETWORKS

FIELD OF THE DISCLOSURE

The subject disclosure relates to area handover management in real-time locating system (RTLS) networks.

BACKGROUND

Determining location information between objects can serve multiple purposes such as predicting and mitigating collisions between objects, tracking distances between objects, enforcing distancing between objects, inventory management, or combinations thereof. Objects can include people, mobile machinery such as forklifts and robots, vehicles controlled by individuals or driverless, or other objects for which location management and/or tracking may be desirable. Location information can correspond to distances between objects, relative positions of objects, trajectory of objects, speed of objects, or combinations thereof.

BRIEF DESCRIPTION OF THE DRAWINGS

Reference will now be made to the accompanying drawings, which are not necessarily drawn to scale, and wherein:

FIG. 17 depicts an illustrative embodiment of a method for transitioning between modes of communications; particularly, peer-to-peer communications mode and network communications mode in accordance with various aspects described herein.

DETAILED DESCRIPTION

Figure 1:
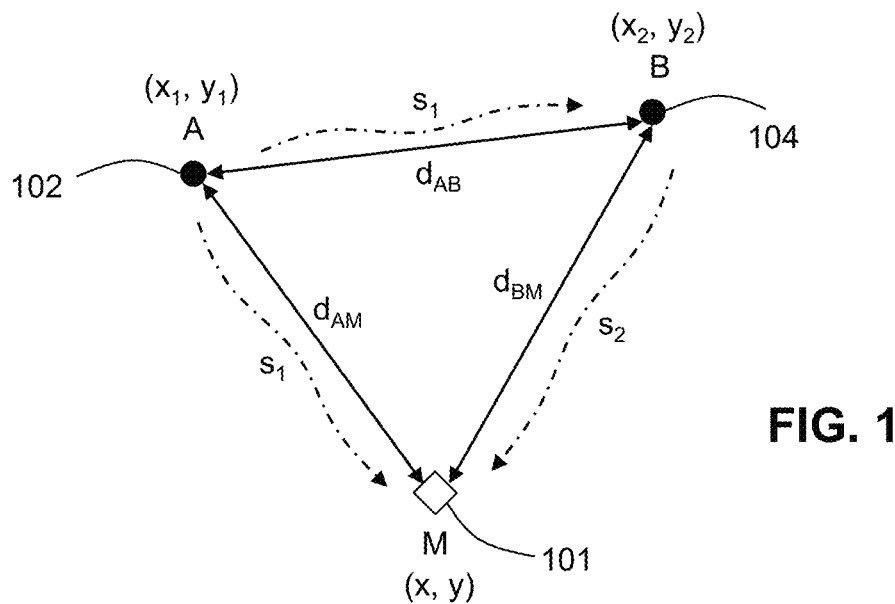
FIG. 1 is a block diagram illustrating an exemplary, non-limiting embodiment of a mobile tag and anchors for determining location information between the mobile tag and the anchors in accordance with various aspects described herein.

The subject disclosure describes, among other things, illustrative embodiments for facilitating handovers in which a mobile tag moves between different segments of a multi-segment, real-time locating system (RTLS) network. Other embodiments are described in the subject disclosure.

One or more aspects of the subject disclosure include a device that utilizes a processing system including a processor and a memory that stores executable instructions that, when executed by the processing system, facilitate performance of operations. The operations may include facilitate performance of operations that include receiving a first wireless signal transmitted by a wireless anchor of a first group of wireless anchors of a first location service operating within a first area. The operations further include estimating a location of the mobile device according to the first location service, based on the first wireless signal. Ranges between the mobile device and a group of wireless ranging devices are calculated responsive to the location indicating the mobile device is proximate to a predetermined transition region between the first area and a second area. The ranges are calculated separately from the first location service. A handover requirement is identified according to the ranges and the mobile device is configured, responsive to the handover requirement, to receive a second wireless signal transmitted by a wireless anchor of a second group of wireless anchors of a second location service operating within a second area. A location of the mobile device within the second area may be determined according to the second wireless signal, without reference to the first wireless signal.

One or more aspects of the subject disclosure include a process for receiving, by a processing system including a processor, a first wireless signal transmitted by a wireless anchor of a first group of wireless anchors of a first location service. The first location service is adapted to determine a location of a mobile device operating within a first area. A location of the mobile device is estimated, by the processing system, based on the first wireless signal, and range information between the mobile device and a group of wireless ranging devices is determined, by the processing system, responsive to the location indicating the mobile device is proximate to a predetermined transition region. A handover requirement is identified by the processing system according to the range information, and the mobile device is configured, by the processing system and responsive to the handover requirement, to receive a second wireless signal transmitted by a wireless anchor of a second group of wireless anchors of a second location service operating within a second area. A location of the mobile device may be determined according to the second wireless signal, without reference to the first wireless signal.

One or more aspects of the subject disclosure include a machine-readable medium comprising executable instructions that, when executed by a processing system including a processor, facilitate performance of operations. The operations may include estimating a location of a mobile device based on a first wireless signal transmitted by one of a first group of wireless anchors of a first location service operating within a first area. Ranges between the mobile device and a group of wireless reference devices are determined responsive to the location indicating the mobile device is proximate to a predetermined transition region. A handover requirement is identified according to the range information and, responsive to this requirement, the mobile device is configured to receive a second wireless signal transmitted one of a second group of wireless anchors of a second location service operating within a second area. The location of the mobile device may be determined according to the second wireless signal, without reference to the first wireless signal.

Figure 2:
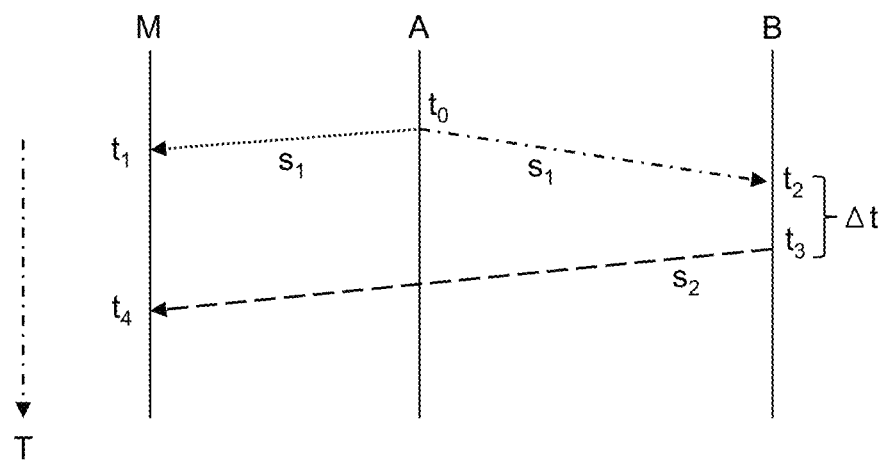
FIG. 2 is a block diagram illustrating an exemplary, non-limiting embodiment of a timing diagram for determining location information between the mobile tag and the anchors of FIG. 1 in accordance with various aspects described herein.

FIG. 1 is a block diagram illustrating an exemplary, non-limiting embodiment of a mobile tag 101 and anchors 102 ("A") and 104 ("B") for determining location information between the mobile tag 101 ("M") and the anchors 102 and 104 in accordance with various aspects described herein. In an embodiment, a first anchor 102 can be configured to transmit a first wireless signal ($S_1$) that can be received by a second anchor 104 and the mobile tag 101. The timing of transmission by the first anchor 102 and reception by the mobile tag 101 and the second anchor 104 of the first wireless signal ($S_1$) is depicted in FIG. 2.

In an embodiment, the first anchor 102 transmits the first wireless signal ($S_1$) at time $t_0$, which in turn is received by the mobile tag 101 at time $t_1$ and the second anchor 104 at time $t_2$. The second anchor 104 can be configured to transmit a second wireless signal ($S_2$) at time $t_3$, which is received by the mobile tag 101 at time $t_4$. The mobile tag 101 can be configured to use a time difference of arrival (TDOA) measurement technique based on the first and second wireless signals ($S_1$, $S_2$) to determine location information between the mobile tag 101 and the anchors 102 and 104 as will be described below.

In an embodiment, the first and second anchors 102 and 104 are stationary. Accordingly, their x-y coordinates and a distance ($d_{AB}$) between the first and second anchors 102 and 104 can be made known to the mobile tag 101 either by a look-up table provisioned into a memory of the mobile tag 101 or by including such information in the first wireless signal ($S_1$), which can then be obtained by the mobile tag 101. Additionally, the mobile tag 101 can be configured to include in its look-up table the receive time and transmit time ($t_2$, $t_3$) of the second anchor 104 and/or a time difference between these times ($\Delta t = t_3 - t_2$) or can receive this information in the second wireless signal ($S_2$) transmitted by anchor 104. The equations that follow can be used to calculate a first possible location of the mobile tag 101 relative to anchor pair 102, 104.

The distance between the first anchor 102 and the mobile tag can be represented as, $$d_{AM} = c(t_1 - t_0) \quad (EQ\ 1),$$

where c is the speed of light constant. Similarly, the distance from the first anchor 102 to the second anchor 104 can be represented as, $$d_{AB} = c(t_2 - t_0) \quad (EQ\ 2).$$

Additionally, the distance from the second anchor 104 to the mobile tag 101 can be represented as, $$d_{BM} = c(t_4 - t_3) \quad (EQ\ 3).$$

The total distance traveled by the first wireless signal ($S_1$) from the first anchor 102 to the second anchor 104 and the second wireless signals ($S_2$) from the second anchor 104 to mobile tag 101 can be represented as, $$d_{AB} + d_{BM} = c(t_2 - t_0 + t_4 - t_3) \quad (EQ\ 4A).$$

To eliminate variable $t_0$, equation EQ1 can be subtracted from equation EQ 4A, resulting in, $$d_{AB} + d_{BM} - d_{AM} = c(t_2 - t_1 + t_4 - t_3) \quad (EQ\ 4B).$$

Substituting $\Delta t = t_3 - t_2$ into EQ 4B results in equation, $$d_{AB} + d_{BM} - d_{AM} = c(t_4 - t_1 - \Delta t) \quad (EQ\ 4C).$$

Since $d_{AB}$ is a constant known to the mobile tag 101 and the time variables of the factor $c(t_4 - t_1 - \Delta t)$ are also known to the mobile tag 101, EQ 4C can be rewritten as, $$d_{BM} - d_{AM} = \Delta d_1 \quad (EQ\ 5),$$

where $\Delta d_1 = c(t_4 - t_1 - \Delta t) - d_{AB}$, which are constants known to mobile tag 101. Furthermore, in an example of two-dimensional (2D) space, the distance between the first anchor 102 and the mobile tag 101 can be represented as, $$d_{AM} = \sqrt{(x - x_1)^2 + (y - y_1)^2},$$

and the distance between the second anchor 104 and the mobile tag 101 can be represented as, $d_{BM} = \sqrt{(x - x_2)^2 + (y - y_2)^2}$.

Substituting $d_{AM}$ and $d_{BM}$ in EQ 5 results in the following equation, $$\sqrt{(x - x_2)^2 + (y - y_2)^2} - \sqrt{(x - x_1)^2 + (y - y_1)^2} = \Delta d_1 \quad (EQ\ 6).$$

Figure 3:
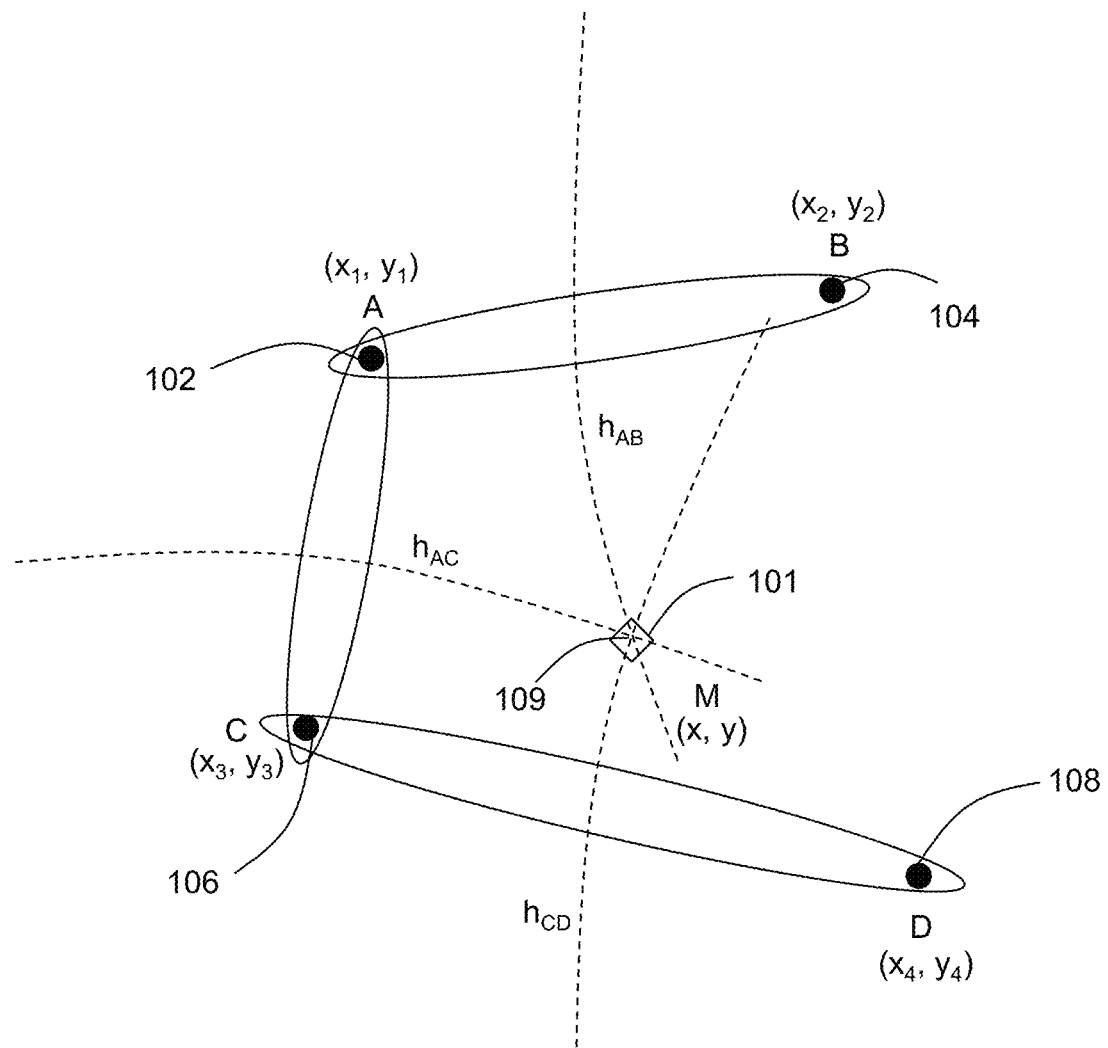
FIG. 3 is a block diagram illustrating an exemplary, non-limiting embodiment for determining location information between the mobile tag and pairs of anchors in accordance with various aspects described herein.

Equation EQ 6 has only two unknown variables (x, y) that can be solved by the mobile tag 101 utilizing a non-linear regression technique (e.g., Nonlinear Least Squares). Such a technique produces a hyperbolic curve of solutions for x and y that is associated with the positions of the first and second anchors 102 and 104. Such a hyperbolic curve can be represented as, $$h_{AB} = \Delta d_1 \quad (EQ\ 7A),$$

where $h_{AB} = \sqrt{(x - x_2)^2 + (y - y_2)^2} - \sqrt{(x - x_1)^2 + (y - y_1)^2}$. The mobile tag 101 can be further configured to perform the above calculation across other anchor pairs as depicted in FIG. 3. For example, the mobile tag 101 can be configured to determine a hyperbolic curve between the first and third anchors 102 and 106 (i.e., anchors A and C) resulting in equation, $$h_{AC} = \Delta d_2 \quad (EQ\ 7B),$$

where $\Delta d_2$ is a constant known to mobile tag 101, and where $h_{AC} = \sqrt{(x - x_3)^2 + (y - y_3)^2} - \sqrt{(x - x_1)^2 + (y - y_1)^2}$. Additionally, the mobile tag 101 can be configured to determine a hyperbolic curve between the third and fourth anchors 106 and 108 (i.e., anchors C and D) resulting in equation, $$h_{CD} = \Delta d_3 \quad (EQ\ 7C),$$

where $\Delta d_3$ is a constant known to mobile tag 101, and where $h_{CD} = \sqrt{(x - x_4)^2 + (y - y_4)^2} - \sqrt{(x - x_3)^2 + (y - y_3)^2}$. The intersection 109 of hyperbolic curves $h_{AB}$, $h_{AC}$ and $h_{CD}$ corresponding to equations EQ 7A-7C can provide a two-dimensional coordinate location (i.e., x, y) for the mobile tag 101 relative to the first and second anchor pair 102 and 104 (anchors A/B), the first and third anchor pair 102 and 106 (anchors A/C), and the third and fourth anchor pair 106 and 108 (anchors C/D). It will be appreciated that the mobile tag 101 can also be configured to determine a three-dimensional coordinate (i.e., x, y, z) of its location by utilizing a fourth pair of anchors.

To enable the above calculations, the pairs of anchors utilized by the mobile tag 101 must satisfy a coverage area that encompasses the anchor pairs and the mobile tag 101. For example, referring to FIG. 4A, the coverage area of the first anchor 102 (anchor "A") is defined by reference 110, while the coverage area of the second anchor 104 (anchor "B") is defined by reference 112. The overlapping region 114 represents the coverage area that is jointly shared by the first and second anchors 102 and 104. Since the second anchor 104 and the mobile tag 101 must be able to receive the first wireless signal ($S_1$) generated by the first anchor 102, the second anchor 104 and the mobile tag 101 must be located in the overlapping region 114. Additionally, the mobile tag 101 must be in the overlapping region 114 in order to receive the second wireless signal ($S_2$) generated by the second anchor 104. Conditions such as described above for the first and second anchor pair 102, 104 (anchors A/B) must also be satisfied by the second and third anchor pair 102, 106 (anchors A/C) and the third and fourth anchor pair 106, 108 (anchors C/D) in order to enable the mobile tag 101 to perform the triangulation calculations described above for hyperbolic curves $h_{AB}$, $h_{AC}$ and $h_{CD}$.

Figure 4A:
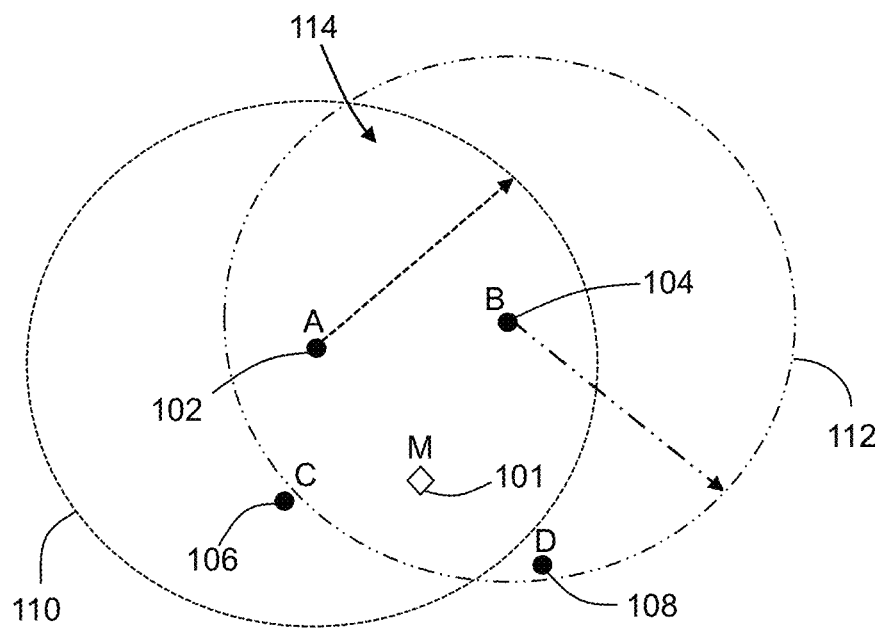
FIGS. 4A, 4B and 4C are block diagrams illustrating exemplary, non-limiting embodiments for selecting pairs of anchors in accordance with various aspects described herein.
Figure 4B:
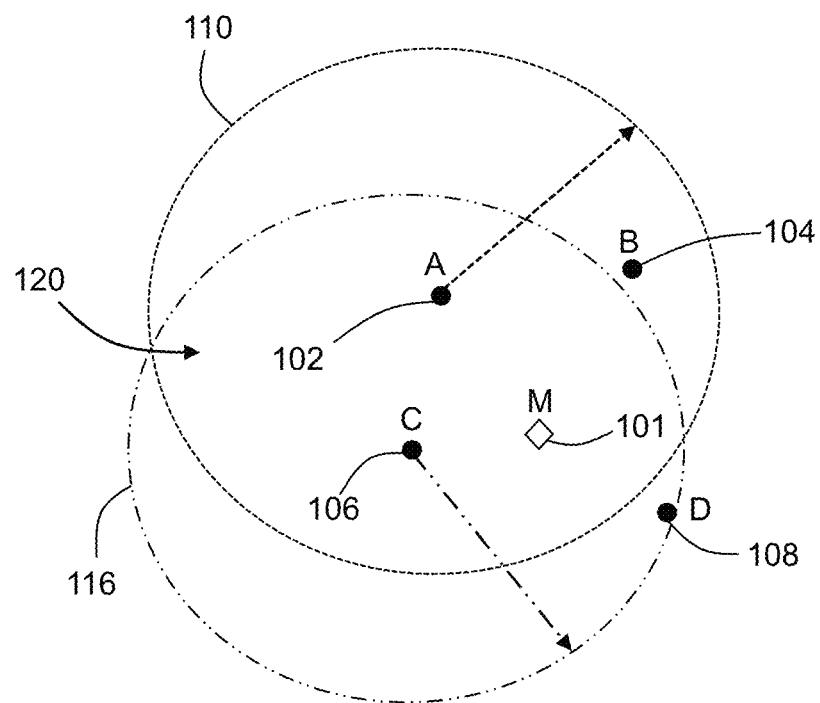
Figure 4C:
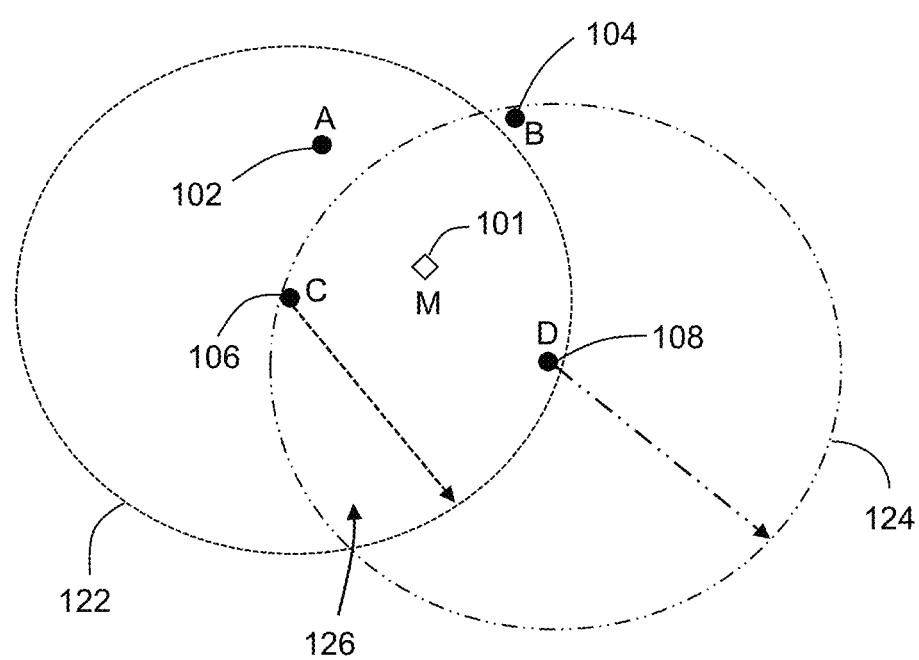

FIG. 4B shows that the coverage areas 110 and 116 of the second and third anchor pair 102, 106 (anchors A/C) create an overlapping region 120 that encompasses the second and third anchors 102 and 106 and the mobile tag 101, thereby enabling the mobile tag 101 to calculate hyperbolic curve $h_{AC}$. Additionally, FIG. 4C shows that the coverage areas 122 and 124 of the third and fourth anchor pair 106, 108 (anchors C/D) create an overlapping region 126 that encompasses the third and fourth anchors 106 and 108 and the mobile tag 101, thereby enabling the mobile tag 101 to calculate hyperbolic curve $h_{CD}$.

Figure 5:
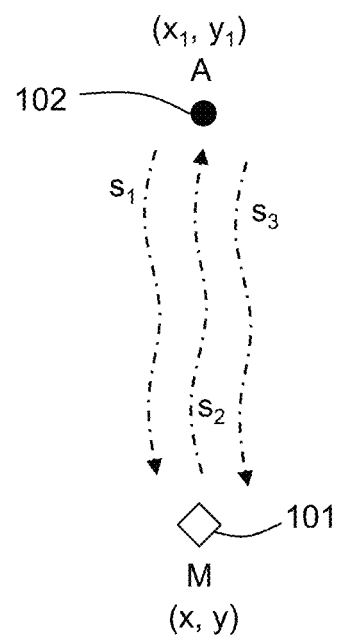
FIG. 5 is a block diagram illustrating an exemplary, non-limiting embodiment of a mobile tag and an anchor for determining location information between the mobile tag and the anchor in accordance with various aspects described herein.
Figure 6:
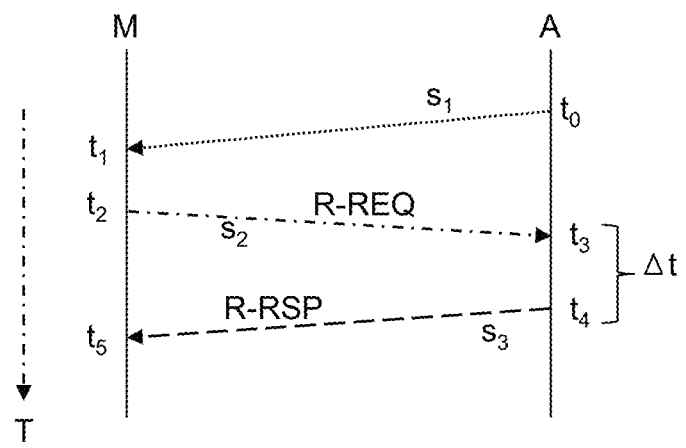
FIG. 6 is a block diagram illustrating an exemplary, non-limiting embodiment of a timing diagram for determining location information between the mobile tag and the anchor of FIG. 5 in accordance with various aspects described herein.

FIG. 5 depicts another embodiment for determining location information between the mobile tag 101 and an anchor 102. In this embodiment, the mobile tag 101 can be configured to use a two-way time of arrival (TW-TOA) process for determining a distance between itself and the anchor 102. Optionally, and as depicted in FIG. 6, the process may begin at the anchor 102 which transmits a first wireless signal ($S_1$), which is received at time $t_1$. The first wireless signal ($S_1$) can include the location, e.g., the x-y coordinates ($x_1$, $y_1$), of the anchor 102. Upon receiving the first wireless signal ($S_1$), the mobile tag 101 can be configured to transmit a second wireless signal ($S_2$), which can represent a range request (R-REQ) signal directed to anchor 102 initiated at time $t_2$ and received by the anchor 102 at time $t_3$.

Upon receiving the R-REQ signal at time $t_3$, the anchor 102 can process the R-REQ signal and initiate at time $t_4$ a transmission of a third wireless signal ($S_3$) representing a range response (R-RSP) signal that is received by the mobile tag 101 at time $t_5$. The time $t_0$ process the R-REQ signal and transmit the R-RSP signal can be represented by $\Delta t = t_4 - t_3$, which can be communicated to the mobile tag 101 via the third wireless signal ($S_3$).

The mobile tag 101 can be configured to determine a roundtrip distance based on the formula, $$d_{r\text{-}trip} = d_{AM} + d_{MA} \quad \text{(EQ 8)},$$

where $d_{r\text{-}trip}$ is the roundtrip distance from the mobile tag 101 to the anchor 102 and back to mobile tag 101, $d_{MA}$ is the distance from the mobile tag 101 to the anchor 102, and $d_{AM}$ is the distance from the anchor 102 to the mobile tag 101. The distance from the mobile tag 101 to the anchor 102 can be determined by, $$d_{MA} = c(t_3 - t_2) \quad \text{(EQ 9)}.$$

Similarly, the distance from the anchor 102 to the mobile tag 101 can be determined by, $$d_{AM} = c(t_5 - t_4) \quad \text{(EQ 10)}.$$

With the above equations, the roundtrip distance can be rewritten as, $$d_{r\text{-}trip} = C(t_5 - t_4 + t_3 - t_2) \quad \text{(EQ 11)}.$$

As noted earlier, the time $t_0$ process the R-REQ signal and transmit the R-RSP signal via the anchor 102 can be represented as $\Delta t = t_4 - t_3$. The anchor 102 can be configured to transmit the value of $\Delta t$ in the R-RSP signal for use by the mobile tag 101 in calculating $d_{r\text{-}trip}$. Substituting $\Delta t$ in $d_{r\text{-}trip}$ results in the formula, $$d_{r\text{-}trip} = c(t_5 - t_2 - \Delta t) \quad \text{(EQ 12)}.$$

Since the values of $t_5$, $t_2$, and $\Delta t$ are known to the mobile tag 101, the mobile tag 101 can readily calculate $d_{r\text{-}trip}$. The mobile tag 101 can also calculate the distance from the mobile tag 101 to the anchor 102 based on the formula, $$d_{MA} = d_{r\text{-}trip}/2 \quad \text{(EQ 13)}.$$

It will be appreciated that the mobile tag 101 can also be configured to know a priori the fixed value of $\Delta t$ thus eliminating the need to transmit the value of $\Delta t$ in the R-RSP signal. This knowledge can be based on a pre-provisioning of the mobile tag 101 with this information prior to deployment. In yet another embodiment, the processing time to receive the R-REQ signal and respond with the transmission of the R-RSP signal can be a fixed processing time interval known and used by all devices in a network performing TW-TOA analysis. It will be further appreciated that the R-REQ and the R-RSP signals can be transmitted using ultra-wideband signaling technology to increase the accuracy of the $d_{r\text{-}trip}$ calculations. Accordingly, the TW-TOA illustrated in FIG. 5 can be used by either the mobile tag 101 or the anchors in other embodiments to calculate a relative distance between each other.

It will be appreciated that the TDOA and TW-TOA processes described above can also be used between mobile tags 101. For example, FIGS. 1-3, 4A-4C, 5, and 6 can be adapted so that the anchors are replaced with mobile tags 101. In this embodiment, mobile tags 101 can use TDOA or TW-TOA to obtain location information amongst each other based on the processes described earlier for TDOA and TW-TOA, respectively.

It will be further appreciated that a mobile tag 101, depicted in FIGS. 1, 3, 4A-4C, and 5, can be configured with multiple antennas and phase detectors to calculate an angle of arrival of any wireless signal generated by an anchor and received by the mobile tag 101 based on a phase difference between the antennas determined from the received wireless signal. An angle of arrival calculation can be used to determine an angular orientation between a mobile tag 101 and an anchor. It will be further appreciated that the mobile tags 101 can be configured to determine a speed of travel of the mobile tag 101 by performing multiple location measurements over a time period. With angular orientation and speed of travel, a mobile tag 101 can also determine its trajectory of travel. Alternatively, the mobile tags 101 can be configured with an orientation sensor (e.g., a magnetometer) to determine an angular orientation with an anchor.

Figure 7:
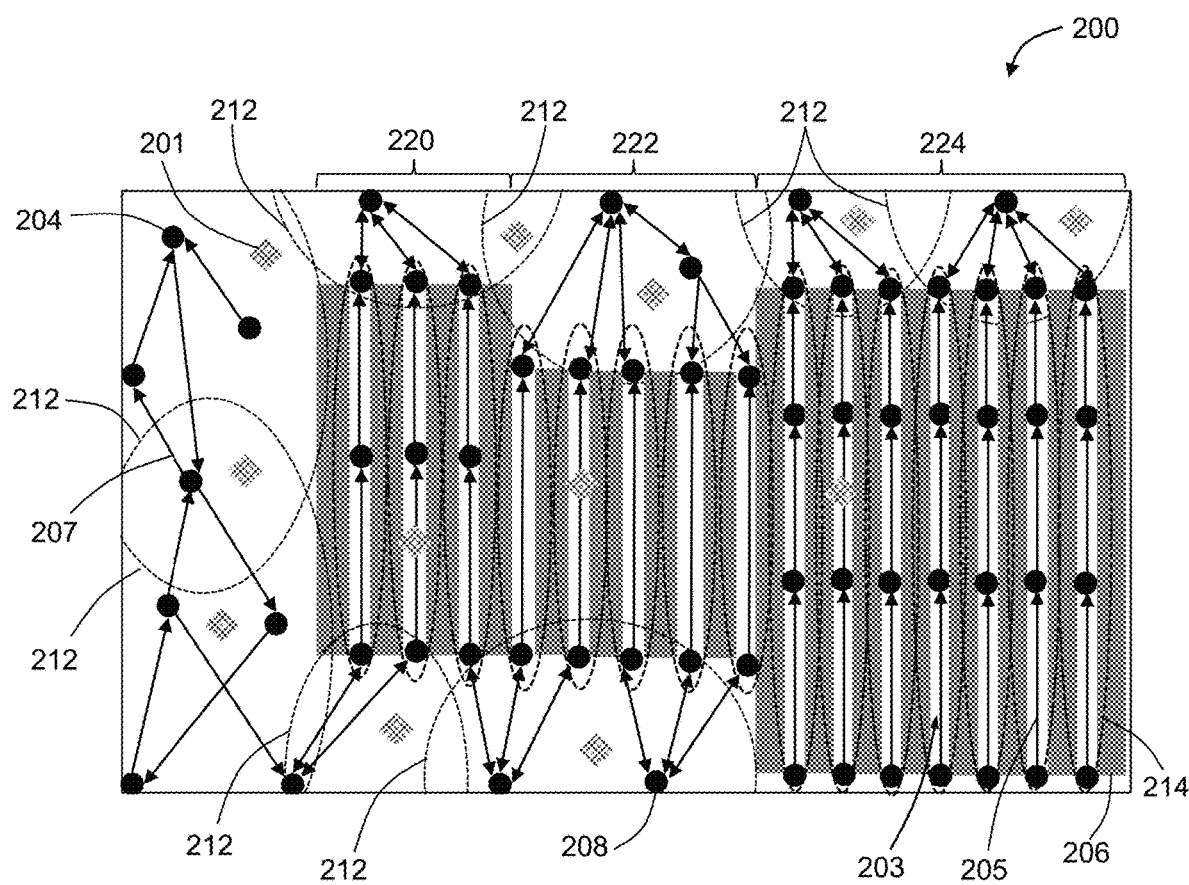
FIG. 7 is a block diagram illustrating an exemplary, non-limiting embodiment for determining location information of mobile tags in a demarcated area in accordance with various aspects described herein.

As will be discussed shortly, TDOA, TW-TOA, angular orientation, speed of travel, or combinations thereof can be utilized in an environment such as illustrated in FIG. 7.

FIG. 7 is a block diagram illustrating an exemplary, non-limiting embodiment for determining location information of mobile tags 201 in a demarcated area 200 in accordance with various aspects described herein. In the illustration of FIG. 7, the demarcated area 200 can represent a warehouse with racks or shelves 206 for managing the distribution of products and/or materials. It will be appreciated that the demarcated area 200 can correspond to numerous other use cases, including without limitation, a parking lot for managing parking spots, a commercial or retail environment for monitoring individuals and/or assets, assisted navigation of vehicles and/or machinery such as robots or forklifts, collision detection and avoidance of objects, managing separation between objects and/or individuals, as well as other suitable applications to which the subject disclosure can be applied. For illustration purposes only, the demarcated area 200 of FIG. 7 will be considered a warehouse with racks and/or shelves 206.

The measurement technique used by the mobile tags 201 to determine location information within the demarcated area 200 can depend on the location of the mobile tags 201 relative to other anchors 204 in the demarcated area 200. For example, when a mobile tag 201 is located in sections 212 (i.e., open spaces without shelving 206 and with line-of-site to pairs of anchors 204), the mobile tag 201 can be configured to perform TDOA measurements among pairs of anchors 204 as described above in relation to FIGS. 1, 2, 3, 4A, 4B, and 4C. On the other hand, when the mobile tag 201 is located in an aisle 203 between racks/shelves 206, the mobile tag 201 can be configured to perform TW-TOA measurements among one or more anchors 204 located in the aisle 203 as described above in relation to FIGS. 5-6.

Additionally, an aisle 203 can be configured with two or more anchors 204. An aisle 203 can have more than two anchors 204 when the coverage area of a first anchor 204 at one end of the aisle 203 has insufficient coverage to reach a second anchor 204 at the other end of the aisle 203 and vice-versa—see sections 220 and 224 and reference number 205. However, when the coverage area of a first anchor 204 at one end of the aisle 203 has sufficient coverage to reach a second anchor 204 at the end of the aisle 203 and vice-versa, then no more than two anchors 204 is necessary in the aisle 203—see region 222.

Figure 8:
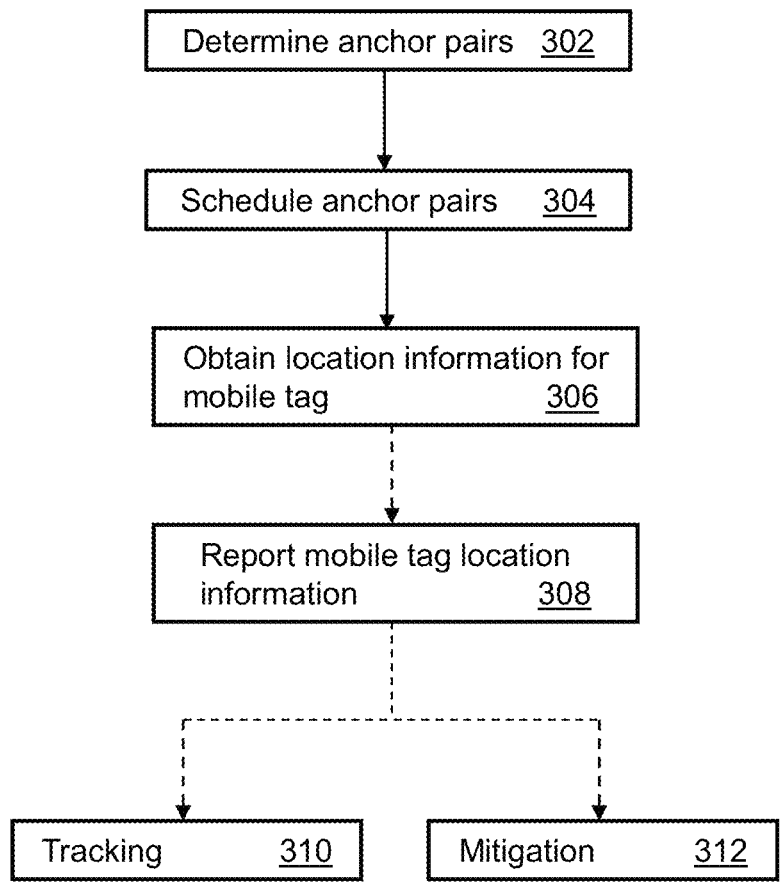
FIG. 8 depicts an illustrative embodiment of a method for determining location information and uses thereof in accordance with various aspects described herein.

FIG. 8 depicts an illustrative embodiment of a method 300 in accordance with various aspects described herein. Method 300 can begin at step 302 where a computing system, such as a server (described below in relation to FIG. 22), is configured to identify anchor pairs in the demarcated area 200 of FIG. 7 that provide sufficient coverage to enable TW-TOA or TDOA measurements depending on the location of the mobile tags 201.

In the case of open spaces, like region 212 (repeated in several portions of the demarcated area 200 of FIG. 7), mobile tags 201 are configured to use TDOA measurement techniques to determine location information. To enable TDOA measurements, the server is configured at step 302 to identify, for a certain number of x-y coordinates obtained from a digitization of an open space defined by region 212 where a mobile tag 201 may be located, at least three pairs of anchors 204 that have overlapping coverage that satisfy the condition described earlier in relation to FIGS. 3, 4A, 4B and 4C. It will be appreciated that techniques other than digitization of an open space can be used to identify possible x-y coordinates used by the server to perform step 302. In the case of spaces formed by aisles 203, like region 214 (repeated in several portions of the demarcated area 200 of FIG. 7), mobile tags 201 are configured to use TW-TOA measurement techniques to determine location information. To enable TW-TOA measurements, the server is configured at step 302 to identify at least two anchors 204 covering at least a portion of the aisle 203. The mobile tags 201 can be configured to perform TW-TOA with anchors 204 at opposite ends of an aisle 203 to provide further accuracy or at least validate location information determined by the mobile tag 201. As noted earlier, pairs of anchors 204 can be located at opposite ends of an aisle 203, or in between aisles 203 when a pair of anchors 204 is unable to cover for the full-length of an aisle 203. The mobile tag 201 can be configured to perform TW-TOA measurement according to the embodiments described above in relation to FIGS. 5-6.

For open spaces such as region 212, a server can be configured at step 302 to determine optimal pairs of anchors 204 in FIG. 7 that provide sufficient coverage for any mobile tag 201 in the area such as region 212 to perform triangulation with at least three pairs of anchors 204 that satisfy the conditions set forth in FIGS. 4A-4C. The process of selecting anchor pairs for TDOA triangulation and optimal coverage in open spaces defined by region 212 can be performed as an iterative analysis by a server at step 302, or by other techniques that enable convergence to a solution that provides coverage to mobile tags 201 across most (if not all) open spaces depicted by region 212. In the case of spaces defined by aisles 203, the server can identify the anchor pairs 204 in the aisles 203 that provide sufficient coverage to cover the aisle from end-to-end as illustrated by sections 220-224 of FIG. 7.

Figure 9:
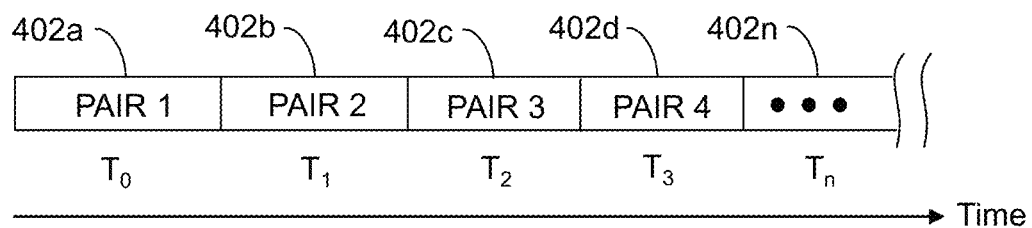
FIG. 9 is a block diagram illustrating an exemplary, non-limiting embodiment for scheduling a process for determining location information between mobile tags and pairs of anchors in the demarcated area of FIG. 7 in accordance with various aspects described herein.

Once the anchor pairs 204 have been identified, the server can proceed to step 304 to identify a schedule for communications between anchor pairs 204 and one or more mobile tags 201. In one embodiment, the anchors 204 can be configured to transmit and receive wireless signals (e.g., reference number 207) in a single frequency band. A single frequency band for performing TDOA or TW-TOA measurements can reduce the design complexity of mobile tags 201 and corresponding costs. To avoid collisions between anchor pairs 204 transmitting in a same frequency band near other anchors, the server can be configured to utilize a time-division scheme (timeslots) such as shown in FIG. 9 to enable anchor pairs 204 to communicate with each other and with one or more mobile tags 201 without causing signal interference (i.e., wireless collisions).

To achieve this, the server can be configured, for example, to determine at step 304 which anchor pairs 204 have overlapping coverage areas with other anchor pairs and schedule the communications between the anchor pairs and the mobile tags 201 during specific timeslots $T_0$–$T_n$ (e.g., 402a through 402n). In the case where a pair of anchors 204 does not have an overlapping coverage area with another anchor pair (e.g., anchor pairs at opposite ends of the demarcated area 200), the server can schedule simultaneous wireless communications of both anchor pairs 204 during a same timeslot (not shown in FIG. 9). As part of the scheduling process shown in FIG. 9, the server can be further configured at step 304 to determine which of the anchor pairs 204 will initiate/start a measurement session through a transmission of wireless signal ($S_1$). Such anchors 204 will be referred to herein as source anchors 204.

In one embodiment, the anchor pairs 204 identified by the server at step 302, and the transmission schedule and source anchors 204 determined by the server at step 304 can be communicated to all anchors 204 via gateway anchors 208 communicatively coupled to the server. Gateway anchors 208 can be located at the edges of the demarcated area 200 or in other locations of the demarcated area 200. Additionally, the server can also be configured to share the identification of the anchor pairs 204 and transmission schedules with the mobile tags 201. This information can be conveyed by gateway anchors 208 when the mobile tags 201 are in close vicinity thereto, or by way of other anchors 204 which can be configured to obtain this information from the gateway anchors 208 and relay the information to the mobile tags 201.

It will be appreciated that the locations of the anchors 204 in FIG. 7 can be predefined before the implementation of step 302 by the server. That is, the anchors 204 can be placed by one or more individuals managing the placement of shelves/racks, etc., in the demarcated area 200. The specific x-y coordinate locations of the anchors 204 can be determined by such individuals and communicated to the server via, for example, a look-up table provided to the server, in order to perform step 302.

It will be further appreciated that in other embodiments, the location of anchors can instead be determined by the server at step 302. In this embodiment, the server can be provided with the location of racks/shelves and/or other objects in the demarcated area 200 along with dimensions of the demarcated area 200 and dimensions of the racks/shelves and/or other objects. The server can then be configured to perform an iterative analysis to determine a location for anchors 204 relative to the racks/shelves identified to the server that provide desirable coverage for mobile tags 201 to perform TDOA analysis in open spaces or TW-TOA analysis in aisles 203. In this embodiment, the server can be configured to report the x-y coordinate locations of anchors 204 to one or more personnel managing the floor space of the demarcated area 200 for placement of the anchors 204 in their corresponding x-y coordinate locations.

It will be further appreciated that once the anchors 204 have been placed in their designated locations determined by the server, the server can be configured to provide the x-y coordinates to all anchors 204 in the demarcated area 200 via gateway anchors 208 as described above. This information can also be conveyed by gateway anchors 208 when the mobile tags 201 are in close vicinity thereto, or by way of other anchors 204 which can be configured to obtain this information from the gateway anchors 208 and relay the information to the mobile tags 201.

Referring back to FIG. 8, at step 306, mobile tags 201 can be configured to initiate a process using TDOA or TW-TOA (and in some instances angular orientation measurements) to obtain location information depending on the location of the mobile tag 201 in the demarcated area 200. In one or more embodiments (although other techniques can be utilized) to assist mobile tags 201 in identifying whether they are in region 212 (i.e., open spaces) or region 214 (i.e., aisles 203), the source anchors 204 can be configured to transmit in the first wireless signal ($S_1$) an indication of whether to use TDOA or TW-TOA. The indication may be a flag or message that enables the mobile tag 201 to determine whether it is in region 212 (an open space) or region 214 (an aisle 203). The first wireless signal ($S_1$) can also convey to the mobile tag 201 the x-y coordinates of one or both anchor pairs 204. Alternatively, the mobile tags 201 can be configured with a look-up table that includes the x-y coordinates of all anchors 204 in the demarcated area 200. The mobile tags 201 can obtain the look-up table from the server via the gateway anchors 208 or during provisioning of the mobile tag 201 by a user before the mobile tag 201 is deployed for use in the demarcated area 200. It will be further appreciated that step 306 can be adapted to enable mobile tags 101 to measure and thereby obtain location information between each other using TDOA or TW-TOA as described earlier in relation to FIGS. 1-3, 4A-4C, 5, and 6.

Once a mobile tag 201 calculates location information via TDOA or TW-TOA measurement techniques, the mobile tag 201 can in turn report at step 308 the location information to other devices such as other mobile tags 201, the anchors 204 in its coverage area, and/or the server by communicating directly to one or more gateway anchors 208 or indirectly via one or more intermediate anchors 204 that can communicate with the one or more gateway anchors 208. The location information can include without limitation, x-y coordinates of the mobile tag 201 within the demarcated area 200, a speed of travel of the mobile tag 201 determined from multiple location measurements over a time period, a trajectory of the mobile tag 201, angular orientation of the mobile tag 201 relative to other anchors 204 and/or other mobile tags 201, or any combinations thereof. Since sharing location information does not require precision measurements via ultra-wideband signals, the mobile tags 201 can be configured to share location information with other devices using lower power wireless signaling techniques such as Bluetooth®, ZigBee®, WiFi or other suitable wireless signaling protocols.

Sharing location information of the mobile tags 201 enables the server and/or other devices such as the anchors 204 and other mobile tags 201 to track at step 310 movement and location of the mobile tags 201 and detect and perform mitigation procedures at step 312. For example, mobile tags 201 can be configured to detect issues such as proximity violations and/or possible collisions between mobile tags 201 from this shared information. Upon detecting such issues, the mobile tags 201 can be configured to assert an alarm (audible and/or visual) and/or take further mitigation action such as slow down or otherwise disable a vehicle (e.g., a forklift, robot, automobile, etc.) that may collide with an individual carrying a mobile tag 201. The mobile tag 201 may be integrated in an identification badge or embedded in a mobile communication device (e.g., mobile phone, tablet, etc.), clipped on a shirt, integrated into an article of clothing of the individual or otherwise carried by the individual via other suitable methods for carrying the mobile tag 201.

It will be appreciated that method 300 can be adapted for other embodiments contemplated by the subject disclosure. For example, at step 306, a mobile tag 201 can be adapted to obtain location information based on a determination of whether it is in an open space defined by region 212 or an aisle 203 defined by region 214. A mobile tag 201, for example, can receive wireless signals from both an anchor 204 in an open space and an anchor 204 in an aisle 203. To determine whether to perform a TDOA measurement or a TW-TOA measurement, the mobile tag 201 can be configured to obtain from its internal memory a history of locations in the demarcated area 200 that are stored by the mobile tag 201 to determine if the most recent location (or trajectory of the mobile tag 201) places the mobile tag 201 in an open space, region 212, or aisle 203, region 214.

If the mobile tag 201 determines it is likely in an open space, region 212, it can proceed to perform TDOA analysis based on the wireless signals generated by anchor pairs 204 in the open space. Otherwise, if the mobile tag 201 determines it is likely in an aisle, region 214, it can proceed to perform TW-TOA analysis based on the wireless signals generated by anchor pairs 204 in the aisle 203. If the mobile tag 201 is unable to make a determination of where it is likely located from a history of locations, the mobile tag 201 can be configured to perform TDOA analysis based on the wireless signals generated by anchor pairs 204 in the open space and TW-TOA analysis based on the wireless signals generated by anchor pairs 204 in the aisle 203. The mobile tag 201 can be configured to compare the location determined from TDOA and the location determined from TW-TOA to the stored location history and thereby make a determination as to which location to choose that more closely mimics the location history of the mobile tag 201.

While for purposes of simplicity of explanation, the respective processes are shown and described as a series of blocks in FIG. 8, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. For example, steps 308-312 can be optional.

Figure 10:
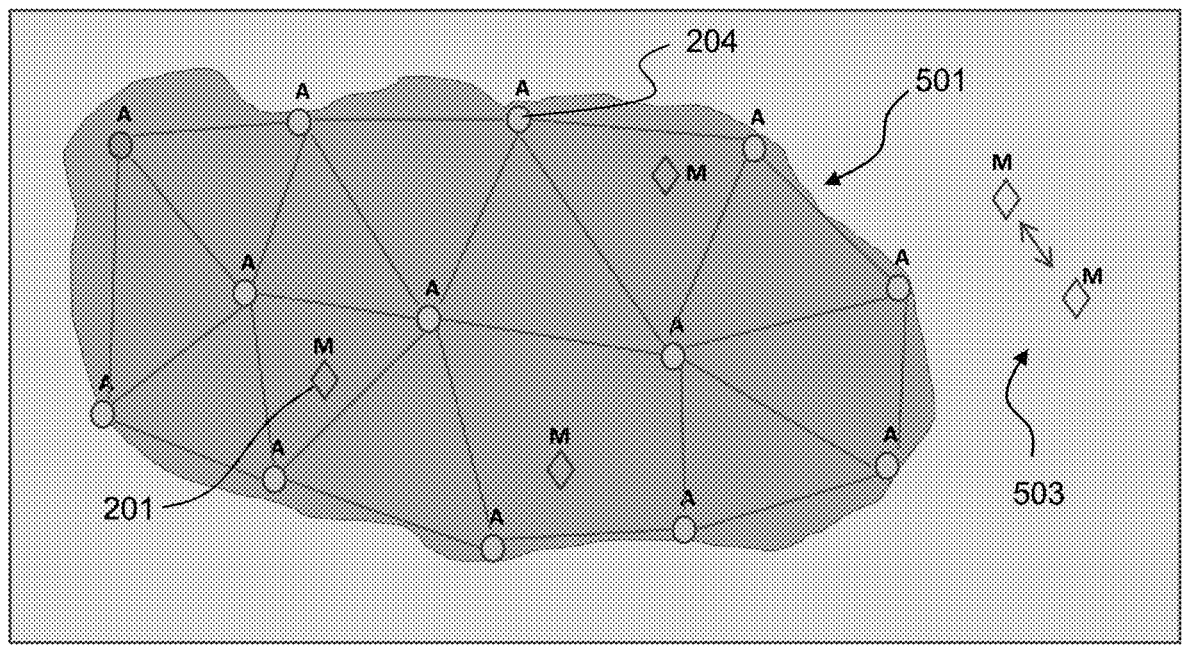
FIG. 10 is a block diagram illustrating an exemplary, non-limiting embodiment of environments where mobile tags can operate from in accordance with various aspects described herein.

FIG. 10 is a block diagram illustrating an exemplary, non-limiting embodiment of environments where mobile tags can operate from in accordance with various aspects described herein. Mobile tags 201 can at certain times operate within a network 501 of anchors 204 (such as described above in relation to FIG. 7) to obtain their location as described above. However, users (or vehicles or other mobile devices) carrying a mobile tag 201 can transition to an open space 503 that is outside of the coverage of the network 501. When this occurs, the mobile tags 204 can be configured to transition to peer-to-peer communications (i.e., tag-to-tag communications) to continue to obtain location information relative to other mobile tags in the open space 503.

Figure 11:
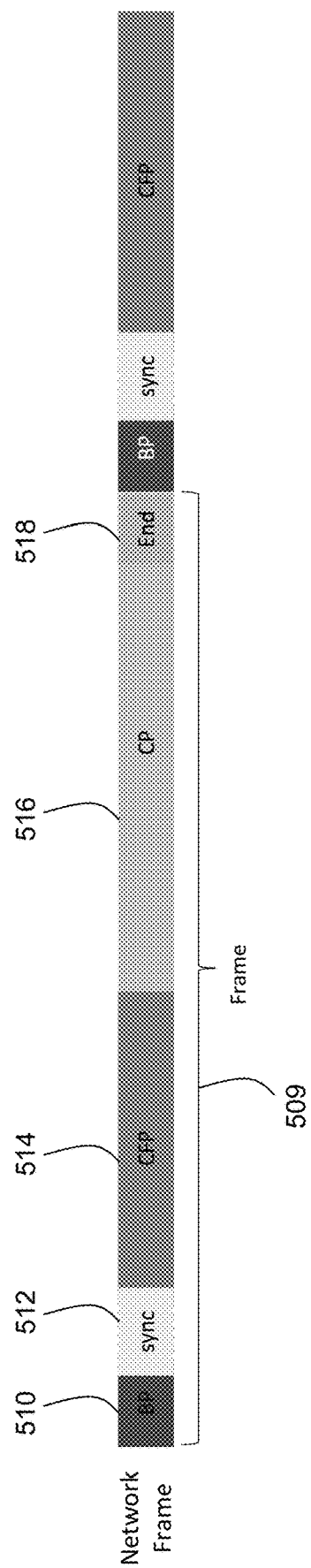
FIG. 11 is a block diagram illustrating an exemplary, non-limiting embodiment of a network frame in accordance with various aspects described herein.

FIG. 11 is a block diagram illustrating an exemplary, non-limiting embodiment of a network frame 509 that can be utilized by the network 501 in accordance with various aspects described herein. The network frame 509 can include a beacon signal 510, a sync period 512, a contention-free period (CFP) 514, a contention period (CP) 516, and an end period 518. The beacon signal 510 is generated by anchors 204 to provide anchors 204 and mobile tags 201 a means for synchronization. The CFP 514 portion of the frame 509 supports downlink TDOA (DL-TDOA) ranging packets, which in turn also supports the anchor pair scheduling depicted in FIG. 9. In the present context, the term "downlink" means communications from anchor to mobile tag, while the term "uplink" means communications from mobile tag to anchor. Transmissions during CFP 514 are scheduled to avoid simultaneous transmissions that lead to wireless signal interference. The CP 516 portion of the frame 509 supports uplink TDOA (UL-TDOA), TW-TOA ranging packets and additional data packets/control signaling packets and can be subject to simultaneous transmissions that in turn may interfere with each other.

The sync period 512 (which can be optional) provides a short buffer period for anchors 204 to synchronize the start of the CFP 514 to each other. The end period 518 (which can be optional) provides a short buffer period for a next frame 509 preparation or can serve as a guard interval for ACK message transmissions. The network frame 509 is periodic as shown by the next repetitive sequence of fields in a subsequent network frame. Various other scheduling and timing, including use of particular frame structures, can be used with the exemplary embodiments of the subject disclosure as described in U.S. Pat. No. 10,779,118, filed Jan. 11, 2019, to Duan et al., the disclosure of which is hereby incorporated by reference herein in its entirety.

Figure 12:
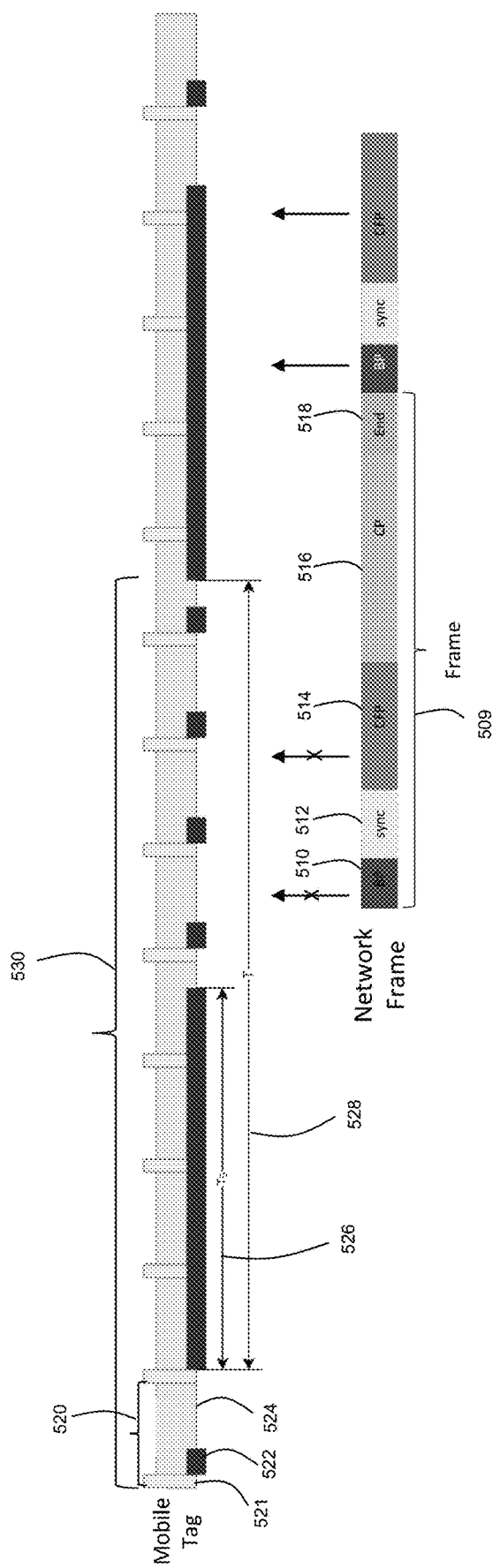
FIG. 12 is a block diagram illustrating an exemplary, non-limiting embodiment of a peer-to-peer frame configured for monitoring a presence of a network frame in accordance with various aspects described herein.

FIG. 12 is a block diagram illustrating an exemplary, non-limiting embodiment of a peer-to-peer frame configured for monitoring a presence of a network frame 509 in accordance with various aspects described herein. The peer-to-peer frame is referred to herein as a peer-to-peer super-frame 530. The peer-to-peer super-frame 530 can include a peer-to-peer sub-frame 520 and a network sub-frame 528. The peer-to-peer sub-frame 520 enables a mobile tag 201 located in the open space 503 of FIG. 10 to perform peer-to-peer range measurements as will be described in relation to FIGS. 14A-14D below. The peer-to-peer sub-frame 520 can include a peer-to-peer beacon signal 521, a ranging period 522, and a listening period 524.

The peer-to-peer beacon signal 521 can be a Bluetooth (or ultra-wideband) signal that a mobile tag 201 broadcasts to other mobile tags 201 to initiate a ranging process to determine the relative location of the mobile tag 201 to other mobile tags 201 in its vicinity. The peer-to-peer beacon signal 521 can be an announcement message and/or synchronization signal to enable other mobile tags 201 to properly initiate a ranging process. During the ranging period 522, the mobile tag 201 can be configured to perform ranging measurements using ultra-wideband signals or other techniques (e.g., RF signal strength indicator (RSSI)). During the listening period 524, the mobile tag 201 can be configured to monitor response messages from other mobile tags 201 in its communication range using a WiFi, Bluetooth (or ultra-wideband) receiver. The peer-to-peer sub-frame 520 is periodic as shown in FIG. 12.

To detect the presence of the network 501 with anchors 204, the mobile tag 201 can be configured to monitor during the network sub-frame 528 for a beacon signal 510 generated by one or more anchors 204 in the network 501. During the network sub-frame 528, the mobile tag 201 can be configured to turn on the ultra-wideband receiver to monitor a beacon signal 510 generated by one or more anchors 204 using an ultra-wideband transmitter. Generally, the ultra-wideband receiver of the mobile tag 201 draws more current than a narrowband receiver, e.g., a Bluetooth receiver. To extend battery life of the mobile tag 201, the mobile tag 201 can be configured to maintain the ultra-wideband receiver on for a period 526 (depicted as $T_S$), which is less than the period (depicted as T) of the network sub-frame 528. The period 526 ($T_S$) can be chosen sufficiently large to enable the mobile tag 201 to detect a beacon signal of at least one network frame 509.

In the illustration of FIG. 12, a first instance of the beacon signal 510 is not detected because it occurs outside the period 526 ($T_S$) in which the ultra-wideband receiver of the mobile tag 201 is enabled to monitor for beacon signals. However, during a second instance of a super-frame 530, a beacon signal from a second instance of a network frame 509 is detected during the period 526 ($T_S$) of the network-subframe 528 of the mobile tag 201. Upon detecting the beacon signal 510, the mobile tag 201 can be configured to extend the period 526 ($T_S$) to enable the mobile tag 201 to receive multiple instances of a beacon signal 510 which enables the mobile tag 201 to synchronize its clock to the network frame 509. Upon achieving synchronization, the mobile tag 201 can be configured to determine whether transitioning from a peer-to-peer communications mode (as depicted in FIG. 12) to a network communications mode (as depicted in FIG. 11) is warranted.

In an embodiment, the mobile tag 201 can be configured to store a coverage map of the network 501. The coverage map can indicate areas in the network 501 where access to anchors 204 is available and not available.

Alternatively, or in combination with the foregoing embodiment, the mobile tag 201 can be configured to receive a message including a coverage map (or portion of the coverage map that represents a vicinity where the mobile tag 201 is located) from at least one anchor 204 after the mobile tag 201 has synchronized to the network frame 509. The mobile tag 201 can also be configured to track a history of its movements from the time it left the network 501 to an open space 503 not inside the wireless coverage area of the network 501. The mobile tag 201 can perform this type of tracking by utilizing an accelerometer, gyroscope, and/or magnetometer (compass) to determine a history of positions from inside the network 501 to an open space 503 and back to the network 501. By tracking a history of positions, the mobile tag 201 can determine where it is in the coverage map of the network 501 and thereby determine whether it is in a communication range of one or more anchors 204 in the network 501. Alternatively, the mobile tag 201 can be configured to try to communicate with one or more anchors 204 and determine from ranging measurements whether it is located in the network 501. In yet another embodiment, the mobile tag 201 may receive messages from anchors 204 during a CFP period and based on the number of messages and quality of messages received during the CFP period determine if it is in the communication coverage of anchors 204 in the network 501.

Figure 13:
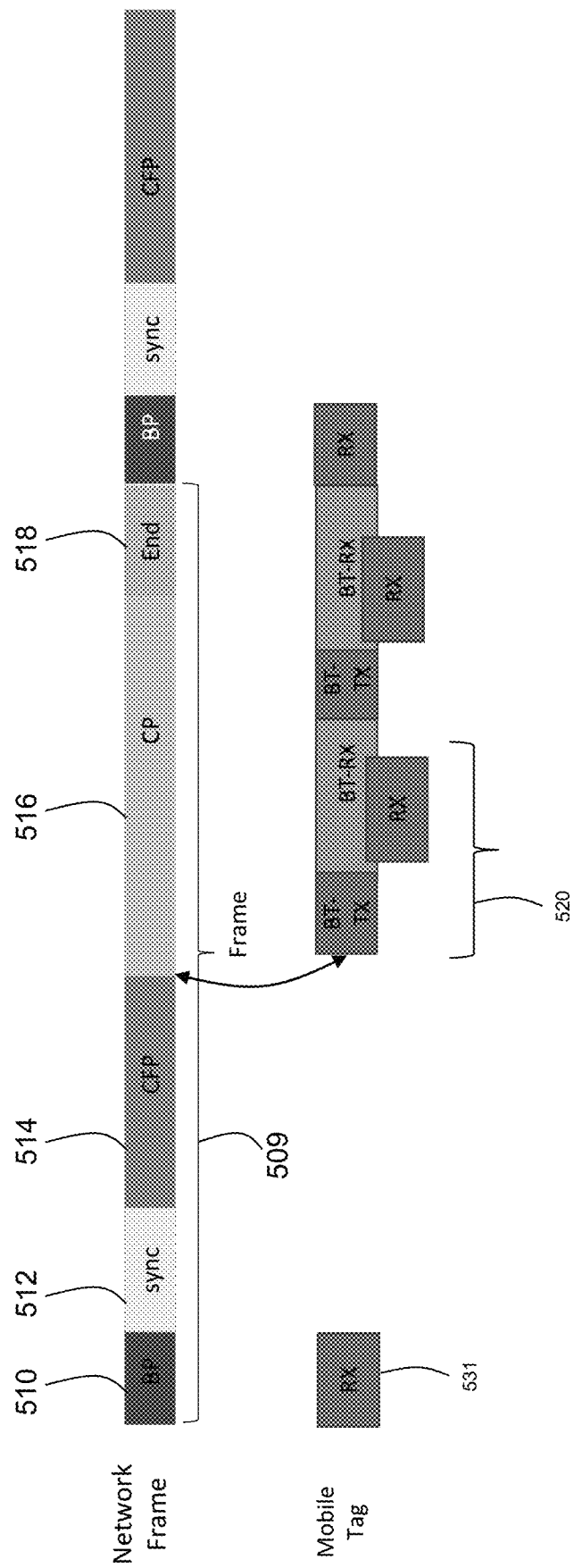
FIG. 13 is a block diagram illustrating an exemplary, non-limiting embodiment of a mobile tag configured to utilize peer-to-peer communications in a manner that avoids interfering with portions of a network frame in accordance with various aspects described herein.

If the mobile tag 201 cannot reliably communicate with anchors 204 in the network 501, or cannot make an accurate measurement of its location relative to one or more anchors, and/or it determines from a coverage map and position history that it is in an area of the network 501 where anchors 204 are not accessible, then the mobile tag 201 can be configured to adjust peer-to-peer mobile tag communications to occur in a position in a network frame 509, which minimizes the chances of causing wireless signal interference with anchors 204 or other mobile tags 201 engaged in a network communications mode as depicted in FIG. 13.

FIG. 13 is a block diagram illustrating an exemplary, non-limiting embodiment of a mobile tag 201 configured to utilize peer-to-peer communications in a manner that avoids interfering with portions of a network frame 509 in accordance with various aspects described herein. To minimize RF interference with anchors 204 and/or other mobile tags 201 operating in a network communications mode, a mobile tag 201 that has insufficient coverage in the network 501 (e.g., cannot access one or more anchors 204) can be configured to maintain peer-to-peer communications in the CP 516 portion (i.e., contention period) of the network frame 509 and maintain synchronicity with the network frame 509 by monitoring the beacon signal 510 via a short listening period 531. Since the CP 516 portion allows for contentions (i.e., RF interference due to simultaneous RF transmissions), contentions caused by the mobile tag 201 performing peer-to-peer communications can be tolerated and will not cause issues with RF transmissions by anchors 204 utilizing the CFP portion 514 (contention-free period) of the network frame 509. The mobile tag 201 can perform this adjustment after it has synchronized its clock to the network frame 509 utilizing the beacon signal 510 as a reference signal. Once the mobile tag 201 has adapted peer-to-peer communications in the CP portion 516 of the network frame 509, the mobile tag 201 can cease to use timing associated with the peer-to-peer super-frame 530 depicted in FIG. 12, and instead resort to utilizing only the sub-frame 520 within the CP portion 516 of the network frame 509.

If, on the other hand, the mobile tag 201 determines that it is in the communication range of a sufficient number of anchors 204 in the network 501 to adequately determine its location in the network 501, then the mobile tag 201 can be configured to fully transition to a network communications mode by ceasing to utilize peer-to-peer communications altogether as depicted in FIG. 12 and rely exclusively on communications with anchors 204 utilizing the network frame 509 of FIG. 11.

Figure 14A:
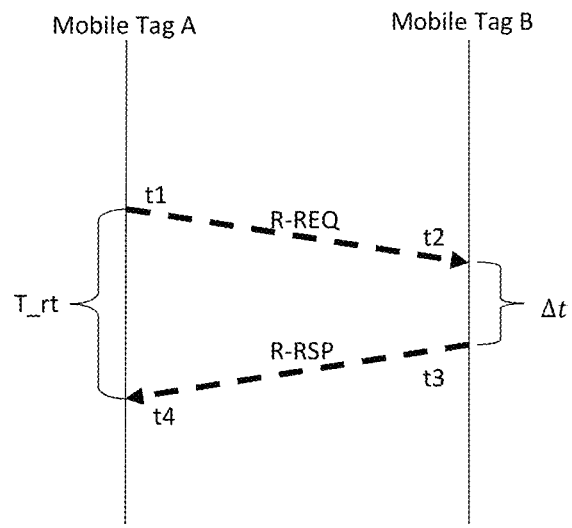
FIGS. 14A, 14B, 14C, 14D, and 14E are block diagrams illustrating exemplary, non-limiting embodiments of peer-to-peer communications for determining a location of a mobile tag in accordance with various aspects described herein.

FIGS. 14A-14D describe various embodiments for peer-to-peer communications that can be applied to the aforementioned embodiments described above. FIG. 14A depicts a two-way time of arrival (TW-TOA) peer-to-peer process for determining distances between mobile tags (mobile tag A and mobile tag B). The process can begin at mobile tag A which transmits a range request (R-REQ) signal to mobile tag B at time $t_1$. Mobile tag B receives the R-REQ signal at time $t_2$. Mobile tag B processes the R-REQ signal for a period of $\Delta t$, and responsive thereto transmits a range response (R-RSP) signal at $t_3$. Mobile tag A receives the R-RSP signal at $t_4$. Mobile tag A can determine a roundtrip distance based on the formula $d_{r\text{-}trip}=d_{AB}+d_{BA}$, where $d_{r\text{-}trip}$ is the roundtrip distance, which is the sum of $d_{AB}$, the distance from mobile tag A to mobile tag B, and $d_{BA}$, the distance from mobile tag B to mobile tag A. The distance from mobile tag A to mobile tag B can be determined by $d_{AB}=c(t_2-t_1)$, where c is the speed of light. Similarly, the distance from mobile tag B to mobile tag A can be determined by $d_{BA}=c(t_4-t_3)$. Substituting the above equations, the roundtrip distance can be rewritten as $d_{r\text{-}trip}=c(t_4-t_3+t_2-t_1)$.

The time $t_0$ process the R-REQ signal and to transmit the R-RSP signal via mobile tag B can be represented as $\Delta t = t_3-t_2$. Mobile tag B can be configured to transmit the value of $\Delta t$ in the R-RSP signal for use by mobile tag A in calculating $d_{r\text{-}trip}$. Substituting $\Delta t$ in $d_{r\text{-}trip}$ results in the formula: $d_{r\text{-}trip}=c(t_4-t_1-\Delta t)$. Since the values of $t_4$, $t_1$, and $\Delta t$ are known to mobile tag A, mobile tag A can readily calculate $d_{r\text{-}trip}$. Mobile tag A can also calculate the distance from mobile tag A to mobile tag B based on the formula: $d_{AB}=d_{r\text{-}trip}/2$. It will be appreciated that mobile tag A can also be configured to know a priori the fixed value of $\Delta t$. In yet another embodiment, the processing time $t_0$ receive the R-REQ signal and respond with the transmission of the R-RSP signal can be a fixed processing time interval known and used by all mobile tags performing TW-TOA analysis. In the foregoing embodiments, the value of $\Delta t$ would no longer need to be transmitted in the R-RSP signal. It will be further appreciated that the R-REQ and the R-RSP signals can be transmitted using ultra-wideband signaling technology to increase the accuracy of the $d_{r\text{-}trip}$ calculations or derivatives thereof. Accordingly, the TW-TOA illustrated in FIG. 14A can be used by either mobile tag A or mobile tag B to calculate a relative distance between each other. This process can be utilized in the embodiments that follow below.

Figure 14B:
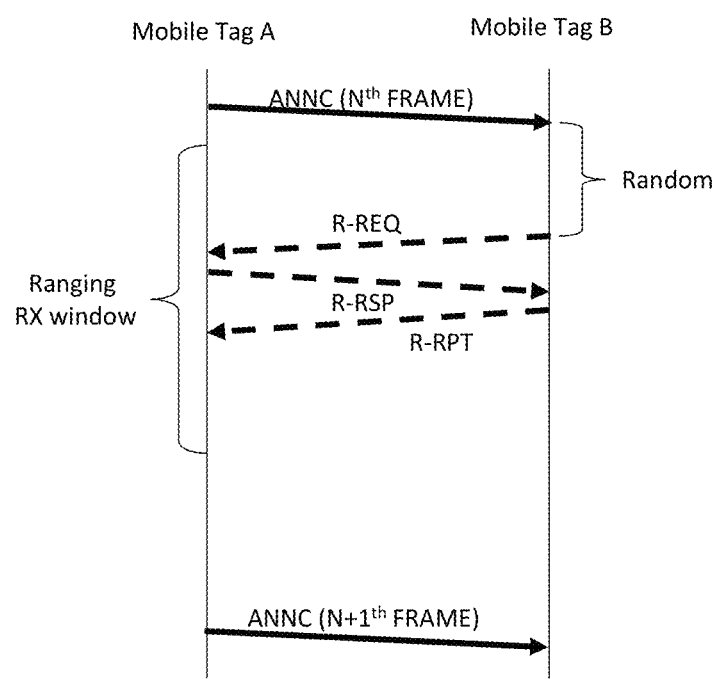

FIG. 14B depicts an exemplary, non-limiting embodiment of a peer-to-peer process for determining location data between mobile tags in accordance with various aspects described herein. In FIG. 14B, mobile tag A can begin by transmitting an announcement wireless signal (ANNC) utilizing a low power narrow band transmitter (such as a Bluetooth transmitter). Upon receiving at mobile tag B, the announcement signal utilizing a narrow band receiver (e.g., Bluetooth receiver), mobile tag B can in response select a random time $t_0$ transmit via a wideband transmitter a range request (R-REQ) signal utilizing a wideband signaling technology (e.g., ultra-wideband signal at high frequencies such as 500 MHz). Mobile tag A can be configured to turn on a wideband receiver (e.g., for receiving ultra-wideband signals) during a ranging RX window as shown in order to receive the R-REQ signal from mobile tag B and/or other mobile tags in a vicinity of mobile tag A that are responding to the announcement signal generated by mobile tag A.

Upon receiving the R-REQ signal, mobile tag A can be configured to enable a wideband transmitter (e.g., for transmitting ultra-wideband signals) to transmit a range response (R-RSP) signal. Mobile tag B can receive the R-RSP signal with a wideband receiver (e.g., for receiving ultra-wideband signals). Upon receiving the R-RSP signal, mobile tag B can determine the round-trip time between the R-REQ signal and the R-RSP signal and thereby determine a distance between mobile tag B and mobile tag A as described in relation to FIG. 14A. The R-RSP signal can include a processing time by mobile tag A to receive R-REQ and thereafter transmit R-RSP ($\Delta t$), or such time can be known to mobile tag B as previously described.

In addition to measuring a relative distance between mobile tags, mobile tag B (or mobile tag A) can be configured with multiple antennas to calculate an angle of arrival of the R-RSP signal based on a phase difference between the antennas. Such angle of arrival can be used to determine an angular orientation between mobile tag B and mobile tag A. By combining the angular orientation with a determination of the distance between mobile tags A and B, mobile tag B can also determine a location and angular orientation of mobile tag A relative to the location of mobile tag B.

Additionally, the announcement signal can be submitted periodically or asynchronously to prompt multiple measurements by mobile tag B (and other mobile tags in a vicinity for receiving the announcement signal) utilizing the process described in FIG. 14B. Distance and angular orientation can be used by mobile tag B (and other mobile tags) to also determine a trajectory of mobile tag A relative to mobile tag B (and vice-versa). Mobile tag B can also be configured to report to mobile tag A location information such as the measured distance, angular orientation, position, and/or trajectory of mobile tag A and/or B via a range report (R-RPT) signal. The R-RPT signal can be a narrow band signal (e.g., Bluetooth) or wideband signal (e.g., ultra-wideband). The trajectory data can be used to predict collisions between mobile tags A and B enabling each mobile tag to take mitigation action such as asserting an alarm at mobile tag B and/or mobile tag A.

Additionally, warning conditions can be provisioned at both mobile tags A and B to determine conformance with a required separation between mobile tags A and B. The warning conditions can be separation thresholds and/or trajectory thresholds. If the warning condition is not satisfied, mobile tags A and/or B can be configured to assert alarms. The alarms can be audible alarms, illuminating alarms (e.g., flashing colored light) or a combination thereof. Additionally, the embodiments depicted by FIG. 14B can be reversed in which mobile tag B is the one originating the announcement signal and mobile tag A calculates its location and/or orientation relative to mobile tag B as described above, and shares the same with mobile tag B.

Figure 14C:
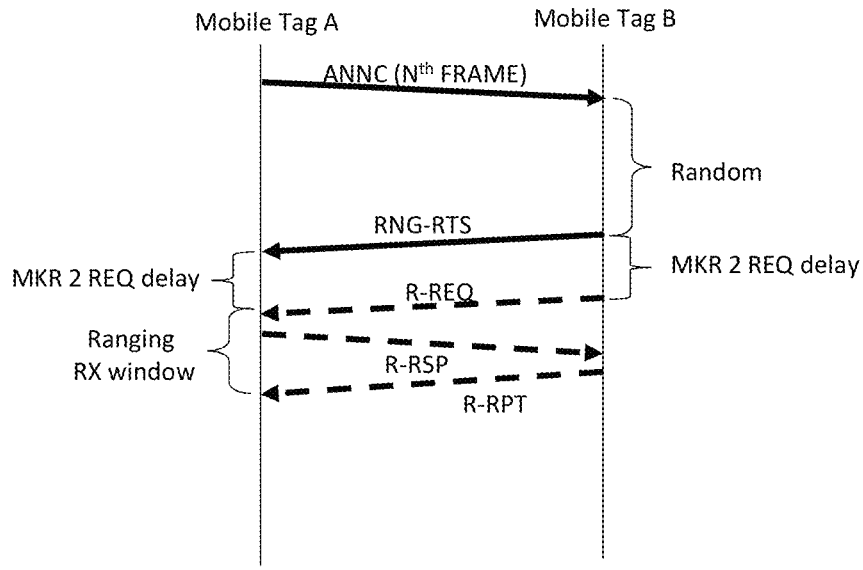

FIG. 14C depicts an adaptation to the embodiments of FIG. 14B. In particular, mobile tag B can be configured to transmit in response to the announcement signal a range ready-to-send (RNG-RTS) signal using narrow band signaling technology such as Bluetooth. The RNG-RTS signal can include timing information that indicates when mobile tag B will transmit the R-REQ signal. By knowing this timing, mobile tag A can substantially reduce the ranging RX window (which saves battery life of mobile tag A) by knowing the arrival time of the R-REQ signal and a predetermined time for receiving the R-RPT signal. If an R-RPT signal is not expected, mobile tag A can shorten the ranging RX window even further and thereby further improve battery life. The location and/or orientation measurements can be performed by mobile tag B as previously described in relation to FIG. 14B.

Figure 14D:
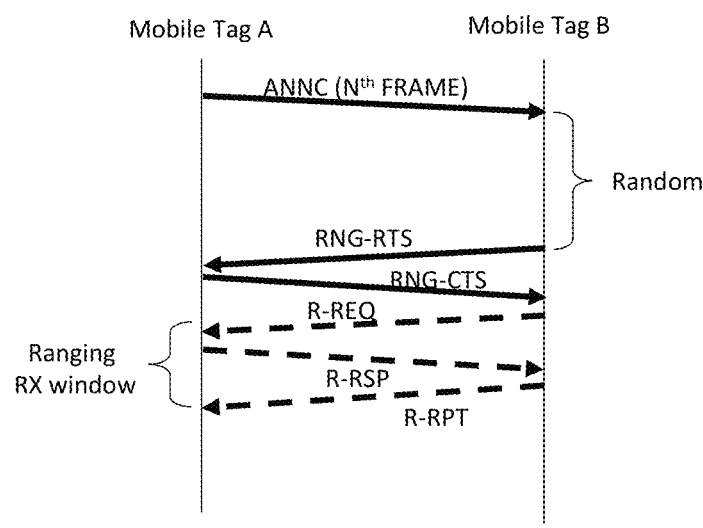

FIG. 14D depicts an adaptation to the embodiments of FIGS. 14B-14C. In this illustration, mobile tag A can be configured to transmit in response to the RNG-RTS signal a ranging clear-to-send (RNG-CTS) signal using narrow band signaling technology such as Bluetooth. The RNG-CTS signal can include timing information that indicates when mobile tag B should transmit the R-REQ signal. In this embodiment, mobile tag A can control the initial transmission time of the R-REQ signal thereby enabling mobile tag A to limit the size of the ranging RX window, reduce current draw from the ultra-wideband transceiver and thereby improve battery life of mobile tag A. The previously described embodiments of FIGS. 14B-14C are applicable to FIG. 14D for performing location and/or orientation measurements by mobile tag B and sharing such information with mobile tag A via the R-RPT signal.

Figure 14E:
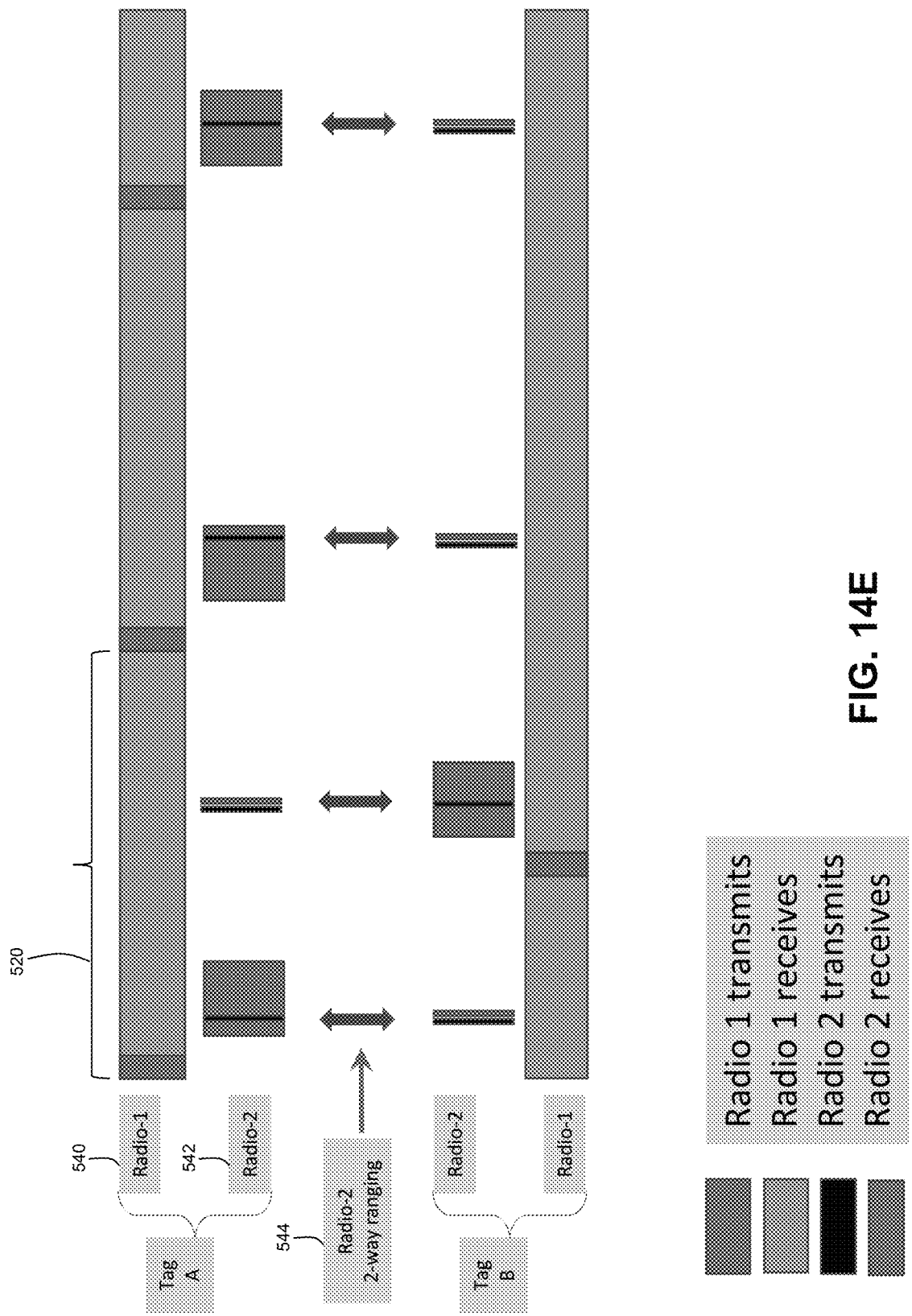

FIG. 14E temporally depicts illustrations of peer-to-peer communications between mobile tags based on transmission and reception intervals for achieving the embodiments described in relation to FIGS. 14A-14D. Each mobile tag is equipped with two radios (radio-1 540 and radio-2 542). Radio-1 540 is configured to transmit and receive Bluetooth signals, while radio-2 542 is configured to transmit and receive ultra-wideband signals. Since Bluetooth signals are narrow band signals, Bluetooth operations expend less power than ultra-wideband signals. Accordingly, utilizing a Bluetooth radio, when possible, can extend battery life of the mobile tags. FIG. 14E also depicts components of the peer-to-peer super-frame 530 previously described in FIG. 12 for performing peer-to-peer range measurements 544. As described in FIG. 12, peer-to-peer sub-frames 520 can be combined with the network sub-frame 528 to form a peer-to-peer super-frame 530, which enables a mobile tag 201 to perform peer-to-peer range measurements with other mobile tags 201 while monitoring for a presence of network anchors (not shown in FIG. 14E) that can trigger a process for transitioning a network communications mode as will be described further in relation to method 600 of FIG. 17.

Figure 15:
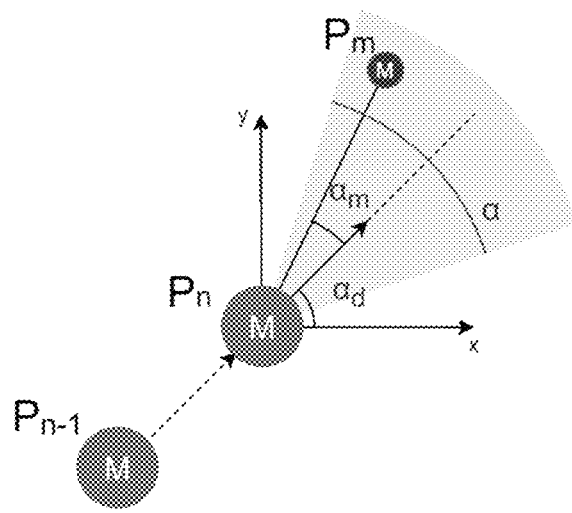
FIG. 15 is a block diagram illustrating an exemplary, non-limiting embodiment of capabilities of a mobile tag to determine its location in a network of anchors providing location services in accordance with various aspects described herein.

FIG. 15 is a block diagram illustrating an exemplary, non-limiting embodiment of capabilities of a mobile tag 201 to determine its location in a network of anchors providing location services in accordance with various aspects described herein. In the illustration of FIG. 15, a mobile tag 201 located in the network 501 of anchors 204 and operating in a network communications mode (i.e., exclusively performing ranging measurements with anchors 204) can determine its relative position to another mobile tag 201 and, based on a history of positions ($P_{n-1}$ to $P_n$), its angular trajectory relative to the other mobile tag 201. Such angular trajectory can be used to assert alarms to avoid collisions, enforce social distancing, and/or other policies set by an administrator of the mobile tags 201 and/or network 501 of anchors 204.

Figure 16:
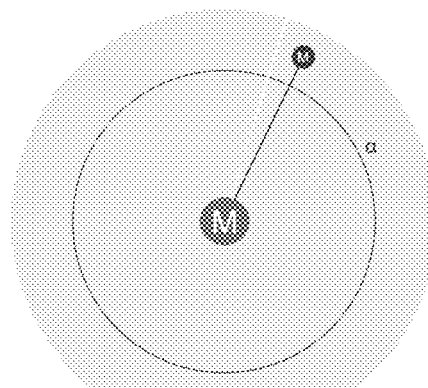
FIG. 16 is a block diagram illustrating an exemplary, non-limiting embodiment of capabilities of a mobile tag to determine its location utilizing peer-to-peer communications with other mobile tags in accordance with various aspects described herein.

FIG. 16 is a block diagram illustrating an exemplary, non-limiting embodiment of capabilities of a mobile tag 201 to determine its location utilizing peer-to-peer communications with other mobile tags 201 in accordance with various aspects described herein. In the illustration of FIG. 16, the mobile tag 201 is limited to determining its relative location to another mobile tag 201 without trajectory information or angular orientation. In an alternative embodiment, the mobile tag 201 can perform the functions described in relation to FIG. 15 with instrumentation such as one or more accelerometers, one or more gyroscopes, and/or a magnetometer. With such instrumentation, a mobile tag 201 can utilize as a reference point a last known location of the mobile tag 201 while in the network 501 of anchors 204 and determine thereafter utilizing the instrumentation a history of positions ($P_{n-1}$ to $P_n$) and its angular trajectory relative to another mobile tag 201 utilizing similar instrumentation.

FIG. 17 depicts an illustrative embodiment of a method 600 for transitioning between modes of communications; particularly, peer-to-peer communications mode and network communications mode in accordance with various aspects described herein. Method 600 can begin with step 602 where a mobile tag can be configured to monitor a beacon signal while in a peer-to-peer communications mode utilizing, for example, the peer-to-peer super-frame 530 (and corresponding network sub-frame 528) shown in FIG. 12. As noted earlier, the peer-to-peer communication mode may be invoked when the mobile tag 201 transitions out of the coverage area of the network 501 of anchors 204 into an open space 503 or when the mobile tag 201 is located in the network 501 in an area that lacks coverage from anchors 204, which causes the mobile tag 201 to resort to the embodiment described in relation to FIG. 13.

Upon detecting a beacon signal at step 604 while in a peer-to-peer communications mode, the mobile tag 201 can proceed to step 606 where it determines if a threshold of instances of a beacon signal has been satisfied (e.g., a threshold set to greater than 2 consecutive beacon signals). If the threshold is not satisfied, the mobile tag 201 can be configured to return to step 602 and continue the monitoring process. If the threshold is satisfied, the mobile tag 201 can be configured at step 608 to synchronize its clock to the network frame 509 of FIG. 11 utilizing one or more instances of the beacon signal. In an embodiment, synchronization can take place during one or more instances of the synchronization period 512. Once synchronized, the mobile tag 201 can proceed to step 610 to determine if there is sufficient coverage in the network 201 to transition to a network communications mode (i.e., performing ranging measurements exclusively with the assistance of one or more anchors 204).

In one embodiment, the coverage determination of step 610 can be performed by the mobile tag 201 by comparing its location to a look-up table (or database) of sub-coverage areas in the network 501 (not shown in FIG. 10). If the mobile tag 201 has instrumentation to reasonably determine where it is located within the network 501, such location information may be sufficient for the mobile tag 201 to determine from a look-up table (or database) whether it is in an area of the network 501 where it has sufficient access to anchors 204 to safely transition to a network communications mode, or whether it should transition to an adjusted peer-to-peer communications mode as depicted FIG. 13. The look-up table (or database) can be provided by one or more anchors at a previous time when the mobile tag 201 was located in the network 501 and operating in a network communications mode or from another source (e.g., mobile tag 201 paired with a communication device such as a smartphone that can communicate with a server of the network 501 via a cellular network or other communication means). In another embodiment, the mobile tag 201 can be configured to receive one or more messages from one or more anchors 204 transmitting its location in the network 501, which the mobile tag 201 can then compare to the look-up table (or database) to determine if it is in a location that supports a safe transition to a network communications mode. In another embodiment, the mobile tag 201 may receive one or more messages from one or more anchors 204 in the network 501 during the CFP period, which the mobile tag 201 can use to determine if it is able to transition to a network communications mode based on the number of messages and/or quality of the received messages from anchors 204 in the network 501 during the CFP period. For example, the quality of messages can be determined from a number of consecutive received messages exceeding a signal strength threshold. Such measurements can enable a mobile tag 201 to determine if there is sufficient (or insufficient) coverage in the network 501 of anchors 204 to transition from peer-to-peer communications to network communications or remain in peer-to-peer communications but operate in the mode shown in FIG. 13.

If the mobile tag 201 detects at step 610 that there is insufficient coverage in the network 501 relative to its current location to transition to a network communications mode, then the mobile tag 201 can proceed to step 612 where the mobile tag 201 can transition from a peer-to-peer communications mode as depicted in FIG. 12 to an adjusted peer-to-peer communications mode as shown in FIG. 13 (or maintain this adjusted communications mode if the mobile tag 201 had already previously implemented step 612). Alternatively, if the mobile tag 201 detects at step 610 that there is sufficient coverage to transition to a network communications mode, the mobile tag 201 can transition from a peer-to-peer communications mode as depicted in FIG. 12 to a network communications mode depicted by FIG. 11 where it performs ranging measurements exclusively with the assistance of anchors 204 of the network 501.

Once the transition from a peer-to-peer communications mode to a network communications mode occurs at step 614, the mobile tag 201 can be configured to monitor a lack of a presence of a beacon signal generated by the anchors 204 of the network 501. If the number of instances where the mobile tag 201 detects a lack of a beacon signal satisfies a threshold (greater than 2 consecutive lost beacon signals), the mobile tag 201 can transition to step 618 where it transitions from a network communications mode as depicted in FIG. 11 to a peer-to-peer communications mode as depicted by FIG. 12, and begins to monitor at step 602 for a presence of a beacon signal to transition back to the network communications mode once the instances of beacon signals satisfies the threshold of step 606 as previously described. If no lost beacon signals are detected at step 616, the mobile tag 201 can proceed to step 610 to determine if there's sufficient coverage to remain in the network communications mode at step 614. If the mobile tag 201 determines at step 616 that there is insufficient coverage, then the mobile tag 201 can proceed to step 612 and perform peer-to-peer communication as previously described above.

While for purposes of simplicity of explanation, the respective processes are shown and described as a series of blocks in FIG. 17, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 18A:
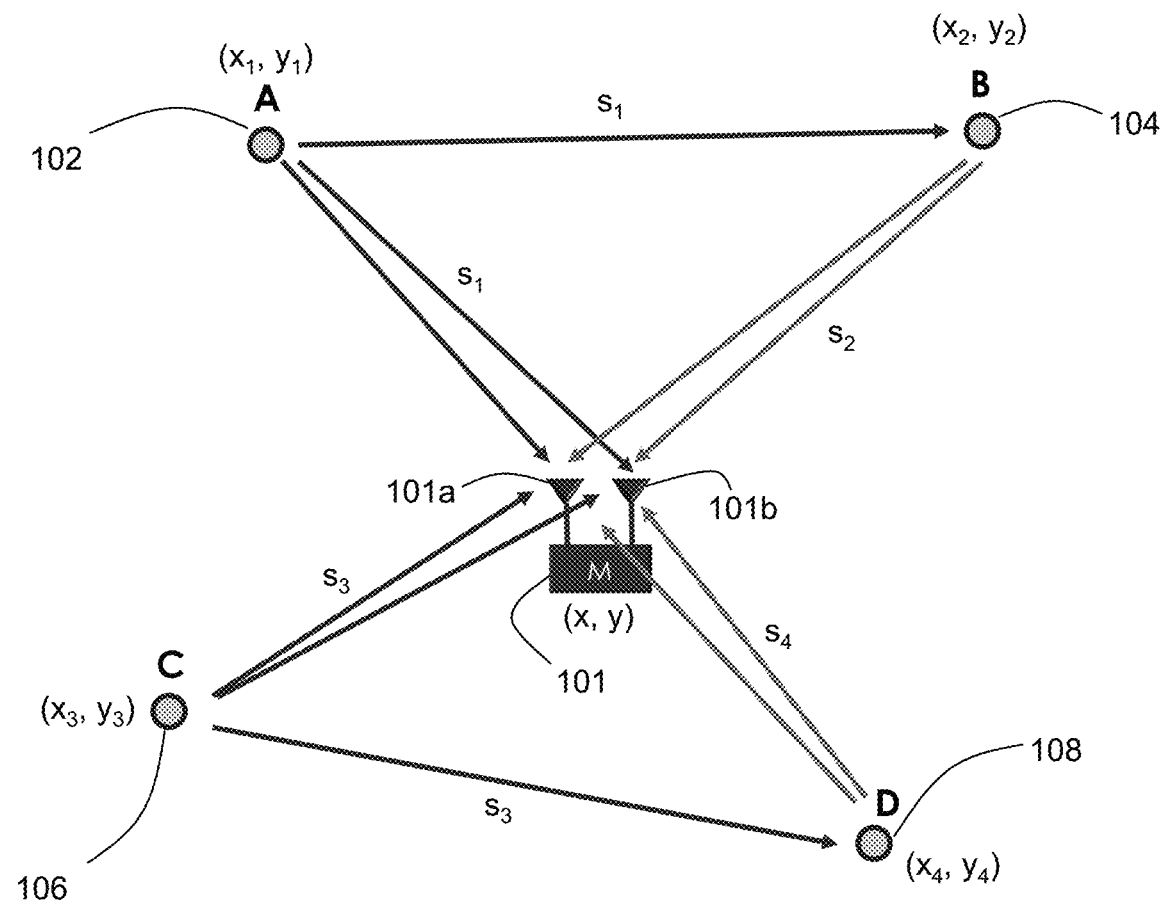
FIG. 18A is a block diagram illustrating an exemplary, non-limiting embodiment for determining location information between a mobile tag and pairs of anchors in accordance with various aspects described herein.

Exemplary embodiments, described herein, provide a system and method for determining the location of a mobile tag based on TDOA and AOA information (e.g., a combination of TDOA and AOA information). FIG. 18A is a block diagram illustrating an exemplary, non-limiting embodiment of a system 700 that includes the mobile tag 101 ("M") and the anchors 102 ("A"), 104 ("B"), 106 ("C"), and 108 ("D") (e.g., described above in relation to FIGS. 1-3 and 4A-4C) for determining the location of the mobile tag 101—e.g., relative to one or more of the anchors 102, 104, 106, and 108. System 700 can include any number of mobile tags and anchors, and thus the mobile tag and anchors shown in FIG. 18A is for illustrative purposes only. For example, system 700 may include more mobile tags and/or more or fewer anchors.

Figure 18B:
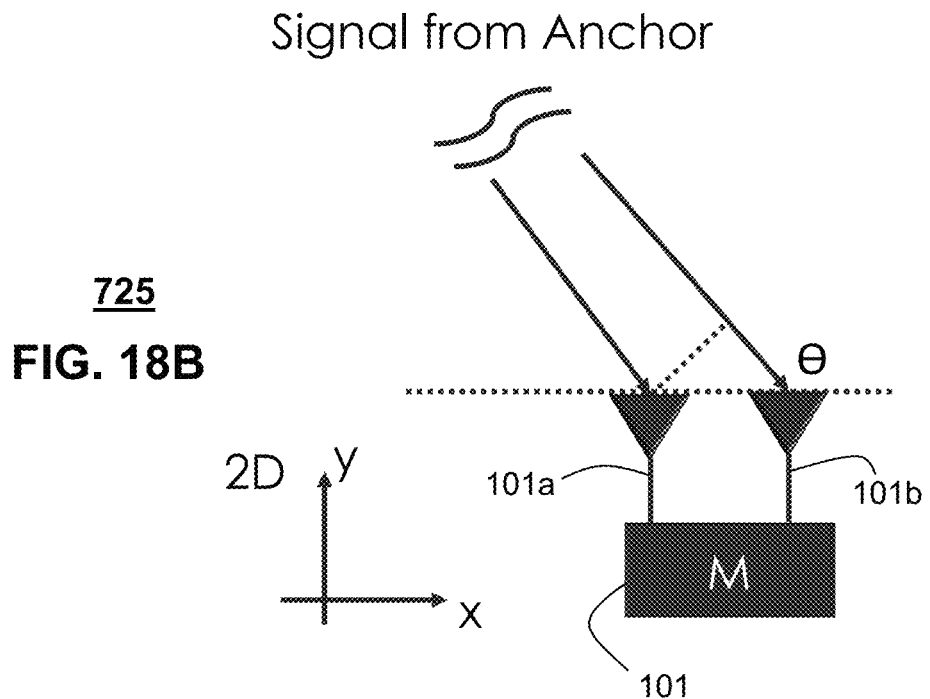
FIG. 18B is a block diagram illustrating an exemplary, non-limiting embodiment of a mobile tag having two antennas for facilitating determining of location information of the mobile tag in accordance with various aspects described herein.

As shown in FIG. 18A, the mobile tag 101 may include two antennas— e.g., an antenna 101a and an antenna 101b. In some embodiments, the mobile tag 101 may include additional antennas, such as three antennas (e.g., as depicted in FIG. 18B and described in more detail below) or more. In certain embodiments, the antennas may be included in an antenna array.

The antennas 101a and 101b may be configured to transmit and receive wireless signals (or packets) at a certain frequency or frequency range. In certain embodiments, the antennas 101a and 101b may be spatially distributed, or spaced apart from one another, on the mobile tag 101 by a distance of less than or equal to half of the wavelength (212) of the wireless signal frequency.

Although not shown, the antennas 101a and 101b may be communicatively coupled to a processing unit (e.g., a radio frequency (RF) front-end or the like). In some embodiments, the antennas 101a and 101b may be communicatively coupled to a single or common processing unit. In certain embodiments, the antennas 101a and 101b may be communicatively coupled to different processing units (where, for example, clocks of the processing units may or may not be synchronized).

As depicted in FIG. 18A, each of the antennas 101a and 101b can be configured to receive wireless signals transmitted by the anchors 102 and 104 (e.g., a first pair of anchors), such as the first and second wireless signals ($S_1$, $S_2$) described above in relation to FIGS. 1 and 2, as well as wireless signals transmitted by one or more other anchors or pairs of anchors, such as third and fourth wireless signals ($S_3$, $S_4$) transmitted by the anchors 106 and 108 (e.g., a second pair of anchors). In various embodiments, such as in a case where (e.g., only) a single pair of anchors in system 700, such as anchors 102, 104, is selected to transmit wireless signals (e.g., wireless signals ($S_1$, $S_2$)) for purposes of estimating a present location of the mobile tag 101, the antennas 101a and 101b may receive wireless signals from (e.g., only) that pair of anchors.

By virtue of the different positions of antennas 101a and 101b on the mobile tag 101, the antennas may receive a given wireless signal from an anchor at (e.g., slightly) different times. This is depicted in FIG. 18A as two arrows representing a different line-of-sight (LOS) for each of the first, second, third, and fourth wireless signals ($S_1$, $S_2$, $S_3$, $S_4$). In a case where the antennas 101a and 101b are spaced apart by a short distance, such as less than or equal to half of the wavelength ($\lambda/2$) of the wireless signal frequency, information regarding a direction of an incoming wireless signal, such as an angle of arrival (AOA) of the wireless signal can be estimated or calculated. In exemplary embodiments, and as described in more detail below, AOA information can be further leveraged to determine or estimate a location of the mobile tag 101.

Figure 18C:
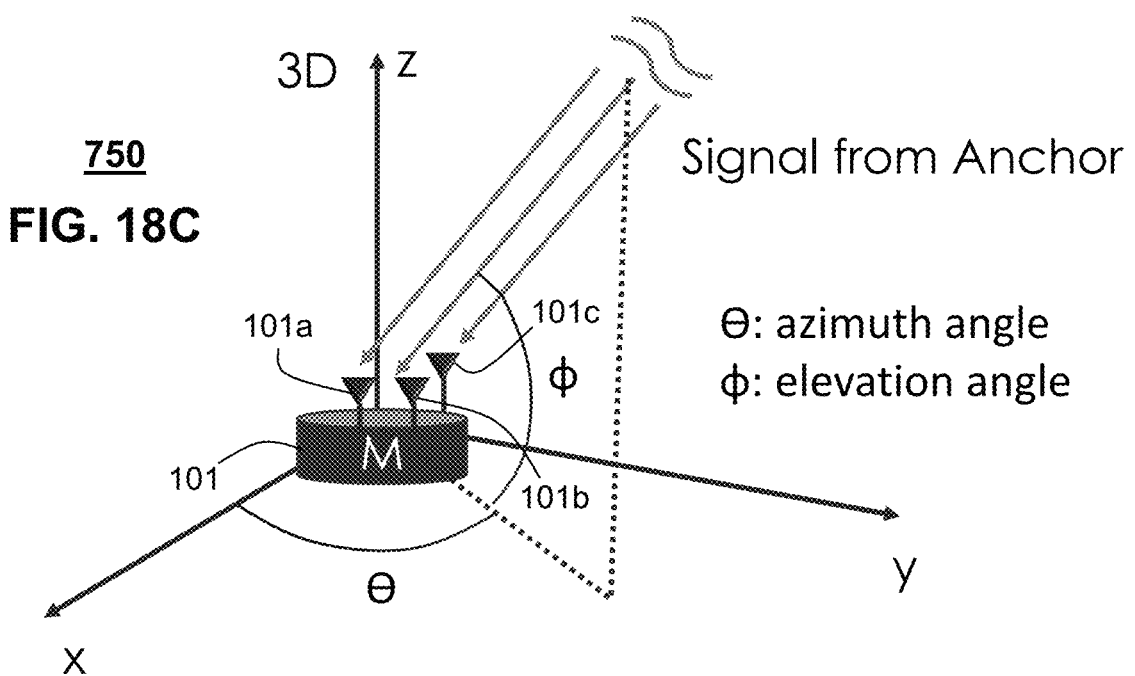
FIG. 18C is a block diagram illustrating an exemplary, non-limiting embodiment of a mobile tag having three antennas for facilitating determining of location information of the mobile tag in accordance with various aspects described herein.

FIGS. 18B and 18C show example block diagrams of the mobile tag 101 configured with two antennas (block diagram 725) and three antennas (block diagram 750), respectively. As shown in FIG. 18B, a wireless signal, transmitted by an anchor, may be received at each of the two antennas 101a, 101b of the mobile tag 101, which can enable estimation of an AOA of the wireless signal in two-dimensional (2D) space (e.g., an azimuth angle θ in the x-y plane). For a mobile tag 101 that is configured with three or more antennas (e.g., as depicted in FIG. 18C), a wireless signal, transmitted by an anchor, may be received at each of the three antennas 101a, 101b, 101c, which can enable estimation of additional AOA information—e.g., both an azimuth angle θ (in the x-y plane) and an elevation angle 4) (with respect to (e.g., above) the x-y plane).

The AOA of a wireless signal transmitted by an anchor and received by each of multiple antennas of the mobile tag 101, can be estimated or determined using any suitable technique. For example, estimation of AOA can be performed using beamforming approaches (e.g., the Bartlett method, the Minimum variance distortionless response (MVDR) beamformer solution, linear prediction, and/or the like), subspace-based approaches (e.g., MUltiple SIgnal Classification (MUSIC) and/or variants thereof, Estimation of Signal Parameters via Rotational Invariant Techniques (ESPRIT), and/or the like), maximum likelihood estimation, etc.

In various embodiments, AOA information (e.g., azimuth angle θ and/or elevation angle ϕ)) for a given anchor, can be estimated or determined individually— that is, where the azimuth angle θ (and/or the elevation angle ϕ)) is estimated using only wireless signal information for that anchor. In some embodiments, AOA information (e.g., azimuth angle θ and/or elevation angle ϕ)) for each of multiple anchors, can be jointly estimated or determined—that is, where, for example, AOA estimation technique(s) are applied to a combination of the wireless signal information for the multiple anchors, to arrive at individual AOA information (e.g., individual azimuth angle θ and/or elevation angle ϕ)) for each of the multiple anchors.

As briefly described above with respect to FIG. 18A, estimated AOA information (azimuth angle θ and/or elevation angle ϕ)) can be leveraged to determine a location of the mobile tag 101. This is possible based on geometric relationships that exist between the location of the mobile tag 101 and the azimuth angle θ and/or the elevation angle ϕ).

In a case where the mobile tag 101 includes two antennas (e.g., as depicted in FIG. 18B), and using the first and second wireless signals (S$_1$, S$_2$) (transmitted by the pair of anchors 102, 104) as an example, the relationship between azimuth angle 9 of the first wireless signal (S$_1$) (e.g., azimuth angle θ$_1$) and the locations of the anchor 102 and the mobile tag 101 in 2D space can be represented as $$\tan\theta_1 = \frac{y_1 - y}{x_1 - x}, \quad (EQ\ 14)$$

where θ$_1$, x$_1$, and y$_1$ may be known, and the relationship between azimuth angle θ of the second wireless signal (S$_2$) (e.g., azimuth angle θ$_2$) and the locations of the anchor 104 and the mobile tag 101 in 2D space can be similarly represented as $$\tan\theta_2 = \frac{y_2 - y}{x_2 - x}, \quad (EQ\ 15)$$

where θ$_2$, x$_2$, and y$_2$ may be known.

In a case where the mobile tag 101 includes three or more antennas (e.g., as depicted in FIG. 18C), and using the first and second wireless signals (S$_1$, S$_2$) (transmitted by the pair of anchors 102, 104) as another example, both of EQs 14 and 15 may apply for the respective azimuth angles θ$_1$ and θ$_2$ of the first and second wireless signals (S$_1$, S$_2$), and additional mathematical relationships may exist for the elevation angle ϕ) for each of the first and second wireless signals (S$_1$, S$_2$). For example, the relationship between an elevation angle θ$_1$ for the first wireless signal (S$_1$) and the locations of the anchor 102 and the mobile tag 101 in three-dimensional (3D) space can be represented as $$\tan\phi_1 = \frac{z_1 - z}{\sqrt{(x - x_1)^2 + (y - y_1)^2}}, \quad (EQ\ 16)$$

where ϕ$_1$, x$_1$, y$_1$, and z$_1$ may be known, and the relationship between an elevation angle ϕ$_2$ for the second wireless signal (S$_2$) and the locations of the anchor 104 and the mobile tag 101 in 3D space can be similarly represented as $$\tan\phi_2 = \frac{z_2 - z}{\sqrt{(x - x_2)^2 + (y - y_2)^2}}, \quad (EQ\ 17)$$

where ϕ$_2$, x$_2$, y$_2$, and z$_2$ may be known.

As described above with respect to FIGS. 1 and 2, a (e.g., downlink) TDOA measurement technique can be used to determine a location of the mobile tag 101. In particular, location data relating to a pair of anchors (e.g., the pair of anchors 102 and 104) and receipt, by the mobile tag 101, of wireless signals transmitted from the anchors (e.g., the first and second wireless signals (S$_1$, S$_2$)), can be mathematically represented by EQs 4C, 5, and 6 above. Substituting a 3D version of Δd$_1$ in EQ 6 with c(t$_4$−t$_1$−Δt)−d$_{AB}$ (where the location (x$_1$, y$_1$, z$_1$) of anchor 102 and the location (x$_2$, y$_2$, z$_2$) of anchor 104 may be known) results in $$c(t_4 - t_1 - \Delta t) = \sqrt{(x - x_2)^2 + (y - y_2)^2} \\ \sqrt{(x - x_1)^2 + (y - y_1)^2 + (z - z_1)^2} + d_{AB} \quad (EQ\ 18).$$

In exemplary embodiments, a location of the mobile tag 101 can be determined based on a combination of both TDOA information and AOA information. Stated differently, the geometric relationships between the AOA information and the location of the mobile tag 101 can be combined with TDOA information to jointly estimate the location of the mobile tag 101. In various embodiments, the combination can be implemented by solving a system of equations that includes the relevant equations defined above.

As an example, in a case where the mobile tag 101 includes two antennas, as depicted in FIG. 18B, the system of equations can include EQs 14, 15, and 18 above. In this example, distance measurements may be performed in 3D space, a height z (in EQ 18) of the mobile tag 101 may be known, and solving EQs 14, 15, and 18 above can yield a location (x, y) of the mobile tag 101.

As another example, in a case where the mobile tag 101 includes three antennas, as depicted in FIG. 18C, the system of equations can include EQs 14, 15, 16, 17, and 18 above. In this example, a height z of the mobile tag 101 may be unknown, and solving EQs 14, 15, 16, 17, and 18 above can yield a location (x, y, z) of the mobile tag 101.

The systems of equations (e.g., the system of EQs 14, 15, and 18 and the system of EQs 14, 15, 16, 17, and 18) can be solved in any suitable manner. For example, each system of equations can be solved by utilizing nonlinear least-squares, weighted least squares, Kalman filtering, and/or the like.

It is to be appreciated and understood that EQs 14, 15, 16, and 17 above are provided only as examples. Other equations (e.g., trigonometric formulas) that represent the same or similar geometric relationships between the mobile tag 101 and the anchors 102 and 104 can be used. For example, in a case where the mobile tag 101 includes two antennas (as depicted in FIG. 18B), trigonometric formulas other than those based on the tangent function (i.e., EQs 14 and 15) can be used to define the relationships between the azimuth angle $\theta$ and the (x, y) coordinate. As another example, in a case where the mobile tag 101 includes three antennas (as depicted in FIG. 18C), trigonometric formulas other than those based on the tangent function (i.e., EQs 14, 15, 16, and 17) can be used to define the relationships between the azimuth angle $\theta$, the elevation angle $\phi$), and the (x, y, z) coordinate.

Combining TDOA information and AOA information to estimate the location of a mobile tag (such as the mobile tag 101), as described above, can provide improved (or optimized) accuracy as compared to estimating the location using only TDOA information.

In some embodiments, additional anchor pairs may be employed to further aid in the estimation of the location of the mobile tag. For example, in a case where the mobile tag 101 includes two antennas (as depicted in FIG. 18B), and where a second pair of anchors (e.g., anchors 106 and 108) transmits wireless signals (e.g., wireless signals $S_3$ and $S_4$) to the mobile tag 101, an additional set of equations, similar to EQs 14, 15, and 18, may be defined for the geometric and time-based relationships between the anchors 106, 108 and the mobile tag 101. This additional set of equations may, along with EQs 14, 15, 18 (relating to anchors 102, 104), be solved—e.g., using nonlinear least-squares, weighted least squares, Kalman filtering, and/or the like—to arrive at an estimated location (x, y) of the mobile tag 101. It is worth noting, however, that the improved accuracy of the estimated location of the mobile tag 101 provided by employing the above-described combination of TDOA information and AOA information for a single pair of anchors (e.g., just anchors 102 and 104), may obviate a need to utilize multiple anchor pairs for a particular location estimation. That is, for purposes of determining a present location of a mobile tag (e.g., the mobile tag 101), wireless signals from other anchor pairs, such as anchors 106, 108, may not be necessary. This reduces or eliminates a need to provide vast coverage for a mobile tag, such as may otherwise be required if only TDOA information is used to estimate the location of the mobile tag (e.g., using only TDOA information to estimate the location of a mobile tag may require the use of at least three pairs of anchors, as described above in relation to FIGS. 1-3 and 4A-4C). Less restrictive (or less stringent) coverage requirements decreases the quantity of anchors that need to be involved for any given mobile tag location estimation, and thus allows for more efficient scheduling of anchor pairs. This can reduce the quantity of wireless signals being transmitted and received across a network of anchors and mobile tags, which conserves computing resources, power resources, and network resources, and also improves overall network performance.

Furthermore, obtaining AOA information (e.g., as described above with respect to FIGS. 18A-18C) for a mobile tag can further facilitate collision mitigation between the mobile tag and other mobile tags. For example, in some embodiments, the mobile tag 101 can provide, to a second mobile tag (e.g., as part of peer-to-peer communications described above in relation to FIG. 12), AOA information estimated based on wireless signals received from anchors 102 and 104. In this example, the second mobile tag may utilize this information to determine a direction of the mobile tag 101 relative to the second mobile tag, and may, in conjunction with distance and/or speed measurements relating to the mobile tag 101 and the second mobile tag, determine whether there is any risk of collision with the mobile tag 101.

Figure 19:
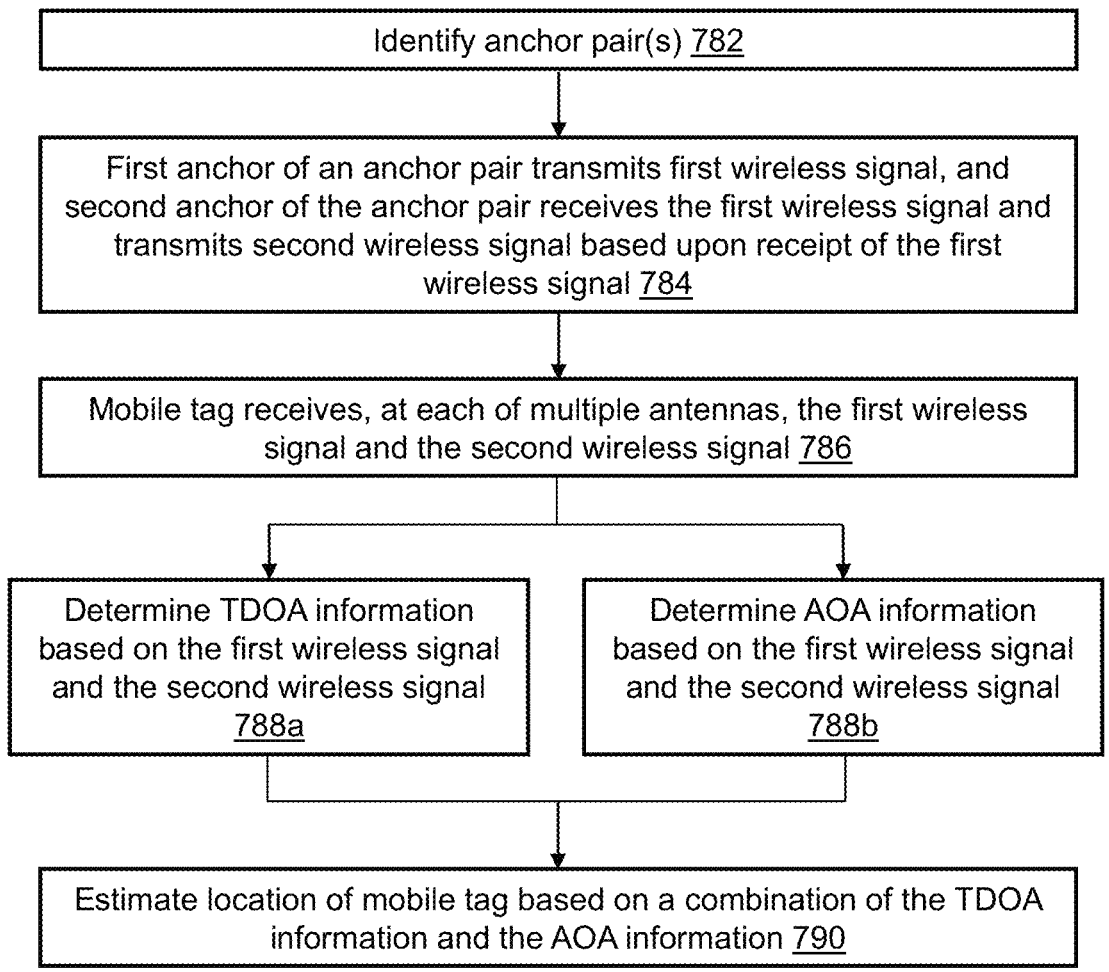
FIG. 19 depicts an illustrative embodiment of a method for determining location information in accordance with various aspects described herein.

FIG. 19 depicts an illustrative embodiment of a method 780 in accordance with various aspects described herein. Method 780 can begin at step 782, where anchor pair(s) (e.g., anchor pair 102, 104 of FIG. 18A), in a network of anchors, are identified. In various embodiments, anchors pairs may be identified in a manner similar to that described above with respect to step 302 of FIG. 8. Anchors of an anchor pair (e.g., anchor pair 102, 104) may be within communication range with one another, where an overlapping coverage region thereof may encompass the two anchors and a mobile tag (e.g., the mobile tag 101 or 201). In various embodiments, and as described above with respect to step 304 of FIG. 8, the anchor pair may transmit wireless signals in accordance with a transmission schedule to avoid signal collisions.

At step 784 of method 780, a first anchor of the anchor pair may transmit a first wireless signal, where a second anchor of the anchor pair may receive the first wireless signal and transmit a second wireless signal based upon receipt of the first wireless signal. For example, anchor pair 102 may transmit the first wireless signal $S_1$, where the anchor pair 104 may receive the first wireless signal $S_1$ and transmit the second wireless signal $S_2$ based upon receipt of the first wireless signal $S_1$, as described above with respect to FIGS. 1, 2, and 18A.

At step 786, the mobile tag may receive, at multiple antennas, the first wireless signal and the second wireless signal. For example, an embodiment of the mobile tag 101 that includes two antennas 101a and 101b (e.g., as described above with respect to FIG. 18B) may receive, at each of the two antennas 101a and 101b, the first wireless signal $S_1$ and the second wireless signal $S_2$. As another example, an embodiment of the mobile tag 101 that includes three or more antennas 101a, 101b, 101c (e.g., as described above with respect to FIG. 18C) may receive, at each of the three or more antennas 101a, 101b, 101c, the first wireless signal $S_1$ and the second wireless signal $S_2$.

At step 788a, the mobile tag may determine TDOA information based on the first and second wireless signals. For example, the mobile tag 101 may determine TDOA information based on the first wireless signal $S_1$ and the second wireless signal $S_2$—e.g., in a manner similar to that described above with respect to FIGS. 18A-18C, such as by using EQ 18. Alternatively, the mobile tag may provide, to an external position estimator device (e.g., the server described above with respect to FIG. 8), information relating to the first and second wireless signals, which the server may use to determine the TDOA information.

Independently (e.g., in parallel with step 788a), at step 788b, the mobile tag may determine AOA information based on the first and second wireless signals. For example, the mobile tag 101 may determine AOA information based on the first wireless signal $S_1$ and the second wireless signal $S_2$—e.g., in a manner similar to that described above with respect to FIGS. 18A-18C, such as by using beamforming approaches, subspace-based approaches, maximum likelihood estimation, etc. In various embodiments, the mobile tag may estimate AOA information for each anchor of the anchor pair. For example, the mobile tag 101 may estimate AOA information for anchor 102 based upon receipt of the first wireless signal $S_1$ at each of multiple antennas and may estimate AOA information for anchor 104 based upon receipt of the second wireless signal $S_2$ at each of the multiple antennas. In some embodiments, the mobile tag may provide, to the external position estimator device (e.g., the server described above with respect to FIG. 8), information relating to the first and second wireless signals, which the server may use to determine the AOA information.

At step 790, the location of the mobile tag may be estimated (e.g., jointly estimated) based on a combination of the TDOA information and geometric relationships between the AOA information and the location of the mobile tag. For example, the mobile tag 101, or the external position estimator device, may estimate the location of the mobile tag 101 based on a combination of the TDOA information and geometric relationships between the AOA information and the location of the mobile tag 101—e.g., by solving a system of equations that includes EQs 14, 15, and 18 (in a case where the mobile tag 101 includes two antennas) or by solving a system of equations that includes EQs 14, 15, 16, 17, and 18 (in a case where the mobile tag 101 includes three or more antennas).

While for purposes of simplicity of explanation, the respective processes are shown and described as a series of blocks in FIG. 19, it is to be understood and appreciated that the claimed subject matter is not limited by the order of the blocks, as some blocks may occur in different orders and/or concurrently with other blocks from what is depicted and described herein. For example, in some embodiments, step 788a may alternatively be performed prior to step 788b or vice versa. Moreover, not all illustrated blocks may be required to implement the methods described herein.

One or more aspects of the subject disclosure include a system. The system may include a network of anchors (e.g., each at a known location, such as known x, y, z-based coordinate). Each anchor of the network of anchors may include a respective processor and a respective transceiver for sending and receiving wireless signals (e.g., packets). The network of anchors may include a pair of anchors located within a communication range of one another. A first anchor of the pair of anchors may be configured to transmit a first wireless signal (e.g., a request (REQ) packet or the like) and a second anchor of the pair of anchors may be configured to receive the first wireless signal and to transmit a second wireless signal (e.g., a response (RSP) packet or the like) based on, or in response to, receiving the first wireless signal. The system may further include a mobile device (e.g., at an unknown location) having a plurality of antennas. An overlapping coverage area associated with the pair of anchors may encompass the mobile device. The mobile device may include a processor and a receiver for receiving, from the plurality of antennas, the first wireless signal and the second wireless signal, and may determine (e.g., using the processor of the mobile device), based on receiving the first wireless signal and the second wireless signal from the plurality of antennas (e.g., based on the REQ and RSP packets received by all of the antennas), time difference of arrival information and angle of arrival information relating to the first wireless signal and the second wireless signal to enable a location of the mobile device to be estimated.

In various embodiments, a distance between a first antenna of the plurality of antennas and a second antenna of the plurality of antennas may be less than half of a wavelength of the first wireless signal or the second wireless signal. In some embodiments, the mobile device may be configured to estimate the location of the mobile device based on the time difference of arrival information and the angle of arrival information relating to the first wireless signal and the second wireless signal.

In certain embodiments, the mobile device may not determine the time difference of arrival information and angle of arrival information or may determine the time difference of arrival information and angle of arrival information but may not estimate the location of the mobile device. In such embodiments, the system may further include a server device, and the mobile device may provide, to the server device, information/data relating to the receiving of the first wireless signal and the receiving of the second wireless signal, which the server device may use to determine the time difference of arrival information and the angle of arrival information and to estimate the location of the mobile device based thereon; or, alternatively, the mobile device may determine the time difference of arrival information and angle of arrival information and may provide the time difference of arrival information and angle of arrival information to the server device, which the server device may use to estimate the location of the mobile device.

In one or more embodiments, the first anchor may be configured to transmit the first wireless signal and the second anchor may be configured to transmit the second wireless signal in accordance with a transmission schedule, such that signal collisions are avoided.

One or more aspects of the subject disclosure include a mobile device. The mobile device can include a processing system having a processor. The mobile device can further include a first antenna, and a second antenna spaced apart from the first antenna. The mobile device can further include a memory that stores executable instructions that, when executed by the processing system, facilitate performance of operations. The operations can include receiving, from the first antenna and the second antenna, a first wireless signal transmitted by a first anchor of a first pair of anchors, and receiving, from the first antenna and the second antenna, a second wireless signal transmitted by a second anchor of the first pair of anchors, wherein the second wireless signal is transmitted by the second anchor based upon the second anchor detecting the first wireless signal. The operations can further include determining time difference of arrival information based on the receiving the first wireless signal and the receiving the second wireless signal, determining angle of arrival information based on the receiving the first wireless signal and the receiving the second wireless signal, and estimating a location of the mobile device based on the time difference of arrival information and the angle of arrival information.

One or more aspects of the subject disclosure include a non-transitory machine-readable medium comprising executable instructions that, when executed by a processing system of a mobile device including a processor, facilitate performance of operations. The operations can include receiving, from multiple antennas of the mobile device, a first wireless signal transmitted by a first anchor of a pair of anchors, and receiving, from the multiple antennas of the mobile device, a second wireless signal transmitted by a second anchor of the pair of anchors, wherein the second wireless signal is transmitted based on the first wireless signal. The operations can further include providing, to a server device, data relating to the receiving of the first wireless signal and the receiving of the second wireless signal to enable the server device to determine time difference of arrival information based on the data, derive angle of arrival information based on the data, and estimate a location of the mobile device based on the time difference of arrival information and the angle of arrival information.

An at least some applications, a real-time locating system (RTLS) may be deployed within an overall service area partitioned and/or segmented into multiple different sub-areas or segments. According to such a segmentation, a service provided by the RTLS may distinguish location services between the different sub-areas or segments. For example, an RTLS service provided within one sub-area or segment, may be enabled by RTLS equipment associated with that sub-area or segment, while RTLS service provided within another sub-area or segment, may be enabled by RTLS equipment associated with the other sub-area or segment. In some embodiments, the RTLS equipment supporting one sub-area or segment is different from the RTLS equipment supporting the other sub-area or segment. Alternatively or in addition, at least a portion of the RTLS equipment may support both sub-areas and segments. Accordingly, distinguishing RTLS services between different sub-areas may be accomplished by selections and/or allocations of equipment.

It is envisioned that in at least some embodiments, RTLS service may be distinguished by a signal protocol, e.g., applying different protocol attributes to different sub-areas. Distinguishing protocol attributes may include one or more of different signal frequencies, e.g., operating according to a frequency division multiplexing scheme. Alternatively or in addition, distinguishing protocol attributes may include a time division multiplexing scheme. It at least some embodiments, a code division multiplexing scheme may be employed alone or in combination with the other distinguishing schemes disclosed herein. These examples of distinguishing protocol attributes may be employed by the wireless communication devices to facilitate operation within their respective sub-areas, while mitigating potential interference from other sub-areas, e.g., bordering and/or overlapping sub-areas.

It is envisioned that in at least some embodiments, the mobile tag may be free to move between different sub-areas. Accordingly, a mobile tag that is located according to a first RTLS service provided within a first sub-area according to one or more of the distinguishing features, may transition to an adjacent sub-area. Locations of the mobile tag operating within the adjacent sub-area would be better services by a second RTLS service provided within the adjacent sub-area according to one or more of the distinguishing features. A process of transitioning from the first RTLS service in the first sub-area to the second RTLS service in the second sub-area may be referred to as a handover.

According to a handover, the mobile tag may transition from communicating with first RTLS equipment servicing the first sub-area, e.g., a first set of wireless anchor devices, to second RTLS equipment servicing the second sub-area, e.g., a second set of wireless anchor devices. To the extent the mobile tag retains a record, e.g., a listing, of a first group of wireless anchor devices of the first sub-area, that record, or list must be updated, refreshed and/or replaced with a new record or listing of a second group of wireless anchor devices of the second sub-area. Alternatively or in addition, the mobile tag may need to update one or more of a frequency of operation, a timing synchronization, a time slot allocation for transmitting and/or receiving, a code, e.g., for code division multiplexing, a security code, e.g., a hash, cypher and/or encryption key, and the like.

Consider an industrial application, in which an overall area, such as a large warehouse, is portioned into multiple sub-areas, e.g., a single large area of the entire warehouse divided into two halves, or four quadrants, and so on. Each sub-area may include one or more wireless communication devices adapted to exchange location information with one or more other wireless communication devices. The wireless communication devices may include one or more reference devices positioned at a known and/or determinable location relative to one or more of the other wireless communication devices. Alternatively or in addition, the wireless communication devices may include a mobile wireless communication device, sometimes referred to herein as a mobile tag. The mobile tag may be moveable within one or more of the sub-areas of segments of the overall service area, and in communication with one or more of the other wireless communication devices, such that a location of the mobile tag may be determinable according to an exchange of wireless signals therebetween.

Due to the nature of wireless communications and/or the particular physical arrangement of the different sub-areas, there may be at least some region of overlapping wireless coverage in which signals from one region, e.g., wireless transmissions from the second group of wireless anchor devices of the second region may be perceptible to the mobile tag, while still located within the first region. In at least some instances, such overlapping coverage may represent noise that, in at least some instances, may impact performance of the RTLS. For example, a precision of a location of the mobile tag determined according to the first RTLS may be degraded to some degree by overlapping coverage of the second RTLS.

It is envisioned further that these sub-areas may be separated physically, e.g., by a wall of metal, wood, concrete or other materials. Between two different sub-areas, there may be an access portal, such as a door, a tunnel, a stairwell, an elevator shaft, etc., connecting two areas. In at least some instances, such an access portal may be referred to more generally as a "transition area." When a mobile tag positioned within a first sub-area is close to and/or within a transition area connecting the first sub-area to a second sub-area, the wireless signal transmitted from anchors in the first sub-area may be impaired, e.g., by the wireless signals from anchors in the second sub-area, thereby resulting in an overall degradation of RTLS positioning performance. Likewise, when a mobile tag moves from the first sub-area to the second sub-area, such that the mobile anchor coordinates RTLS positioning with the anchors of the second sub-area, the wireless signal transmitted from anchors in the second sub-area may be impaired, e.g., by the wireless signals from anchors in the first sub-area, once again resulting in an overall degradation of RTLS positioning performance.

Figure 20A:
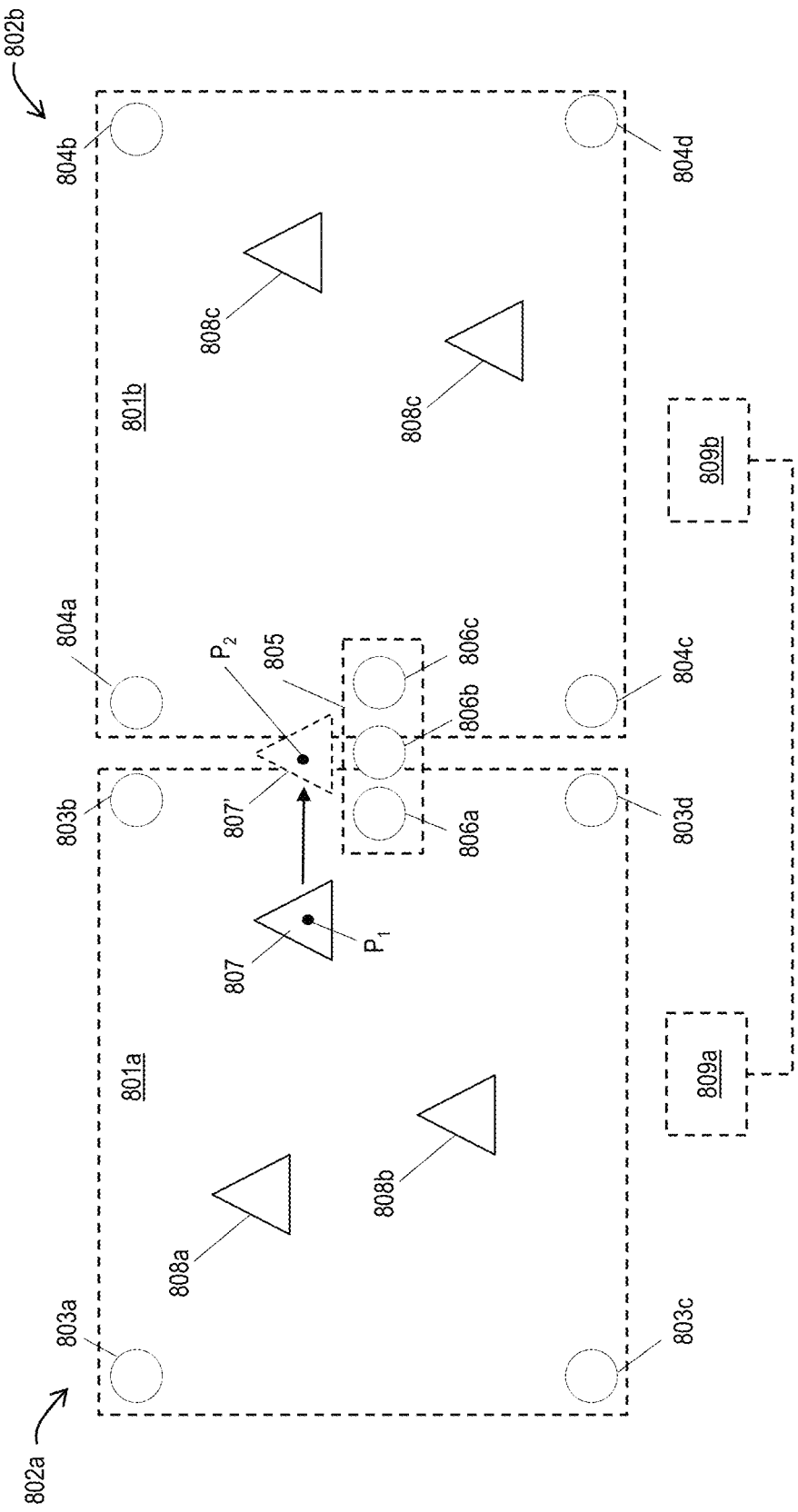
FIG. 20A is a block diagram of an example, non-limiting embodiment of a multi-area, real-time locating system in accordance with various aspects described herein.

FIG. 20A is a block diagram of an example, non-limiting embodiment of a multi-area, real-time locating system 800 in accordance with various aspects described herein. The system 800 includes a first group of anchors 803a, 803b, 803c, 803d, generally 803, which are adapted to exchange wireless signals with one or more mobile tags 807, 808a, 808b operating within and/or near a first region or area 801a. The first group of anchors 803 are adapted to exchange wireless signals with the mobile tag(s) 807, 808a, 808b, e.g., as described above and in relation to FIGS. 1-3 and 4A-4C, to support a RTLS positioning service within the first area 801a. Likewise, the system 800 includes a second group of anchors 804a, 804b, 804c, 804d, generally 804, which are adapted to exchange wireless signals with one or more mobile tags 808c, 808d, operating within and/or near a second area 801b, and the mobile tag 807, when operating within and/or near to the second area 801b. The second group of anchors 804 are also adapted to exchange wireless signals with the mobile tag(s) 808c, 808d, and the mobile tag 807, when operating within and/or near to the second area 801b, to support an RTLS positioning service within the second area 801b. In generally, the tags 808a, 808b, 808c, 808d may be referred to as tags 808.

The numbers and/or locations of the various anchors 803, 804 may vary according to any number of considerations, such as wireless signal range, RF power levels, RTLS location accuracy, reliability, and so on. In at least some embodiments, one or more of the first group of anchors 803 may be arranged according to a first network 802a in wireless and/or wired communication with a first anchor or network controller 809a (shown in phantom). Likewise, in at least some embodiments, one or more of the second group of anchors 804 may be arranged according to a second network 802b in wireless and/or wired communication with a second anchor or network controller 809b (also shown in phantom). Although two network controllers 809a, 809b, generally 809, are illustrated, it is envisioned that in at least some embodiments, a single anchor controller 809 may support the first and second networks 802a, 802b, generally 802, of anchors 803, 804 operating within the first and second regions 801a, 801b. In at least some embodiments, one or more of the networks 802 may participate and/or otherwise support RTLS positioning service within its respective area, without requiring a separate network controller 809. For example, network control functions may be implemented by one or more of the anchors 803, 804, one or more of the mobile tags 807, 808, or combinations thereof. In some embodiments, a network control function may not be required.

The one or more anchor controller 809 may participate in the RTLS positioning service. For example, the anchor controller 809 may identify the first group of anchors 803 supporting the first area 801a and provide them with configuration information corresponding to the RTLS positioning service. Configuration information may include, without limitation, an operational frequency and/or operational frequency band, a wireless power level, e.g., a maximum power level, and/or a minimum power level, and/or range of power levels, identification of a wireless network, e.g., a local area network, that may be used for one or more of position information and/or general communications between one or more of the first group of anchors 803 and/or the controller 809. Still other examples of configuration may include, without limitation, a type and/or types of position algorithms available to the RTLS positioning service, a record of locations of one or more of the wireless anchors 803, 804, an identification of a mobile tag 807, 808 and/or a type of tag, tag and/or anchor capabilities, user account information and/or types of equipment associated with the mobile tags 807, 808, associated security information, e.g., usernames, passwords, encryption keys, and the like.

According to the example system 800, a first mobile tag 807 is located at a first position, $P_1$, at a first time $T_1$. The mobile tag 807 while at the first position $P_1$ is well within the first area 801a and may access the RTLS position service from one or more of the first group of anchors 803 alone or in combination with one or more other anchors 808 and/or the anchor controller 809. However, when the mobile tag 807 moves to a second position $P_2$ at a second time $T_2$, illustrated in phantom as a repositioned tag 807' indicating a position of the original tag 807 at a future time $T_2$, the repositioned mobile tag 807' is positioned along an edge of the first area 801a, near a border with the second area 801a. The repositioned mobile tag 807' may still access RTLS position service from the first group of anchors 803, but the position accuracy at the second position $P_2$ may be less than that of the first position $P_1$. Such a reduction in position accuracy may result from the repositioned mobile tag 807' being positioned along an edge of wireless coverage provided by the first group of anchors 803. Alternatively or in addition, such a reduction in position accuracy may be due at least in part to interference from wireless signals of the second group of anchors 804 of the adjacent second area 801b and/or other tags 808c, 808d operating within the second area 801b.

The RTLS position service provides real-time, or at least a near-real time positioning services to mobile tags 807 present within a wireless coverage area of a network of anchors 803, 804 alone or in combination with a coverage area of one or more other mobile tags 808 that may participate in the RTLS position service, e.g., via a peer-to-peer exchange of position information. In at least some embodiments, a mobile tag 807 may be adapted to calculate its own position based on information provided by the network 802 of anchors 803, 804 to which it is currently connected. The techniques disclosed herein assist a mobile tag 807 the anchors 803, 804 and/or the network controller(s) 809 in estimating, detecting and/or otherwise determining which area 801a, 801b the mobile tag 807 is in or near when the mobile tag 807 is close to a transition area 805 demarking an accessible passage between the different areas 801a, 801b. In at least some embodiments, the techniques disclosed herein may assist the mobile tag 807 and/or the network 802 of anchors by facilitating a handover of mobile tag 807 from one area 801a to another area 801b.

It is understood that, without restriction, the different areas 801a, 801b may be adjacent areas. The adjacent areas may reside substantially within the same plane, e.g., a horizontal plane representing a ground level, a floor of a building, and the like. The adjacent areas may be separated by a physical structure, such as a wall, a fence, a trench, which may define a passageway or access portal adapted to permit transit of a mobile tag 807 from one area 801a to the other area 801b. In at least some embodiments, a physical border between the adjacent areas 801a, 801b may be imperceptible or nonexistent, the border instead being defined by a wireless coverage area and/or a position with respect to a coordinate reference.

It is envisioned that in at least some embodiments, the different areas 801a, 801b may overlap, at least in part. Alternatively, the different areas 801a, 801b may not be immediately adjacent, e.g., instead being connected via a separate, interstitial area, such as a hallway, an ante-chamber, and the like. It is further envisioned that in at least some embodiments, the different areas 801a, 801b may not reside completely within the same plane. For example, the areas 801a, 801b may represent different floors of a multistory structure. In such instances, the transition area 805 may include one or more of a ramp, a stairwell, an elevator shaft, and the like.

By way of example, the mobile tag 807 at $P_1$ receives wireless signals from a first wireless network. The mobile tag 807 may determine its position, i.e., $P_1$, based on the RTLS position service of the first network 802a of anchors 803. Depending upon its location, e.g., at position $P_2$, the repositioned mobile tag 807' may determine that it's position, i.e., $P_2$, possibly concluding and/or estimating that its position is at and/or near the transition area 805. In such instances, the example system 800 may be adapted to provide additional information to facilitate a more precise estimate of a location and possibly one or more of a direction, orientation and/or speed of the mobile tag 807.

For example, the system 800 may include one or more wireless ranging devices 806a, 806b, 806c, generally 806. Without limitation, the border ranging devices 806 may include one or more of a tag and/or an anchor. In at least some embodiments, the border ranging devices 806 are distinguishable from the mobile tag and the anchors, e.g., operating in a different frequency band, a different power level, a different time slot and/or according to a different wireless technology altogether. It is envisioned that a geometry, shape, size, construction type, material(s), if any, and/or design of the border ranging devices may vary, as well as a pattern or arrangement of more than one border ranging devices. Without limitation, a pattern and/or arrangement of the border ranging devices may refer to one or more of a number of the devices, a separation between the devices, an alignment of the devices, e.g., whether the devices are positioned along a line, a curve, and/or according to a two-dimensional (2D) pattern, e.g., according to a grid, heights of devices, and so on, To facilitate reliable handover detection performance, the border ranging devices are preferably positioned to maintain line of sight (LOS) to the mobile tag, at least while the mobile tag is in and/or nearby the transition area.

The ranging devices 806 may be configured to determine a range to the mobile tag 807, e.g., responsive to a determination that the mobile tag 807 is in, at, or near the transition area 805. A determination of the range may be accomplished by the wireless ranging devices 806 alone and/or in combination with one or more of an anchor of the first group of anchors 803, an anchor of the second group of anchors 804, the mobile tag 807 and/or another mobile tag 808. In at least some embodiments, the mobile tag 807 may be configured to determine range values to one or more of the wireless ranging devices 806, e.g., based on an exchange of wireless signals between the mobile tag 807 and the ranging devices 806. Without limitation, the range calculations may include any one or more of the various distance, delay and/or timing techniques disclosed herein. This may include determining a one-way signal propagation time and a calculation to determine a range based on the time. Alternatively or in addition, the range calculations may be based on a round-trip signal propagation time from the wireless ranging device 806 and/or from the mobile tag 807. Likewise, a calculation may be employed to determine a round trip distance, e.g., dividing by two to obtain a corresponding range value.

Without limitation, the wireless signals employed by the wireless ranging devices 806, sometimes referred to as border ranging devices 806, may include radio frequency signals, optical signals, e.g., visible light and/or infrared signals, acoustic signals and/or any combination thereof. The wireless signals may include one or more of a frequency, a frequency band, a protocol, and the like, that are the same and/or similar as employed by the RTLS network. In at least some embodiments, one or more of the wireless signal properties may vary from those employed by the RTLS network. In at least some embodiments, one or more of the mobile tag 807 and/or the wireless ranging devices 806 may employ a RADAR, LIDAR and/or SONAR calculation, e.g., based upon a measurement of signal return. The range, once determined, may be shared with one or more other elements of the network 802 of anchors 803, e.g., another anchor 803, with the controller 809, with the mobile tag 807 and/or with another mobile tag 808.

Figure 20B:
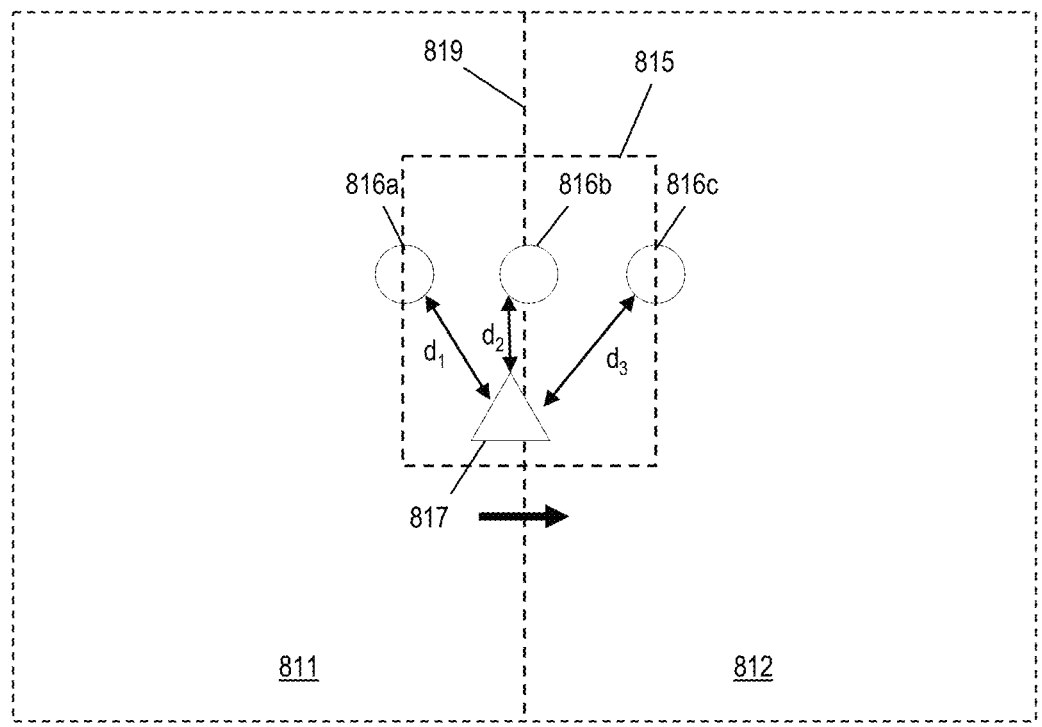
FIG. 20B is a block diagram of an example, non-limiting embodiment of a portion of a multi-area, real-time locating system that employs border ranging in accordance with various aspects described herein.

FIG. 20B is a block diagram of an example, non-limiting embodiment of a portion of a multi-area, real-time locating system 810 that employs border ranging in accordance with various aspects described herein. The system 810 provides a first RTLS position service in a first area 811 and a second RTLS position service in a nearby second area 812. The first and second RTLS position services may be provided via first and second wireless networks 802 (FIG. 20A) providing wireless coverage to a mobile tag 817 operating within a respective area 811, 812. The system 810 also includes a transition area or region 815 along a border 819 between the first and second areas 811, 812. In at least some embodiments, e.g., according to the illustrative example, the transition region 815 overlaps at least a portion of the first and second areas 811, 812 along their common border 819. The system 810 also includes a group of wireless border ranging devices 816a, 816b, 816c, generally 816. The example border ranging devices 816 are located within the transition region 815 and arranged along a line substantially perpendicular to the border 819. A first range value $d_1$ may be determined between the first border ranging device 816a and the mobile tag 817. Likewise, second and third range values $d_2$, $d_3$ may be determined between the mobile tag 817 and the second and third border ranging devices 816b, 816c, respectively.

In some embodiments, the range values $d_1$, $d_2$, and $d_3$ may be determined at approximately the same time. Alternatively or in addition, one or more of the range values $d_1$, $d_2$, and $d_3$ may be determined at different times, e.g., according to a time sequence and/or according to a measurement time value, e.g., a scheduled measurement time and/or time slot. In at least some embodiments, the ranging results provide one or more range values $d_1$, $d_2$, and $d_3$ based on predetermined or otherwise known locations, e.g., 2D and/or 3D locations of the border ranging devices 816. In at least some embodiments, estimates and/or inferences may be determined by one or more of the network 802, the anchors 803, 804 (FIG. 20A), the mobile tag 817 and/or another mobile tag 808 (FIG. 20A) based on one or more of the range values $d_1$, $d_2$, and $d_3$ alone or in combination with the locations of the border ranging devices 816 and/or an estimated location of the mobile tag 817.

Figure 20C:
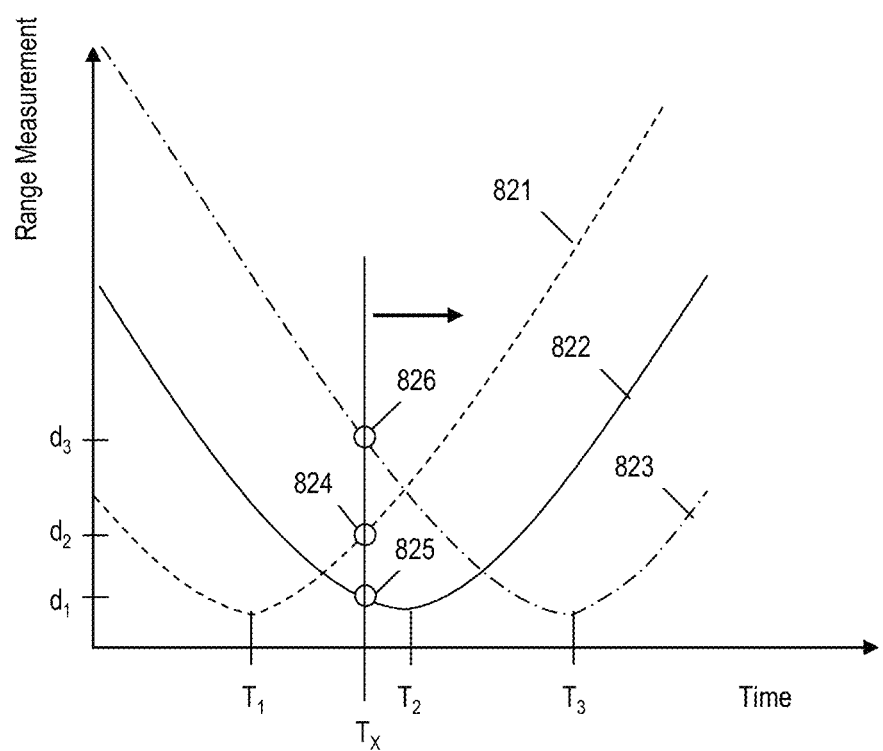
FIG. 20C is a graphical depiction of a border ranging trace obtained via the example multi-area, real-time locating system of FIG. 20B in accordance with various aspects described herein.

In at least some embodiments, determination of one or more of the range values may repeated at different times to obtain a time series or sequence of ranges, e.g., range values $d_1(t)$ $d_2(t)$, and $d_3(t)$. FIG. 20C provides a graphical depiction of border ranging measurements 820 obtained via the example multi-area, real-time locating system 810 of FIG. 20B in accordance with various aspects described herein. The border ranging measurements 820 include a first curve 821 representing a first distance-versus-time measurement, result and/or estimate $d_1(t)$ obtained in reference to the first border ranging device 816a (FIG. 20B). Likewise, the border ranging measurements 820 include second and third curves 822, 823 representing a second and third distance-versus-time measurement, result and/or estimate $d_2(t)$, $d_3(t)$ obtained in reference to the second and third border ranging devices 816b, 816c (FIG. 20B), respectively.

According to the illustrative example, the mobile tag 817 is moving from the first area 811 to the second area 812, as indicated by the arrow (FIG. 20B). Initially, the mobile tag 817 may be to the left of the transition region 815 (FIG. 20B), such that the mobile tag 817 is to the left of all three border ranging devices 816. As the mobile tag 817 progress to the right, the distance values $d_1$, $d_2$, and $d_3$ will decrease, indicating that the mobile tag is approaching the transition region 815, but not yet necessarily within the transition region 815. As the mobile tag 817 continues along the example trajectory, it will pass the first border ranging device 816a, e.g., at a time $T_1$, after which time the distance value $d_1$ will begin to increase. As the mobile tag 817 has not yet passed the second and third border ranging devices 816b, 816c, their respective distance values $d_2$, $d_3$, will continue to decrease.

An example measurement result is illustrated at a time $T_X$, when the mobile tag 817 traveling along the example trajectory is at a position between the first and second border ranging devices 816a, 816b. The measurement result includes three sample points 824, 825, 826 corresponding to ranges $d_1$, $d_2$, and $d_3$ from the mobile tag 817 to each of the border ranging devices 816 determined at time $T_X$. As the mobile tag 817 continues along the example trajectory, it will pass the second border ranging device 816b, e.g., at a time $T_2$, after which time the distance value $d_2$ will begin to increase, subsequently passing the third border ranging device 816c, e.g., at a time $T_3$, after which the distance $d_3$ will begin to increase. By recognizing this pattern, e.g., a range measurement to the second border ranging device 816b reaching a minimum, while a range measurement to the first border ranging device 816a is increasing and a range measurement to the third border ranging device 816c is decreasing, the transition from the first area 811 to the second area 812 may be detected.

In some embodiments, the first border ranging device 816a may be positioned at or near a left edge of the transition area 815. Accordingly, a measurement result indicating that the mobile tag 817 has passed the first border ranging device 816a may indicate that the mobile tag 817 is within the transition region 815. Likewise, the third border ranging device 816c may be positioned at or near a right edge of the transition region 815. Accordingly, a measurement result indicating that the mobile tag 817 has passed the third border ranging device 816c may indicate that the mobile tag 817 has exited the transition region 815. In at least some embodiments, the second border ranging device 816b may be positioned within the transition region 815 and at or near the border 819. Accordingly, a measurement result indicating that the mobile tag 817 has passed the second border ranging device 816b may indicate that the mobile tag 817 has transited the border 819.

In at least some embodiments, a determination of the three ranges at a single time, e.g., time $T_X$ may be sufficient to estimate a location of the mobile tag with respect to the transition region 815 and/or the border 819. Alternatively or in addition, a time sequence of measurements may be obtained at different times to provide ranges and allow for calculations of range differences. Such sequential measurements may be used to calculate one or more of a position, a direction, a speed and/or an acceleration/deceleration of the mobile tag 817.

Figure 20D:
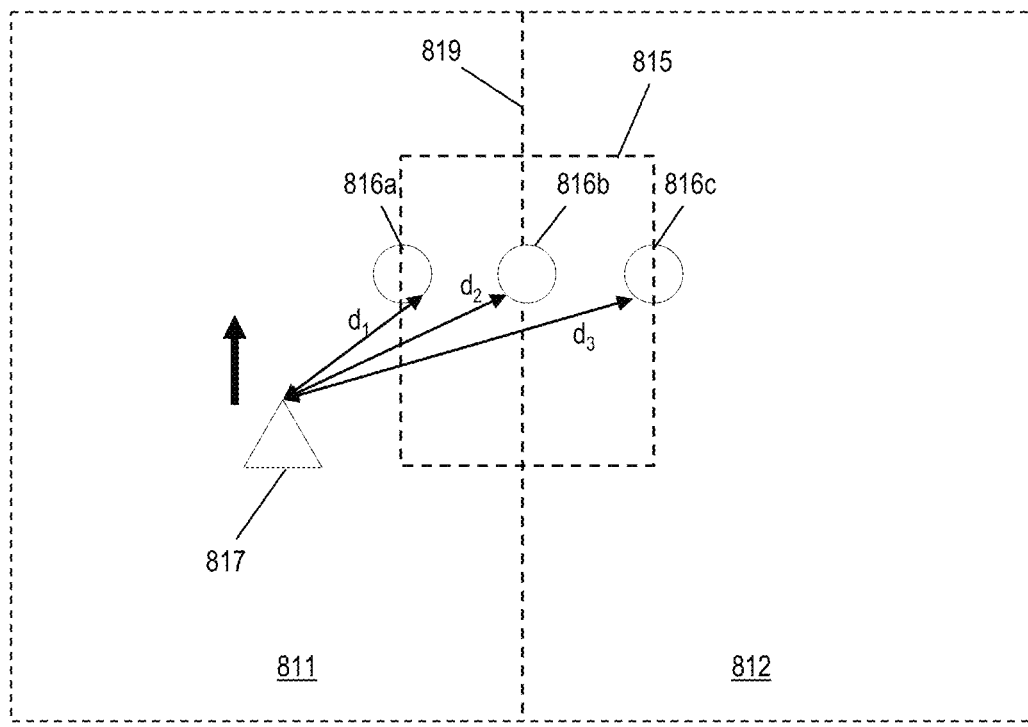
FIG. 20D is a block diagram of an example, non-limiting embodiment of a portion of another multi-area, real-time locating system that employs border ranging in accordance with various aspects described herein.

FIG. 20D is a block diagram of an example, non-limiting embodiment of a portion of a multi-area, real-time locating system 830 that employs border ranging in accordance with various aspects described herein. According to the illustrative example, the configuration of the system 830 is identical to the multi-area, real-time locating system 810 (FIG. 20B), however, the mobile tag 817 is moving in a different direct.

As depicted by the arrow, the mobile tag 817 may be at, in or nearby at least a portion of the transition region 815 but moving in a direction that is substantially perpendicular to the border 819. Accordingly, the mobile tag 817 may approach and/or traverse at least a portion of the transition area, without crossing the border 819 and/or otherwise transitioning from the first area 811 to the second area 812.

Beneficially, the range measurements obtained in cooperation with the border ranging devices 816, alone or in combination with the RTLS position service, may support a detection, determination and/or estimation of a border crossing event. The border ranging measurements may be used to determine a more precise position of the mobile tag 817, its direction of motion, speed of travel, and so on.

Figure 20E:
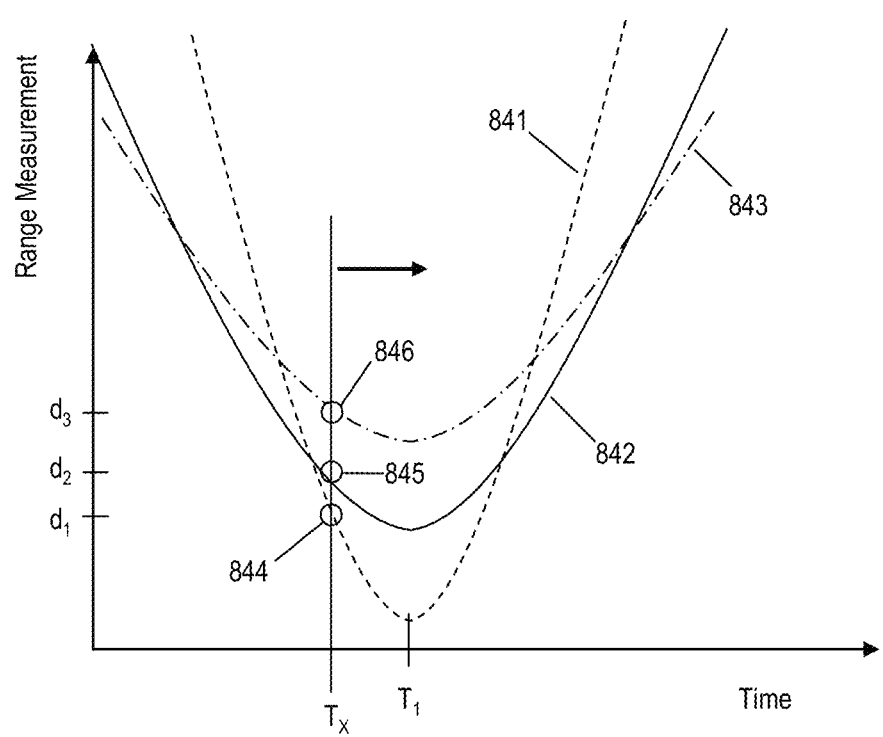
FIG. 20E is a graphical depiction of another border ranging trace obtained via the example multi-area, real-time locating system of FIG. 20D in accordance with various aspects described herein.

FIG. 20E provides a graphical depiction of border ranging measurements 840 obtained via the example multi-area, real-time locating system 830 of FIG. 20D in accordance with various aspects described herein. The border ranging measurements 840 include a first curve 841 representing a first distance-versus-time measurement, result and/or estimate $d_1(t)$ obtained in reference to the first border ranging device 816a (FIG. 20D). Likewise, the border ranging measurements 840 include second and third curves 842, 843 representing a second and third distance-versus-time measurement, result and/or estimate $d_2(t)$, $d_3(t)$ obtained in reference to the second and third border ranging devices 816b, 816c (FIG. 20D), respectively. A range measurement sample at a time $T_X$ identifies a first sample 844 of a range $d_1$ to the first border ranging device 816a, a second sample 845 of a range $d_2$ to the second border ranging device 816b, and a third sample 846 of a third range $d_3$ to the third border ranging device 816c.

According to the illustrative example, the mobile tag 817 is within the first area 811, without crossing into the second area 812. Initially, the mobile tag 817 may be to the left of the transition region 815 (FIG. 20D), such that the mobile tag 817 is to the left of all three border ranging devices 816. As the mobile tag 817 progress upward, the distance values $d_1$, $d_2$, and $d_3$ will decrease, indicating that the mobile tag is approaching the transition region 815, but not yet necessarily within the transition region 815. As the mobile tag 817 continues along the example trajectory, it will pass within a closest distance, $d_{1min}$ to the first border ranging device 816a, e.g., at a time $T_1$, after which time the distance value $d_1$ will begin to increase. As the mobile tag 817 has not yet passed the second and third border ranging devices 816b, 816c, their respective distance values $d_2$, $d_3$, will continue to decrease to respective minimum values, $d_{2min}$, $d_{3min}$, subsequently increasing as the mobile tag 817 continues along its trajectory. It is notable that the minimum values of each of the border ranging devices 816a occur at substantially the same time, $T_1$.

As indicated in the previous example, the range measurements obtained in cooperation with the border ranging devices 816, alone or in combination with the RTLS position service, may support a detection, determination and/or estimation of a border crossing event. The border ranging measurements may be used to determine a more precise position of the mobile tag 817, its direction of motion, speed of travel, and so on. According to the example measurements provided in the graphical depiction of border ranging measurements 840, the mobile tag 817 does not reach a point at which range measurements are decreasing to some border ranging devices 816, while increasing to others as was observed in the previous example (FIG. 20C). Alternatively or in addition, the example measurements observe a minimum measurement and/or a change from decreasing to increasing ranges at substantially the same time. Any one or more of the observed range measurements may be determined, detected and/or otherwise evaluated to indicate that the mobile tag 817 has not crossed the border 819. Accordingly, no handover of RTLS position service from a first network of anchors to a second network of anchors is implemented.

Operation of the range measurements may be implemented in a substantially continuous manner, e.g., with one or more of the border ranging devices 816 transmitting and/or receiving wireless signals that are utilized in determinations of the range values. Alternatively or in addition, the range measurements may be implemented responsive to an event, such as a determination that a mobile tag 817 is within, at and/or nearby a transition region 815 and/or a border ranging device 816. For example, the border ranging devices 816 may be in a dormant, e.g., sleep mode unless a mobile tag 817 is within a vicinity of one or more of the border ranging devices 816. The mobile tag 817 and/or the corresponding network of anchors may estimate that the mobile tag 817 is within a threshold range of a predetermined transition region 815. A message may be provided to one or more of the border ranging devices 816 by the mobile tag 817 and/or by the corresponding network of anchors, informing the border ranging devices 816 that the mobile tag is within a threshold range. In response to such a notification, the border ranging devices may transition from a dormant or sleep state to an active state in which they initiate wireless signals to estimate a range to the mobile tag 817. The ranging measurements may continue until the determined ranges and/or direction and/or speed and/or acceleration/deceleration indicate that the mobile tag 817 is no longer within the threshold range of the border ranging devices and/or within the threshold range of the transition region 815.

In at least some embodiments, the range measurements are performed in a time sequence manner. Ranges obtained at different times may be retained by one or more of the border ranging devices 816, the mobile tag 817 and/or the corresponding network of anchors, which may include a network controller. Calculations in support of the RTLS position service and/or a handover determination may utilize one or more of the range measurements alone and/or in combination with stored range values of prior range measurements. Calculations may include, without limitation an estimate of a position of the mobile tag 817, an estimate of a direction of the mobile tag 817, an estimate of a speed or velocity of the mobile tag 817, and so on.

In at least some embodiments, a range measurement schedule may be determined, in which range measurements of one or more of the border ranging devices 816 are performed according to schedule. For example, the range measurement schedule may establish a fixed sample period by which range measurements are performed in cooperation with one or more of the border ranging devices 816, in accordance with the fixed sample period. In at least some embodiments, the range measurement schedule may vary based on one or more conditions. The conditions may depend upon one or more of a required measurement accuracy, a type of mobile tag 817, a type of equipment associated with the mobile tag 807, a number of mobile tags 817 within the threshold range of the border ranging devices 816, a speed and/or direction of one or more of the mobile tags 817, and so on.

By way of example, the border ranging devices 816 may default to a dormant mode until they receive a notification that a mobile tag 817 is within a predetermine threshold range. Upon such notification, the mobile tag 817 may transition to an active mode in which it transmits wireless signals in support of range measurements according to a signal and/or measurement schedule, e.g., at a first sample period. The border ranging devices 816 may receive a notification and/or otherwise determine that a mobile tag 817 is moving in a particular direction, e.g., towards the transition region 815, at a particular speed. The border ranging devices 816, in response to the determined direction and/or speed, may adjust the measurement schedule as may be appropriate. For example, the measurement period may be reduced for a faster moving mobile tag 817 and/or a mobile tag 817 approaching the transition area, and/or within the transition area. Similarly, the measurement period may be increased for a slower moving mobile tag 817 and/or a mobile tag 817 moving away from the transition area.

Although the illustrative example includes three collinear border ranging devices 816 arranged perpendicular to the border 819, other numbers and/or arrangements may be employed. For example, the transition region 815 may include two border ranging devices, e.g., the first and third border ranging devices 816a, 816c positioned at opposite ends of the transition region 815. Corresponding range measurements $d_1$, $d_3$ and/or sequences of range measurements $d_1(t)$, $d_3(t)$ may be obtained and used to determine a location, direct, speed, acceleration/deceleration and so on, of the mobile tag 817. With such an arrangement, an estimate of a border crossing may be determined based on the combined range measurements $d_1$, $d_3$, e.g., being approximately the same distance.

Other configurations of more and/or fewer border ranging devices 816 are possible. For example, a single border ranging device 816b may be positioned on the border 819, permitting range calculations $d_2$, $d_2(t)$ within at least a portion of the transition region 815. According to the single border ranging device configuration, a border crossing may be estimated based on one or more of a minimum range $d_2$ min and or a change in direction of range measurements, e.g., the range $d_2$ initially decreasing as the mobile tag 817 approaches the border ranging device 816b, then increasing after the mobile tag 817 has passed the border ranging device 816b.

Without limitation, border ranging devices 816 may be arranged according to a 2D and/or 3D pattern, e.g., a rectangular grid, a triangular pattern, an ellipse, or circle, and so on. In some embodiments, the border ranging devices 816 may be arranged in a fixed pattern along a curve, e.g., a line, an arc and/or a closed shape such as an ellipse or polygon. The line and/or pattern arrangement may have a preferred orientation to the border, e.g., being tangential to the border, being normal to the border, or perhaps some other angle.

Figure 20F:
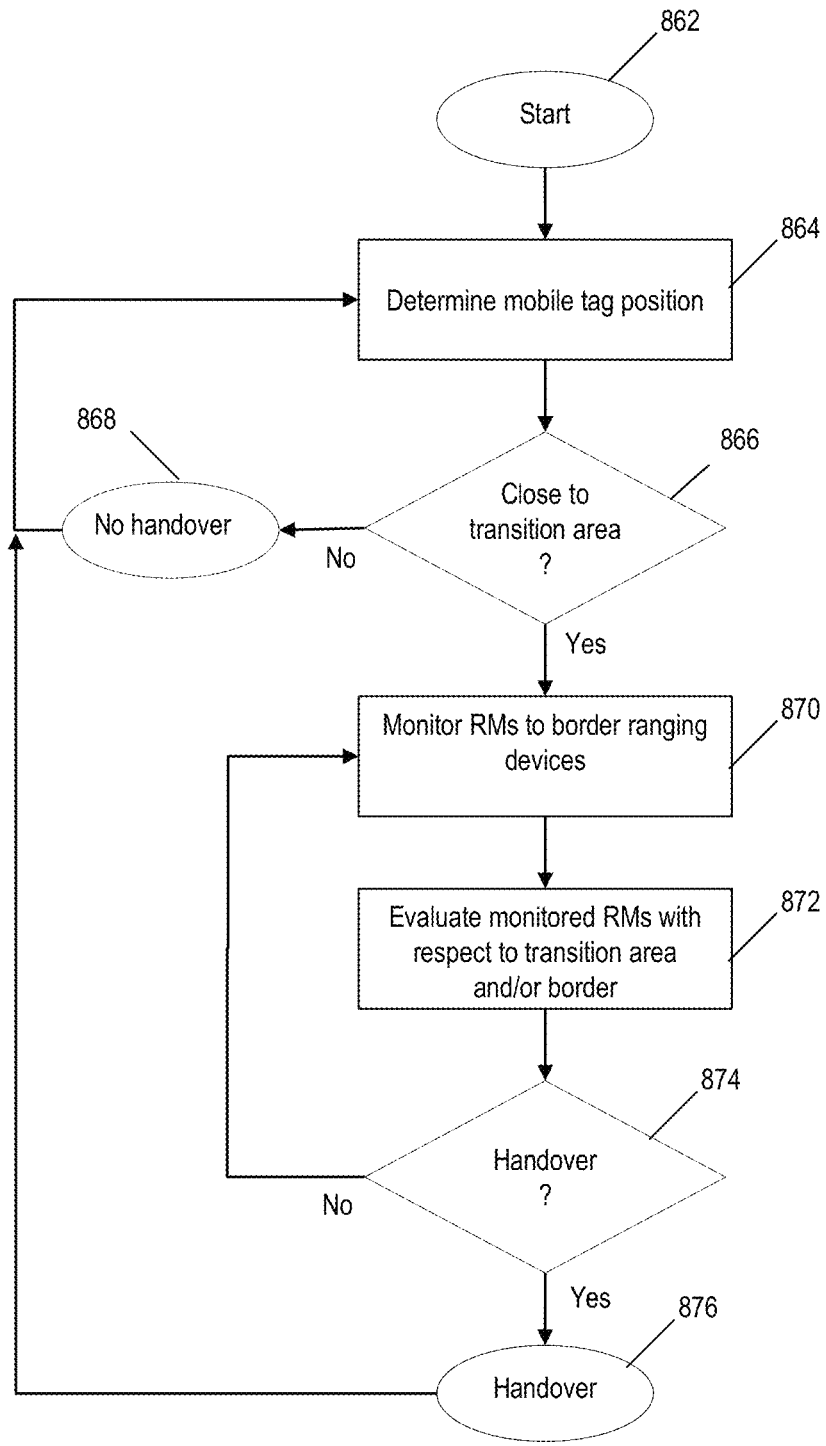
FIG. 20F depicts an illustrative embodiment of a method for managing area handovers in a multi-area, real-time locating system, such as the systems depicted in FIGS. 20A, 20B and 20D, in accordance with various aspects described herein.

FIG. 20F depicts an illustrative embodiment of a process 860 for managing area handovers in a multi-area, real-time locating system, such as the systems depicted in FIGS. 20A, 20B and 20D, in accordance with various aspects described herein. The process 860 is adapted to initiate a mobile tag handover within the multi-area RTLS, whereby the mobile tag operating within a first area, supported by a first network of anchor devices, transitions to a second area supported by a second network of anchor devices. Handover of the mobile tag from the first network to the second network may be facilitated by a transition-area subsystem adapted to support monitoring a position and/or movement of a mobile tag when the tag is proximate to a predetermined transition area between the first and second areas.

In at least some embodiments, the process 860 may be initiated at 862. The monitoring of the position and/or movement of the mobile tag by the transition-area subsystem may be accomplished in addition to RTLS position services available in either of the first and second areas. Initiation of the process may occur at a process start time, e.g., in association with an initiation of the RTLS position service in either of the first and second areas. In such instances, the process 860 may remain in operation as long as an RTLS service is available in the multi-area configuration. Alternatively or in addition, the process 860 may be initiated responsive to an event, such as a determination by either RTLS position service that a tag is present within a respective service area. Thus, if there are no tags present, the process may terminate and/or otherwise return to a hibernation or sleep state in which it awaits initiation responsive to mobile tag activity.

According to the example process 860, a determination is made at 864 regarding a position of a mobile tag 817 (FIG. 20B). For example, one of the first or second RTLS servicing a respective area in which a mobile tag is operating may determine a position of the mobile tag. Alternatively or in addition, the mobile tag may determine its position with respect to one or more anchors and/or other tags of the first network of anchors. When the mobile tag is launched from a predetermined area, e.g., a parking and/or charging station, or expected to enter through a predetermined access point, e.g., a doorway, ramp, hallway, and the like, the mobile tag may be presumed to be operating with a corresponding area of the multi-area RTLS. Accordingly, the mobile tag may be configured with a listing of the anchors of the corresponding network of anchor devices. Identification of the anchors may include an anchor reference designator, a corresponding frequency, code and/or time slot and/or a corresponding anchor location.

In some instances, the mobile tag may enter into and/or be energized, e.g., powered on, within a multi-area RTLS from an unknown initial position. In such situations, an initialization process may be initiated to detect and/or otherwise determine mobile tag activity and/or a presence of the mobile tag within the multi-area RTLS. Having determined that a tag is active, and according to the initialization process, one or more of the mobile tag and at least one representative anchor from each of the multiple areas of the multi-area RTLS may exchange wireless messages. The messages may be predetermined according to the initialization process, e.g., to obtain a range estimate, according to one or more of a signal strength, a propagation delay, a signal phase relationship, input from another system such as a video monitor and/or motion sensing system, and so on. As a result of the initialization process, an estimate is made as to which area of the multi-area RTLS the mobile tag is operating within. Having made such an estimate, the mobile tag may be configured and/or otherwise initiated to participate in RTLS measurements of the RTLS position service within the corresponding area.

According to the example process 860, a determination is made at 866 as to whether the mobile tag is close to a transition area. It is envisioned that one or more transition areas may be provided between different areas of a multi-area RTLS, and that such transition areas may be known beforehand. Accordingly, a position of a mobile tag determined at 864 may be compared to a predetermined location of one or more transition areas. The transition areas may be defined by a corresponding area of a coordinate system, e.g., at some max and min values of an "x" coordinate, and/or some max and min values of a "y" coordinate and/or some max and min values of a "z" coordinate. In at least some embodiments, an estimate of "closeness" may be determined according to the predetermined range of location coordinates of the transition area. Alternatively or in addition, the estimate of closeness may be determined according to a threshold distance and/or threshold range value as may be measured from a transition area, e.g., from a center of the transition area and/or from a nearest edge of the transition area.

To the extent it is determined at 866 that the mobile tag is not close to the transition area, the process 860 proceeds according to no handover at 868 and may continue from the determining of the position of the mobile tag at 864. However, to the extent it is determined at 866 that the mobile tag is close to the transition are, one or more ranges are determined at 870 with respect to one or more border ranging devices 816 (FIG. 20B). The ranges may be determined according to range measurements conducted by one or more of the border ranging devices 816 and/or the mobile tag, and in at least some embodiments, one or more of the anchors of the corresponding anchor network. Range measurements may be obtained using any of the illustrative range, distance and/or position techniques disclosed herein and/or otherwise generally known.

The range measurements may include an estimated range from the mobile tag to one or more of the border ranging devices 816. The range measurements may include ranges determined at one time and/or ranges between the same devices determined at different times. The range measurements may be repeated and monitored over time as the mobile tag moves within one or more of the areas of the multi-area RTLS.

According to the example process 860, the range measurements may be evaluated at 872. Evaluation may include, without limitation, comparison of the range measurements obtained between the mobile tag and different ones of the border ranging devices. Alternatively or in addition, the evaluations may include comparisons of range measurements obtained at different times between the mobile tag and any one or more of the border ranging devices 816. It is envisioned that in at least some embodiments, the border ranging devices 816 are deployed at predetermined and fixed locations. Accordingly, relationships may be determined between the border ranging devices and one or more of the transition area and the border between different areas of the multi-area RTLS. Such relationships may be used during the evaluations of the range measurements to facilitate a determination whether the mobile tag is at, near and/or past a border region.

A determination is made at 874 as to whether a handover should occur. To the extent it is determined at 874 that a handover should occur, a handover process may be initiated at 876. To detect the handover, a location of the mobile tag is known at least sufficiently to determine it within a threshold range of a transition area. Range measurements between the mobile tag and one or more of the border ranging devices are determined, e.g., for a certain period of time and/or while the mobile tag remains within the threshold area of the transition area. In at least some embodiments, e.g., based on a starting area of the mobile tag and the time series of range measurements, a transition of a position of the mobile tag from one area to another is detected. A determination of whether a handover should be performed may be based upon a detection of the transition.

It is envisioned that in at least some embodiments, the handover may be immediate, e.g., being declared and/or initiated as soon it is determined from the range measurements that the mobile tag has crossed the border. Alternatively or in addition, there may be some buffer region applied, such that the handover is neither declared nor initiated until the mobile tag has surpassed the border and a predetermined buffer region, e.g., having exited an opposite endo of a transition area. In at least some embodiments, a temporal threshold may be applied as well, such that any handover may be scheduled to occur after a predetermined period of time has expired since the mobile tag transited the border and/or exited the transition area. Such measures may be useful to prevent unnecessary handovers when a mobile tag is operating within a vicinity of the transition area, but not necessarily transitioning from one area to another.

Subsequent to a handover, the process 860 may continue from determining a mobile tag position at 864, e.g., to determine whether any subsequent handovers may be appropriate back to the original area and/or to yet another area of the multi—are RTLS. However, to the extent it is determined at 875 that a handover should not occur, the process 860 may continue monitoring and/or determining range measurements to border ranging devices at 870 and evaluation the monitored measurements at 872.

A handover may include a transition from a mobile tag obtaining location updates from a first RTLS position service according to a first network of anchors to the mobile tag obtaining location updates from a second RTLS position service according to a second network of anchors. Whether the mobile tag operates in association of the first or second RTLS position services may depend on the mobile tag's position within a respective service area. If a mobile tag is located in one area, but at a specification location that may be proximate to a border with another area, the mobile tag may be within wireless coverage of networks of anchors of both areas. The mobile tag preferably obtains the RTLS position service from the area it is in, essentially ignoring signals from the adjacent RTLS position service. However, when the mobile tag transitions from one area of service to another, the mobile tag preferably obtains the RTLS position service from the newly entered area as quickly and reliably as possible.

In at least some embodiments, the process 860 may be implemented in whole or in part at a mobile tag. Alternatively or in addition, the process 860 may be implemented in whole or in part at an RTLS node, such as an anchor and/or a controller of a network of anchors. In at least some embodiments, one or more steps of the process 860 may be offloaded to another processor, such as a local server, a gateway device and/or a backend server communicatively coupled to one or more of the anchors, the network of anchors and/or the mobile tag.

Figure 20G:
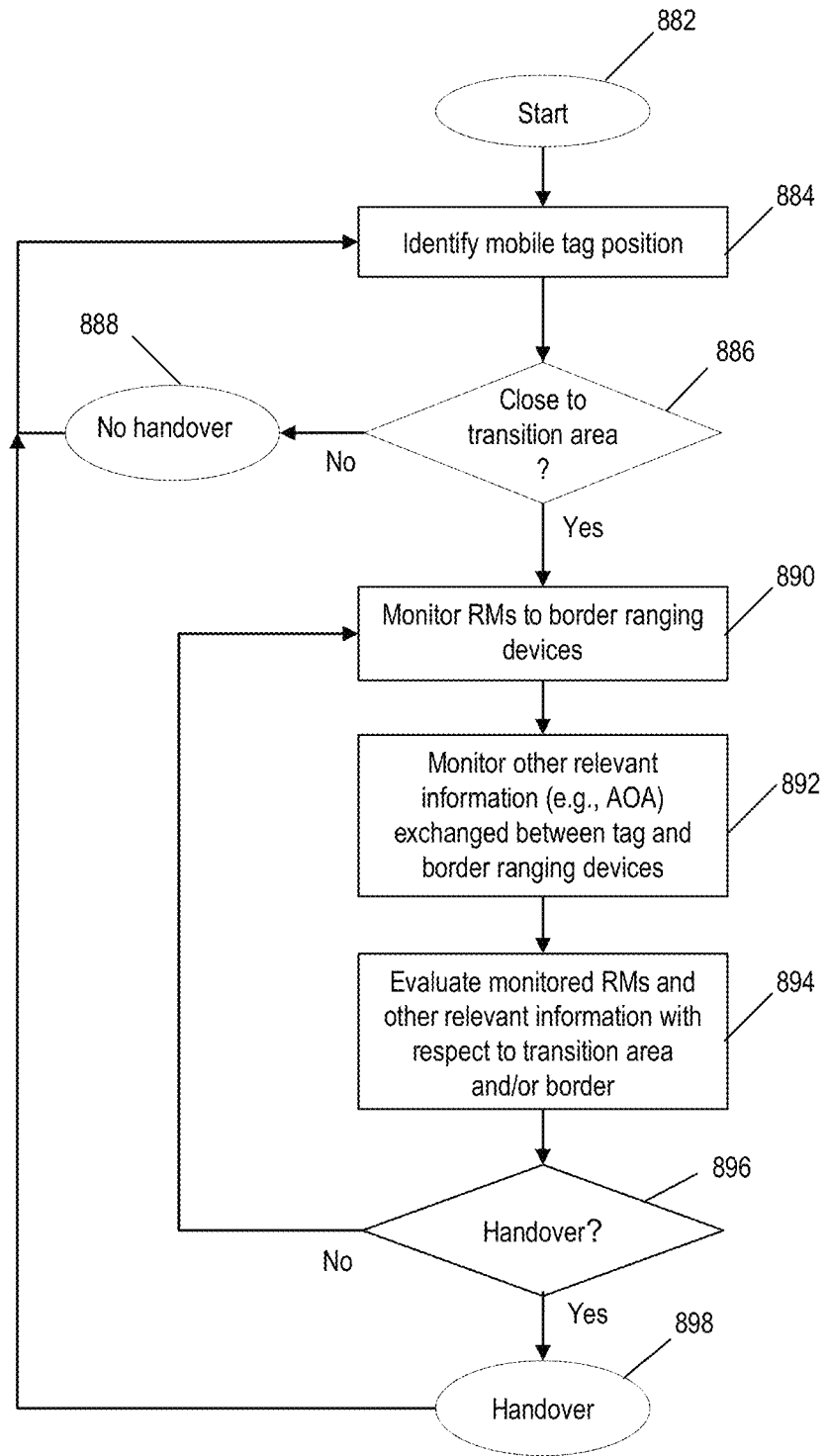
FIG. 20G depicts an illustrative embodiment of another method for managing area handovers in a multi-area, real-time locating system, such as the systems depicted in FIGS. 20A, 20B and 20D, in accordance with various aspects described herein.

FIG. 20G depicts an illustrative embodiment of another process 880 for managing area handovers in a multi-area, real-time locating system, such as the systems depicted in FIGS. 20A, 20B and 20D, in accordance with various aspects described herein. The process 880 is adapted to initiate a mobile tag handover within a multi-area RTLS. Handover of the mobile tag from a first network of a first area to a second network of a second area may be facilitated by a transition-area subsystem adapted to support monitoring a position and/or movement of a mobile tag when the tag is proximate to a predetermined transition area between the first and second areas.

In at least some embodiments, the process 880 may be initiated at 882. The monitoring of the position and/or movement of the mobile tag by the transition-area subsystem may be accomplished in addition to RTLS position services available in either of the first and second areas. Initiation of the process 880 may occur at a process start time, e.g., in association with an initiation of the RTLS position service in either of the first and second areas. In such instances, the process 880 may remain in operation as long as an RTLS service is available in the multi-area configuration. Alternatively or in addition, the process 880 may be initiated responsive to an event, such as a determination by either RTLS position service that a tag is present within a respective service area. Thus, if there are no tags present, the process may terminate and/or otherwise return to a hibernation or sleep state in which it awaits initiation responsive to mobile tag activity.

According to the example process 880, a position of a mobile tag 807 (FIG. 20A) is made at 884. For example, one of the first or second RTLS servicing a respective area in which the mobile tag 807 is operating may determine a position of the mobile tag 807. Alternatively or in addition, the mobile tag 807 may determine its position with respect to one or more anchors 803 and/or other tags of the first network of anchors 802a (FIG. 20A). More generally, a position of the mobile tag 807 may be identified using any of the location and/or position techniques disclosed herein and/or otherwise generally known.

According to the example process 880, a determination is made at 886 as to whether the mobile tag 807 is close to a transition area 805 (FIG. 20A). For example, the identified position of the mobile tag 807 may be compared with a position of the transition area 805. In at least some embodiments, the comparison may be based upon a buffer region defined with respect to the transition area, e.g., according to a threshold distance with respect to a border of the transition area 806.

To the extent it is determined at 886 that the mobile tag 807 is not close to the transition area 805, the process 880 proceeds according to no handover at 888 and may continue further from the determining of the position of the mobile tag at 884. However, to the extent it is determined at 886 that the mobile tag 807 is close to the transition area, one or more ranges may be determined at 890. In at least some embodiments, the ranges may be determined with respect a predetermined border and/or to one or more border ranging devices 806 (FIG. 20A). The ranges may be determined according to range measurements conducted by one or more of the border ranging devices 806 and/or the mobile tag 807, and in at least some embodiments, one or more of the anchors of a corresponding anchor network. Range measurements may be obtained using any of the illustrative range, distance and/or position techniques disclosed herein and/or otherwise generally known.

According to the example process 880, other information may be monitored in addition to the range measurements determined at 890. Other information may include, without limitation, monitored information related to a signal exchanged between the mobile tag 807, an anchor and/or a border ranging device 806, information related to an orientation of the mobile tag 807 and/or a person and/or mobile entity to which the mobile tag 807 is affixed and/or otherwise held, a speed, direction and/or acceleration of the mobile tag 807, an identity of a mobile entity to which the mobile tag 807 is affixed and/or otherwise held, a physical property of the mobile entity, an environment in which the mobile tag 807 is operating and so on.

By way of example, monitored information related to a wireless signal, may include information related to a signal received from the mobile tag 807, such as its AOA, a signal strength, a signal quality, e.g., an error rate, and so on. By way of nonlimiting example, such monitored information may include one or more of an orientation, e.g., a pitch, roll and/or yaw, an identification of an entity and/or type of entity associated with the mobile tag 807, e.g., a person and/or vehicle, such as a vehicle, a robot and/or a drone, to which the mobile tag 807 may be held and/or otherwise fastened. Alternatively or in addition, the monitored information may include one or more physical properties of the mobile entity, such as its size, shape, weight, turning radius, maximum speed, acceleration and/or deceleration, braking capacity, and so on. Examples of the environment in which the mobile tag 807 is operating may include, without limitation, a noise floor, spectral utilization, RF interference, a number of other wireless tags operating within the RTLS service area, and so on.

According to the example process 880, one or more of the range measurements alone or in combination with one or more of the other relevant monitored information may be evaluated at 892. Evaluation may include, without limitation, evaluation of the range measurements obtained between the mobile tag and one or more of the border ranging devices. Alternatively or in addition, the evaluations may include comparisons of range measurements obtained at different times between the mobile tag and any one or more of the border ranging devices 806. The evaluation of the range(s) and/or other relevant information may include one or more of an estimation of a direction of movement of the mobile tag 807, a prediction of a future position of the mobile tag 807, e.g., at a predetermined future time, such as within a number of seconds and/or before a subsequent monitoring at 890 and/or at 892, a determination of a likelihood that transit of the mobile tag from one service area to another is imminent, and so on, e.g., according to a determined probability based on one or more of the range measurements and/or the other relevant information.

A determination is made at 896 as to whether a handover should occur. To the extent it is determined at 894 that a handover should occur, a handover process may be initiated at 898. It is envisioned that in at least some embodiments, the handover may be immediate, e.g., being declared and/or initiated as soon it is determined from the range measurements that the mobile tag has crossed the border. Alternatively or in addition, there may be some buffer region applied, such that the handover is neither declared nor initiated until the mobile tag has surpassed the border and a predetermined buffer region, e.g., having exited an opposite endo of a transition area. In at least some embodiments, a temporal threshold may be applied as well, such that any handover may be scheduled to occur after a predetermined period of time has expired since the mobile tag transited the border and/or exited the transition area. Such measures may be useful to prevent unnecessary handovers when a mobile tag is operating within a vicinity of the transition area, but not necessarily transitioning from one area to another.

Subsequent to a handover, the process 880 may continue from identifying the mobile tag position at 884, e.g., to determine whether any subsequent handovers may be appropriate back to the original area and/or to yet another area of the multi—are RTLS. However, to the extent it is determined at 896 that a handover should not occur, the process 880 may continue monitoring and/or determining range measurements to border ranging devices at 890, monitoring of other relevant information at 892, and evaluation the monitored measurements at 892.

It is envisioned that one or more of the illustrative processes 860, 880 may be implanted in real time and/or in near-real time, such that any latency related to transition between service areas is minimized.

While for purposes of simplicity of explanation, the respective processes are shown and described as a series of blocks in FIGS. 20F and 20G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In at least some embodiments a mobile tag obtains its position using only signals from anchors within a wireless network to which the mobile tag is currently connected. For example, a first network of anchors providing RTLS service within a first area are in wireless communication with the mobile tag via a first wireless network. A second network of anchors provides RTLS service within a second area via a second wireless network that is distinguishable from the first wireless network. For such configurations, a handover of the mobile tag from the first area to the second area includes a handover of the mobile tag from the first wireless network to the second wireless network. The wireless networks may include one or more of a mobile cellular network, a wireless local area network, a personal area network, and the like.

Wireless networks include any of the example networks and/or wireless technologies disclosed herein and/or otherwise generally known. In some embodiments, the first wireless network and the second wireless differ according to one or more of a network service provider and/or a network technology. Alternatively or in addition, the first and second networks may be provided by one or more of the same service provider and/or according to the same network technology, but otherwise distinguishable. Distinguishing features of the wireless networks may include, without limitation, one or more of operational frequency bands, wireless technologies, wireless protocols, network protocols, hashing and/or encryption algorithms and/or keys, and the like.

Figure 21:
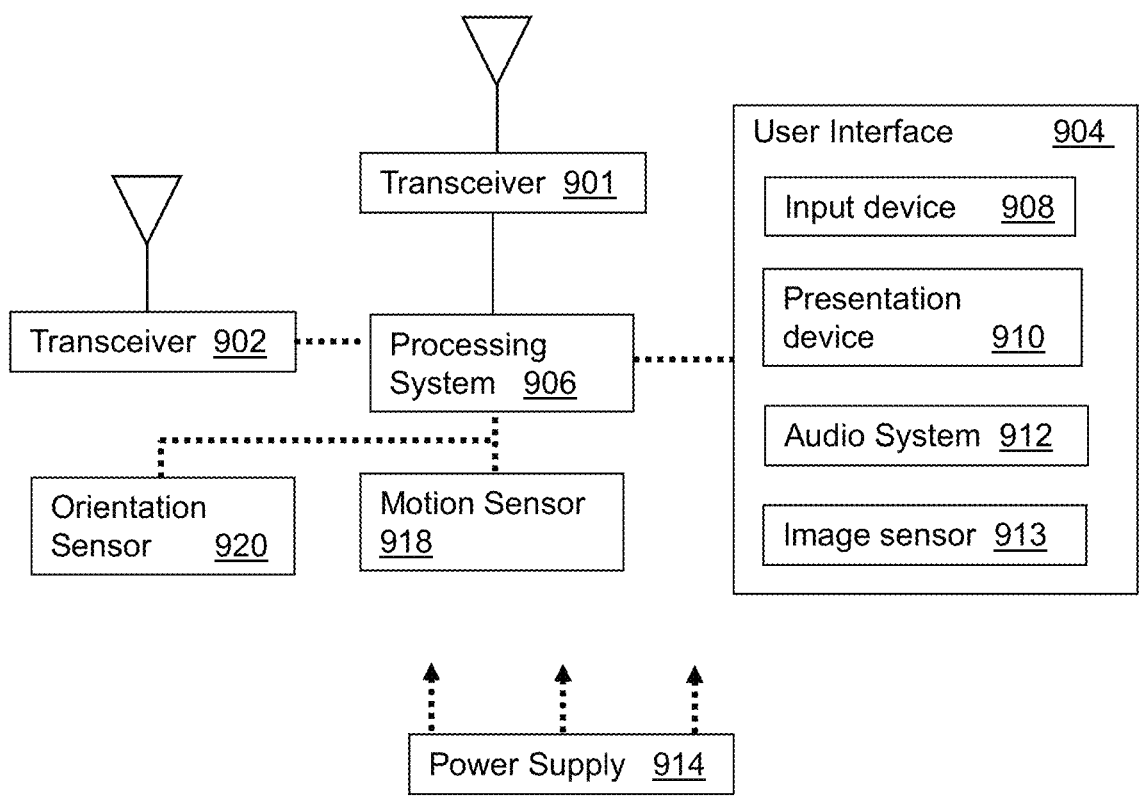
FIG. 21 is a block diagram of an example, non-limiting embodiment of a communication device in accordance with various aspects described herein.

FIG. 21 is a block diagram of an example, non-limiting embodiments of a communication device 900 in accordance with various aspects described herein. Communication device 900 can serve in whole or in part as an illustrative embodiment of a mobile tag 101, 201 and an anchor 102, 104, 106, 108, 204 as depicted in FIGS. 1-7, and can be configured to perform in whole or in part portions of methods 300 and 600 of FIGS. 8 and 17.

In an embodiment, communication device 900 can comprise a first wireless transceivers 901, a user interface (UI) 904, a power supply 914, and a processing system 906 for managing operations of the communication device 900. In another embodiment, communication device 900 can further include a second wireless transceiver 902, a motion sensor 918, and an orientation sensor 920. The first wireless transceiver 901 can be configured to support wideband wireless signals such as ultra-wideband signals (e.g., 500 MHz) for performing precision measurements such as TDOA and TW-TOA as described above and can be further configured for exchanging messages (e.g., x-y coordinates, location flags, etc.).

The second wireless transceiver 902 can be configured to support wireless access technologies such as Bluetooth®, ZigBee®, or WiFi (Bluetooth® and ZigBee® are trademarks registered by the Bluetooth® Special Interest Group and the ZigBee® Alliance, respectively). The second wireless transceiver 902 can be utilized to conserve power and offload messaging between communication devices by utilizing narrow band signals such as Bluetooth®, ZigBee®, or WiFi, instead of ultra-wideband signals. One or both wireless transceivers 901, 902 can also be used for obtaining a strength indicator (RSSI). One or both wireless transceivers 901, 902 can also be equipped with multiple antennas and one or more phase detectors to determine angle of arrival of wireless signals and thereby an orientation of the communication device 900 (e.g., mobile tag 101) relative to another communication device 900 (e.g., anchor 204).

The UI 904 can include an input device 908 that provides at least one of one or more depressible buttons, a tactile keypad, a touch-sensitive keypad, or a navigation mechanism such as a roller ball, a joystick, or a navigation disk for manipulating operations of the communication device 900. The input device 908 can be an integral part of a housing assembly of the communication device 900 or an independent device operably coupled thereto by a tethered wireline interface (such as a USB cable) or a wireless interface supporting for example Bluetooth®. The UI 904 can further include a presentation device 910. The presentation device 910 can include a vibrator to generate haptic feedback, an LED (Light Emitting Diode) configurable by the processing system 906 to emit one or more colors, and/or a monochrome or color LCD (Liquid Crystal Display) or OLED (Organic LED) display configurable by the processing system to present alphanumeric characters, icons, or other displayable objects.

The UI 904 can also include an audio system 912 that utilizes audio technology for conveying low volume audio (for proximity listening by a user) and/or high-volume audio (for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images in a vicinity of the communication device 900. The camera can be used for performing facial recognition and user ID recognition that can be combined with embodiments of the subject disclosure.

The power supply 914 can utilize common power management technologies such as replaceable and rechargeable batteries, supply regulation technologies, and/or charging system technologies for supplying energy to the components of the communication device 900 to facilitate portable applications. Alternatively, or in combination, the charging system can utilize external power sources such as DC power supplied over a physical interface such as a USB port or other suitable tethering technologies.

The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (in degrees, minutes, or other suitable orientation metrics). In some embodiments, the orientation sensor 920 can replace a need for utilizing multiple antennas with the first and/or second wireless transceivers 901, 902 and a phase detector for performing angle of arrival measurements. In other embodiments, the function of the orientation sensor 920 can be combined with an angle of arrival measurement performed with multiple antennas with the first and/or second wireless transceivers 901, 902 and a phase detector.

The processing system 906 can utilize computing technologies such as a microprocessor, a digital signal processor (DSP), programmable gate arrays, application specific integrated circuits (ASICs), and/or a video processor with associated storage memory such as Flash, ROM, RAM, SRAM, DRAM, or other storage technologies for executing computer instructions, controlling, and processing data supplied by the aforementioned components of the communication device 900.

Other components not shown in FIG. 21 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings.

The communication device 900 as described herein can operate with more or less of the circuit components shown in FIG. 21. These variant embodiments can be used in one or more embodiments of the subject disclosure.

Figure 22:
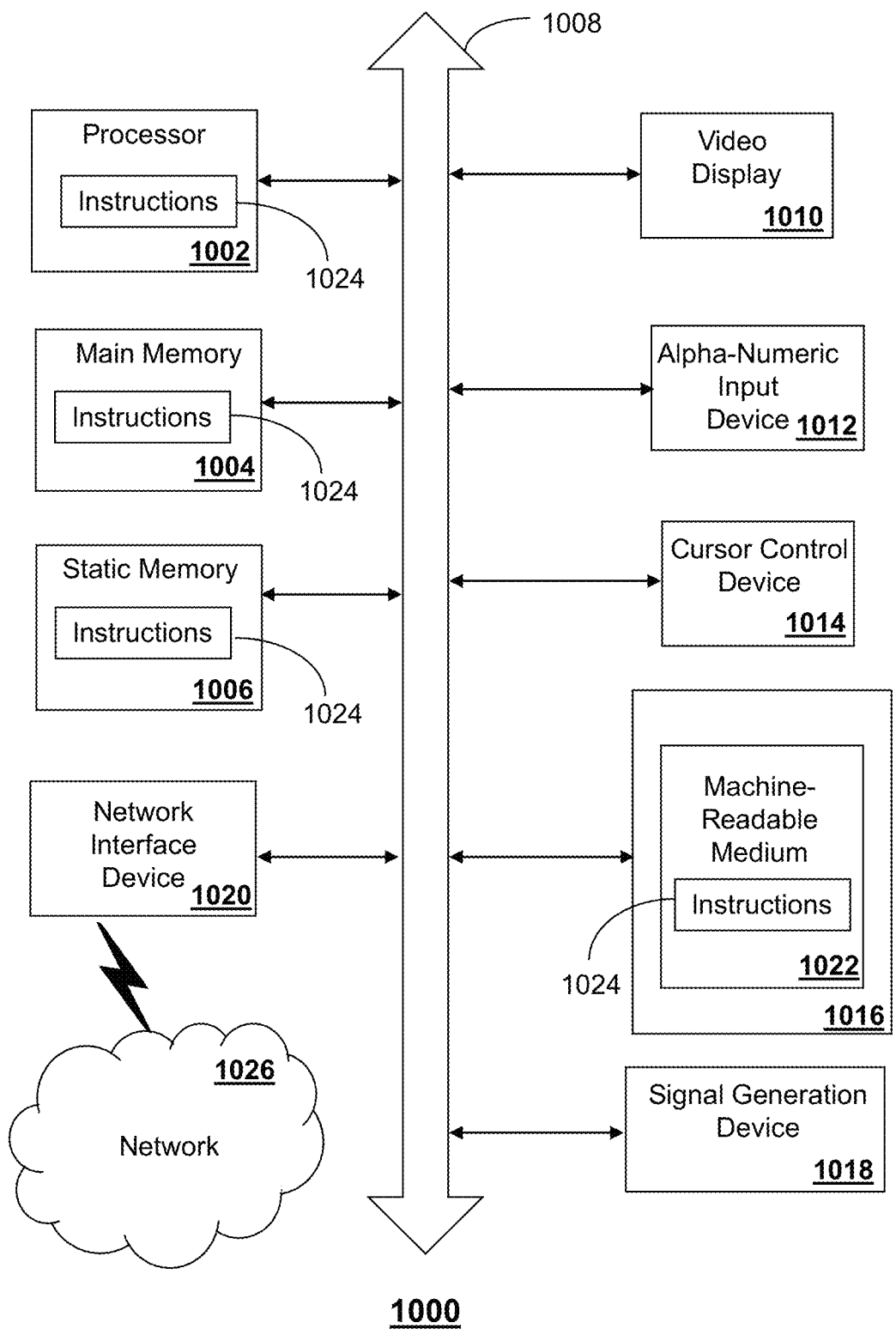
FIG. 22 is a block diagram of an example, non-limiting embodiment of a computing system in accordance with various aspects described herein.

FIG. 22 depicts an exemplary diagrammatic representation of a machine in the form of a computing system 1000 within which a set of instructions, when executed, may cause the machine to perform any one or more of the methods described above. One or more instances of the machine can operate, for example, as the computing system referred to in methods 300 or 600 of FIGS. 8 and 17. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides data communication. Further, while a single machine is illustrated, the term "machine" shall also be taken to include any collection of machines (physical or virtual machines) that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid-state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine, or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices, and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step, or function, such as first, second, third, and so forth, is not intended to describe an order or function unless expressly stated so. The use of the terms first, second, third and so forth, is generally to distinguish between devices, components, steps, or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A mobile device, comprising:
a processing system including a processor; and
a memory that stores executable instructions that, when executed by the processing system, facilitate performance of operations, the operations including:
receiving a first wireless signal transmitted by a wireless anchor of a first plurality of wireless anchors of a first location service operating within a first area;
estimating a location of the mobile device according to the first location service, based on the first wireless signal;
calculating ranges between the mobile device and a group of wireless ranging devices responsive to the location indicating the mobile device is proximate to a predetermined transition region between the first area and a second area, wherein the ranges are calculated separately from the first location service;
identifying a handover requirement according to the ranges; and
configuring, responsive to the handover requirement, the mobile device to receive a second wireless signal transmitted by a wireless anchor of a second plurality of wireless anchors of a second location service operating within a second area, wherein a location of the mobile device within the second area may be determined according to the second wireless signal, without reference to the first wireless signal.

2. The mobile device of claim 1, wherein the configuring further comprises receiving a wireless signal comprising configuration information, the mobile device accessing the second location service according to the configuration information.

3. The mobile device of claim 2, wherein the configuration information comprises a plurality of locations of the second plurality of wireless anchors, wherein the location of the mobile device is determined according to the locations of the second plurality of wireless anchors.

4. The mobile device of claim 1, wherein the group of wireless ranging devices comprises a wireless anchor of the first plurality of wireless anchors of the first location service.

5. The mobile device of claim 1, wherein the group of wireless ranging devices comprises a mobile device having an identified location within the first location service operating within a first area.

6. The mobile device of claim 1, wherein the first wireless signal and the second wireless signal are transmitted via different wireless networks.

7. The mobile device of claim 6, wherein the configuring further comprises transitioning wireless operation of the mobile device from between the different wireless networks.

8. The mobile device of claim 1, further comprising:
monitoring non-range-related information, wherein the identifying the handover requirement is further based upon the non-range-related information.

9. The mobile device of claim 8, wherein the non-range-related information comprises an angle of arrival of a wireless signal originating at the mobile device, a strength of the wireless signal, a quality of the wireless signal, and combinations thereof.

10. The mobile device of claim 1, wherein the calculating of the ranges further comprises determining a time sequence of range measurements between the mobile device and the group of wireless ranging devices, and wherein the calculating of the ranges is based on the time sequence of range measurements.

11. The mobile device of claim 10, wherein the identifying a handover requirement further comprises examining a time sequence of range measurements.

12. A method, comprising:
receiving, by a processing system including a processor, a first wireless signal transmitted by a wireless anchor of a first plurality of wireless anchors of a first location service adapted to determine a location of a mobile device operating within a first area;
estimating, by the processing system, a location of the mobile device based on the first wireless signal;
determining, by the processing system, range information between the mobile device and a group of wireless ranging devices responsive to the location indicating the mobile device is proximate to a predetermined transition region;
identifying, by the processing system, a handover requirement according to the range information; and
configuring, by the processing system and responsive to the handover requirement, the mobile device to receive a second wireless signal transmitted by a wireless anchor of a second plurality of wireless anchors of a second location service operating within a second area, wherein a location of the mobile device may be determined according to the second wireless signal, without reference to the first wireless signal.

13. The method of claim 12, wherein the group of wireless ranging devices comprises two wireless ranging devices disposed at opposing ends of the predetermined transition region.

14. The method of claim 12, wherein the determining of the range information further comprises determining a time sequence of range measurements between the mobile device and the group of wireless ranging devices.

15. The method of claim 14, wherein the identifying a handover requirement further comprises examining a time sequence of range measurements.

16. The method of claim 12, wherein transit of the mobile device from the first area to the second area is via the predetermined transition region.

17. A non-transitory, machine-readable medium, comprising executable instructions that, when executed by a processing system of a mobile device including a processor, facilitate performance of operations, the operations comprising:

estimating a location of the mobile device based on a first wireless signal transmitted by a wireless anchor of a first plurality of wireless anchors of a first location service operating within a first area;

determining range information between the mobile device and a group of wireless reference devices responsive to the location indicating the mobile device is proximate to a predetermined transition region;

identifying a handover requirement according to the range information; and configuring, responsive to the handover requirement, the mobile device to receive a second wireless signal transmitted by a wireless anchor of a second plurality of wireless anchors of a second location service operating within a second area, wherein a location of the mobile device may be determined according to the second wireless signal, without reference to the first wireless signal.

18. The non-transitory, machine-readable medium of claim 17, wherein the group of wireless reference devices comprises two wireless reference devices disposed at opposing ends of the predetermined transition region.

19. The non-transitory, machine-readable medium of claim 17, wherein the determining of the range information further comprises determining a time sequence of range measurements between the mobile device and the group of wireless reference devices.

20. The non-transitory, machine-readable medium of claim 19, wherein the identifying a handover requirement further comprises examining a time sequence of range measurements.

* * * * *